(12) United States Patent
Peterson et al.

(10) Patent No.: US 11,868,589 B2
(45) Date of Patent: Jan. 9, 2024

(54) DOCUMENT DATA STRUCTURE FOR LINKING A TEXT EDITOR WITH INTEGRATED EDITING TOOLS

(71) Applicant: Luminate Universal Education Systems, Ltd, Toronto (CA)

(72) Inventors: Julian Peterson, Toronto (CA); John Matthew Tennant, Dundas (CA); Dan Lyn Kew, South Tetagouche (CA); Jillian Vardy, Toronto (CA); Jordan Peterson, Toronto (CA)

(73) Assignee: LUMINATE UNIVERSAL EDUCATION SYSTEMS, LTD, Toronto (CA)

( * ) Notice: Subject to any disclaimer, the term of this patent is extended or adjusted under 35 U.S.C. 154(b) by 0 days.

(21) Appl. No.: 17/518,998

(22) Filed: Nov. 4, 2021

(65) Prior Publication Data

US 2023/0133730 A1 May 4, 2023

(51) Int. Cl.
*G06F 3/0483* (2013.01)
*G06F 40/166* (2020.01)

(52) U.S. Cl.
CPC .......... *G06F 3/0483* (2013.01); *G06F 40/166* (2020.01); *G06F 2203/04803* (2013.01)

(58) Field of Classification Search
CPC .................................................. G06F 3/0483
See application file for complete search history.

(56) References Cited

U.S. PATENT DOCUMENTS

| 5,553,216 | A | * | 9/1996 | Yoshioka et al. | ........ G06F 17/30 |
| 2008/0097745 | A1 | * | 4/2008 | Bagnato et al. | ......... G06F 17/20 |
| 2013/0073998 | A1 | * | 3/2013 | Migos et al. | ........... G06F 3/048 |
| 2013/0254158 | A1 | * | 9/2013 | Morelli | ............ G06F 17/30598 |
| 2020/0081964 | A1 | * | 3/2020 | Maneriker et al. | ..... G06F 17/21 |

OTHER PUBLICATIONS

Julian Peterson, et al.; Text Editor and Integrated Outline Tool Linked Through a Shared Document Data Structure; U.S. Appl. No. 17/519,151.
Julian Peterson, et al.; System and Method for Implementing Sentence Level Document Versioning Through a Document Data Structure Designed to Store Multiple Sentence Variants; U.S. Appl. No. 17/519,307.

\* cited by examiner

*Primary Examiner* — James J Debrow
(74) *Attorney, Agent, or Firm* — BAKER BOTTS L.L.P.

(57) ABSTRACT

An apparatus includes a memory and a processor. The memory stores a data structure that includes an array of data blocks, each of which stores one or more strings of text of a document. The processor displays a sequence of elements, each associated with one or more consecutive data blocks of the array, and a sequence of parts, each corresponding to a data block and displaying the strings of text stored by the data block, on a GUI. The processor receives information identifying a modification of a first element, which is associated with a first data block, to which a first part corresponds. The modification is associated with an equivalent modification of the first part. The processor updates the sequence of elements according to the modification and the sequence of parts according to the equivalent modification. The processor converts the updated sequence of elements into an updated data structure.

21 Claims, 34 Drawing Sheets

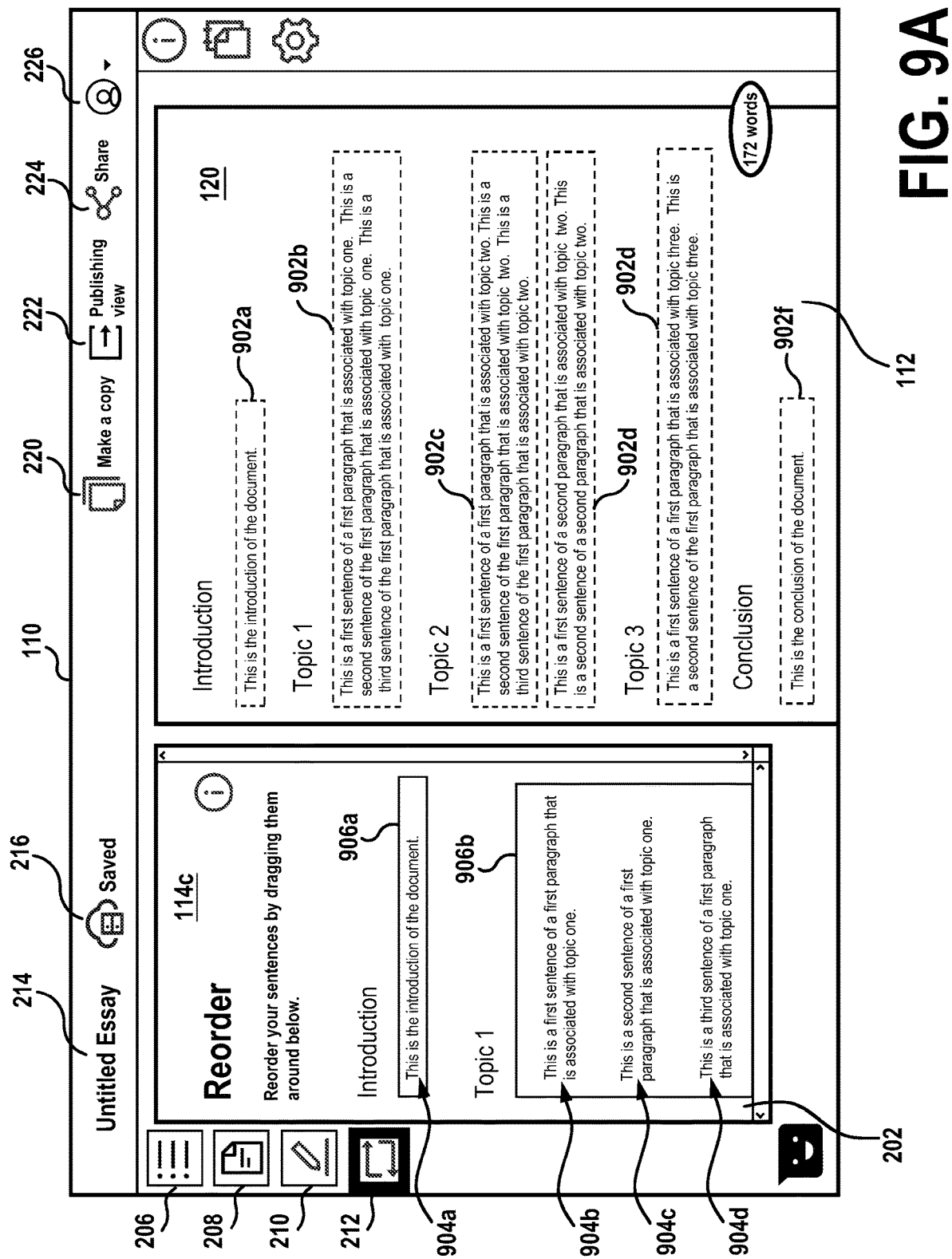

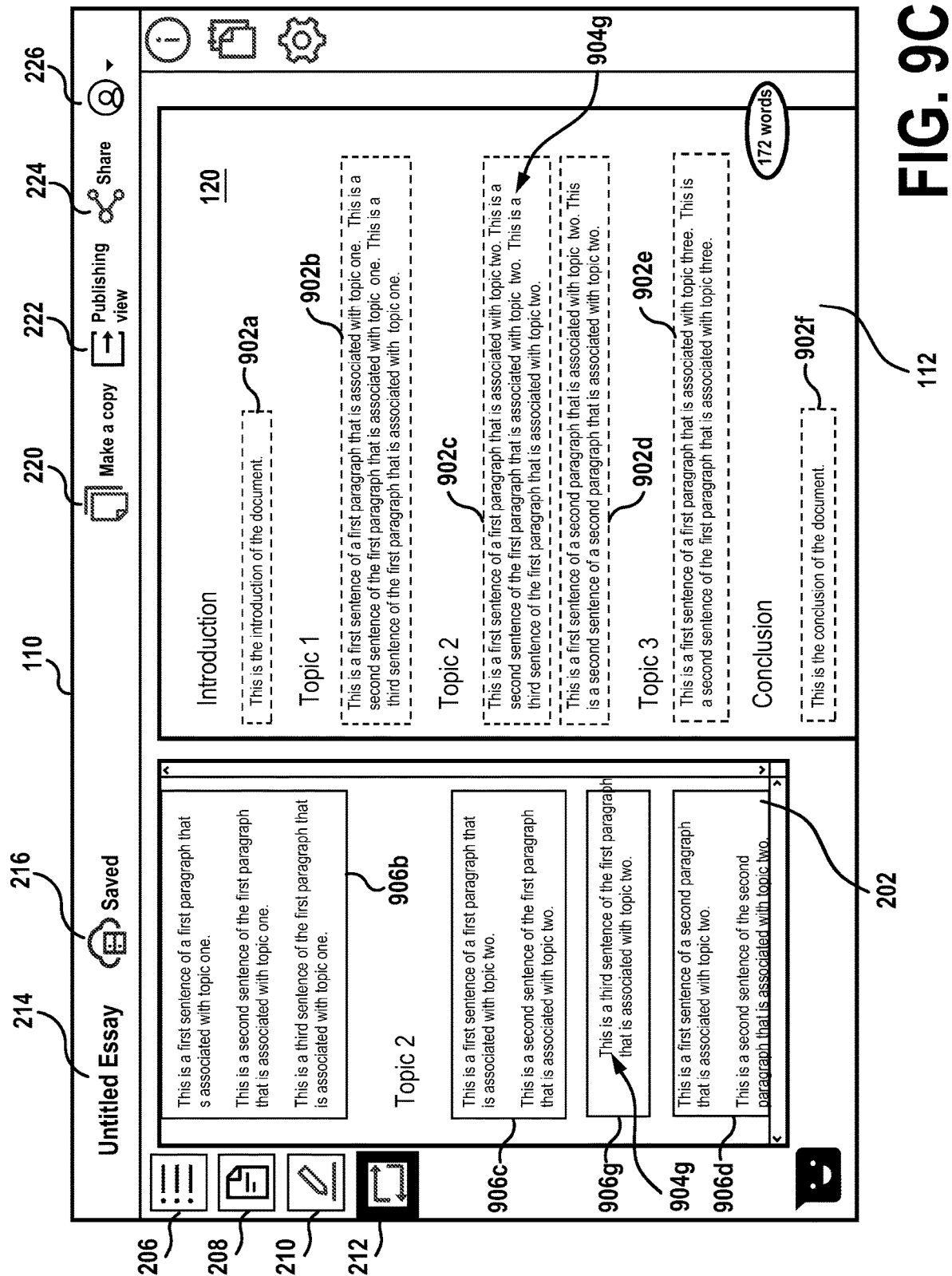

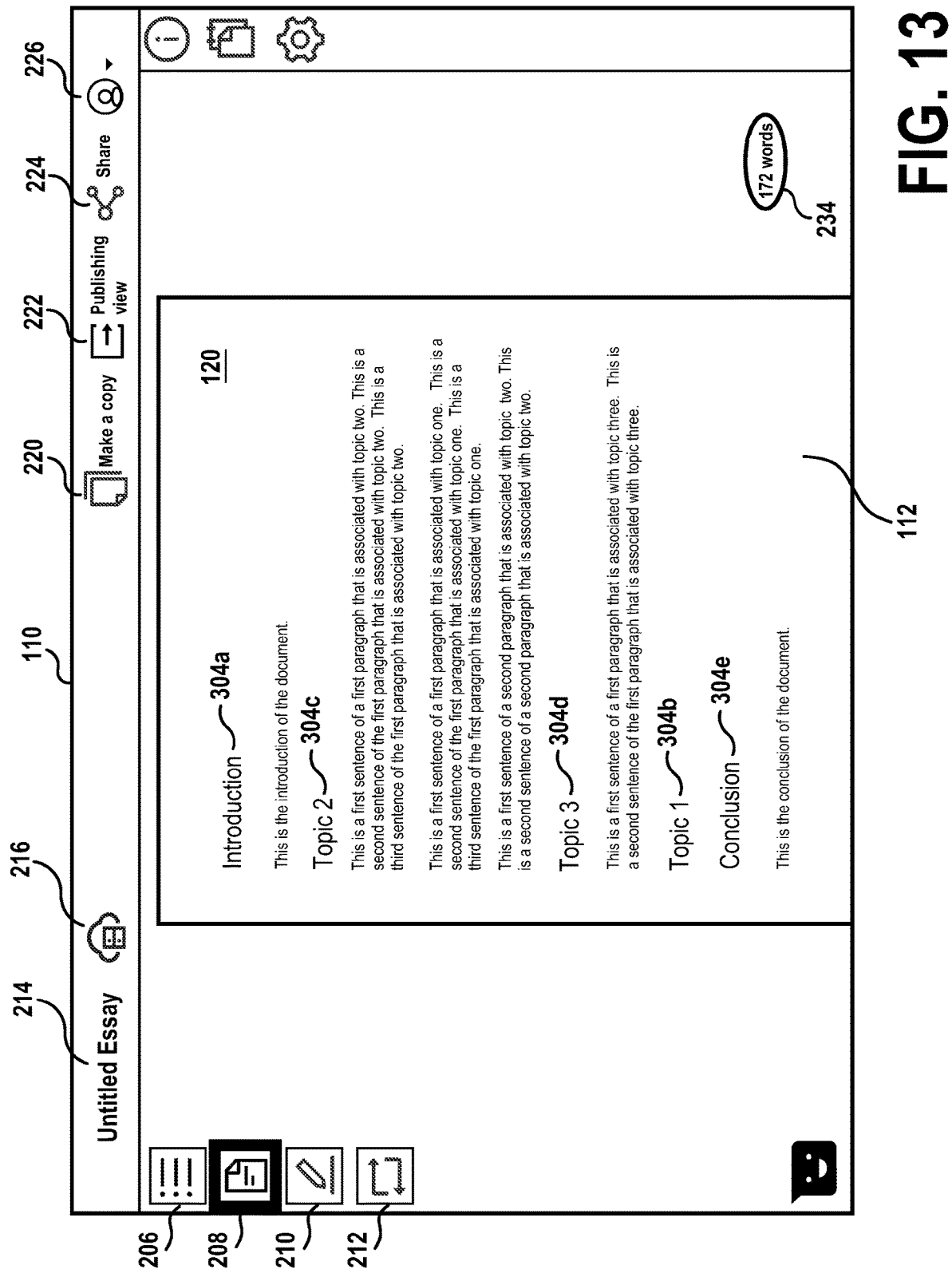

DOCUMENT DATA STRUCTURE FOR LINKING A TEXT EDITOR WITH INTEGRATED EDITING TOOLS

TECHNICAL FIELD

The present disclosure relates generally to data structures, and more particularly, to a document data structure for linking a text editor with integrated editing tools.

BACKGROUND

The process of generating an electronic document typically involves preparing a first draft of the document followed by multiple iterations of editing to generate a final version. Such editing may include rewriting sentences, moving sections of text to new positions within the document, reordering paragraphs, adding new sections of text to the document, and/or deleting sections of text from the document, among other actions. During the editing process, a user may store multiple copies/versions of the document, to help ensure that content is not lost through unintentional changes and/or that edits the user later wishes to reverse may be undone. The document editing process may consume not only a significant amount of user time, but also significant computational resources. For example, significant processing resources may be expended in locating and repositioning sections of text within a many-page document, and significant storage resources may be expended by saving multiple copies/versions of the document.

SUMMARY

This disclosure contemplates a document tool that is designed to facilitate computationally efficient electronic document preparation and revision. The tool is designed to generate a graphical user interface (GUI) that displays both a text editor and an editing tool that is linked to the text editor. Edits to a document may either be made directly in the text editor or through the linked editing tool, which may take the form of an outline tool, a sentence rewrite tool, or a sentence reorder tool. The outline tool may be used to efficiently organize the structure of the document according to a set of outline topics, and to reorder content within the document using those outline topics. The sentence rewrite tool may be used to generate multiple versions of the sentences within the document, and to select from amongst the multiple versions for inclusion within the document. The sentence reorder tool may be used to efficiently reorder the sentences within the document. Certain embodiments of the document tool are described below.

According to one embodiment, an apparatus includes a memory and a hardware processor communicatively coupled to the memory. The memory stores a data structure associated with a document. The document includes a plurality of strings of text. The data structure includes an array of data blocks. Each data block of the array of data blocks stores one or more strings of text of the plurality of strings of text. The hardware processor displays, in a first region of a graphical user interface, a sequence of elements. Each element of the sequence of elements is associated with one or more consecutive data blocks of the array of data blocks. The hardware processor also displays, in a second region of the graphical user interface, a sequence of parts. Each part of the sequence of parts corresponds to a data block of the sequence of data blocks and displays the one or more strings of text stored by the corresponding data block. A position of the part within the sequence of parts matches a position of the corresponding data block within the array of data blocks. The hardware processor additionally receives information identifying a modification associated with a first element of the sequence of elements displayed in the first region of the graphical user interface. The first element is associated with at least a first data block of the array of data blocks. A first part of the sequence of parts corresponds to the first data block, and the modification associated with the first element is associated with an equivalent modification associated with the first part of the sequence of parts. In response to receiving the information identifying the modification associated with the first element of the sequence of elements, the hardware processor updates the sequence of elements displayed in the first region of the graphical user interface according to the modification associated with the first element. The hardware processor also updates the sequence of parts displayed in the second region of the graphical user interface according to the equivalent modification associated with the first part. The hardware processor additionally converts the updated sequence of elements into an updated array of data blocks. The hardware processor further stores the updated array of data blocks in the memory as an updated version of the data structure.

According to another embodiment, an apparatus includes a memory and a hardware processor communicatively coupled to the memory. The memory stores a document that includes a sequence of parts. Each part of the sequence of parts includes one or more strings of text. The hardware processor displays a user interface on a display screen. The user interface includes a first region displaying a sequence of elements, and a second region displaying the sequence of parts. Each element of the sequence of elements corresponds to a part of the sequence of parts and is located at a position within the sequence of elements matching a position of the corresponding part within the sequence of parts. The hardware processor also receives information associated with a repositioning of a first element of the sequence of elements from a first position within the sequence of elements to a second position within the sequence of elements. The first element corresponds to a first part of the sequence of parts. In response to receiving the information associated with the repositioning of the first element, the hardware processor updates the sequence of elements displayed in the first region of the user interface by moving the first element from the first position within the sequence of elements to the second position within the sequence of elements. The hardware processor also updates the sequence of parts displayed in the second region of the user interface by moving the first part from a first position within the sequence of parts to a second position within the sequence of parts. The first position within the sequence of parts matches the first position within the sequence of elements. The second position within the sequence of parts matches the second position within the sequence of elements.

According to a further embodiment, an apparatus includes a memory and a hardware processor communicatively coupled to the memory. The memory stores a set of sentence blocks associated with a document. Each sentence block includes one or more sentence variants, and information identifying a selected sentence variant of the one or more sentence variants of the sentence block, wherein the document includes the selected sentence variant. The hardware processor displays a user interface on a display screen. The user interface includes a first region displaying a sequence of elements. Each element of the sequence of elements is associated with a sentence block of the set of sentence blocks and displays at least the selected sentence variant of the associated sentence block. The user interface also includes a second region displaying a plurality of sentences. Each sentence of the plurality of sentences displayed by the second region is assigned to a sentence block of the set of sentence blocks and corresponds to the selected sentence variant of the assigned sentence block. The hardware processor also receives information associated with a selection of at least one of a first element of the sequence of elements displayed in the first region, and a first sentence of the plurality of sentences displayed in the second region. The first element is associated with a first sentence block of the set of sentence blocks. The first sentence is assigned to the first sentence block. In response to receiving the information associated with the selection, the hardware processor updates the first region of the user interface. The updated first region displays the one or more sentence variants of the first sentence block, and an identification of the selected sentence variant of the first sentence block. The first sentence of the sequence of sentences corresponds to the selected sentence variant of the first sentence block. The hardware processor additionally receives information identifying a new selected sentence variant of the one or more sentence variants of the first sentence block that is different from the selected sentence variant. In response to receiving the information identifying the new sentence variant, the hardware processor updates the first sentence displayed in the second region. The updated first sentence corresponds to the new selected sentence variant.

The system described in the present disclosure may be integrated into a practical application of an improved text editor for use in generating documents in a computationally efficient manner. In particular, by providing a user with two views of a document, either of which may be used to edit the content within the document, certain embodiments reduce the computational resources expended in the document creation and editing process, as compared with existing text editors. As a specific example, an embodiment conserves processing resources by enabling a user to reorder content within a multi-page document simply by reordering a set of outline topics according to which the document content is organized. In certain embodiments, these outline topics are not part of the actual content of the document, but rather are used for organizational purposes within the system, to increase the efficiency of the document editing process. As another specific example, an embodiment conserves storage resources by enabling a user to store multiple versions of one or more sentences within the document, rather than storing multiple versions of the entire document. As a further example, an embodiment conserves storage and processing resources by enabling a user to store multiple versions of one or more sentences within the document and to easily switch between displaying the various sentence versions within the content of the document, rather than entering and storing those multiple versions in a separate document and then navigating between the documents, copying sentence versions from one document and pasting them into the other. In certain embodiments, documents created using the system may be exported in a variety of different formats, providing compatibility with existing software applications.

The system described in the present disclosure may also be integrated into a practical application of a collaborative text editor that may be used by a team of individuals editing a document. This may enable multiple members of the team to simultaneously edit the document, by proposing sentence variants for the sentences of the document. These proposed sentence variants may then be viewed in real time by the other members of the team. By enabling multiple team members to simultaneously edit the same document, certain embodiments conserve storage resources as compared with existing text editing applications, which lock a document while a first user is editing it, such that a second user seeking to edit the document may need to generate and store a copy of it, and to make edits to the copy. Such embodiments further conserve the processing resources associated with merging any changes the second user makes to the copy of the document with those changes made by the first user to the original document.

The system described in the present disclosure may further be integrated into a practical application of an improved graphical user interface for use in creating and editing documents. In particular, certain embodiments of the GUI enable the user to create, view, and/or edit the structure of the document on a first portion of the GUI displayed next to a second portion of the GUI on which the full document text may be displayed. In this manner, certain embodiments enable the user to easily view the structure of a document, and to make intuitive edits to the document, based on its structure. As an example, in certain embodiments, the GUI may be used to structure the document according to a set of outline topics, which are not part of the actual content of the document, but rather are used for organizational purposes within the GUI. A user may interact with an outline topic, as displayed within the first portion of the GUI, to view and/or edit the portion of the document associated with that outline topic. In this manner, certain embodiments enable a user to easily identify parts of a document and/or to apply structural edits to the document, without having to scroll through (potentially) multiple pages of document content, as displayed in the second portion of the GUI. As another example, in certain embodiments, the system is configured to identify individual sentences within a document and to display each sentence as a separate element within the first portion of the GUI. The user may then use the first portion of the GUI to easily reorder the sentences within the document, and/or to easily identify and direct his/her focus to an individual sentence within the document for editing purposes.

Certain embodiments provide one or more technical advantages. As an example, an embodiment conserves processing resources by enabling a user to reorder content within a multi-page document simply by reordering a set of outline topics according to which the document content is organized. As another example, an embodiment conserves storage resources by enabling a user to store multiple versions of one or more sentences within the document, rather than storing multiple versions of the entire document. As another example, an embodiment applies one or more machine learning algorithms to sentences within a document, to generate proposals of simplified and/or otherwise improved versions of the original sentences. The user may then choose to replace one or more of the sentences within the document with the proposals. As another example, an embodiment enables a user to import a document generated using an existing text editor application into the system. For instance, certain embodiments are configured to identify traditional headings within an existing document and to generate outline topics for use within the system, based on the identified headings. Some embodiments apply one or more machine learning algorithms to an existing document, to import the document into the system. In particular, certain such embodiments use the machine learning algorithm(s) to automatically generate a set of outline topics for an existing document and to organize the content of the document according to that set of outline topics. As another example, an embodiment enables a user to export a document into a variety of different file formats, thereby providing compatibility with existing software applications. As a further example, an embodiment enables multiple users to simultaneously propose edits to a document at the same time, and to view the edits proposed by one another in real time. In particular, the sentence rewrite tool of the embodiment enables multiple users to generate sentence variants for the sentences of the document, which the other users may view using the tool.

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIG. 9A illustrates the graphical user interface generated by the document tool of the system of FIG. 1 displaying the text editor and the integrated editing tool in the form of a sentence reorder tool;

FIGS. 9B through 9D present an example illustrating the use of the integrated sentence reorder tool displayed in FIG. 9A to create a new paragraph within a document and to move a sentence into the new paragraph;

FIG. 13 illustrates the graphical user interface generated by the document tool of the system of FIG. 1 displaying the text editor in a document creation mode;

DETAILED DESCRIPTION

Embodiments of the present disclosure and its advantages may be understood by referring to FIGS. 1 through 19 of the drawings, like numerals being used for like and corresponding parts of the various drawings.

I. System Overview

Figure 1:
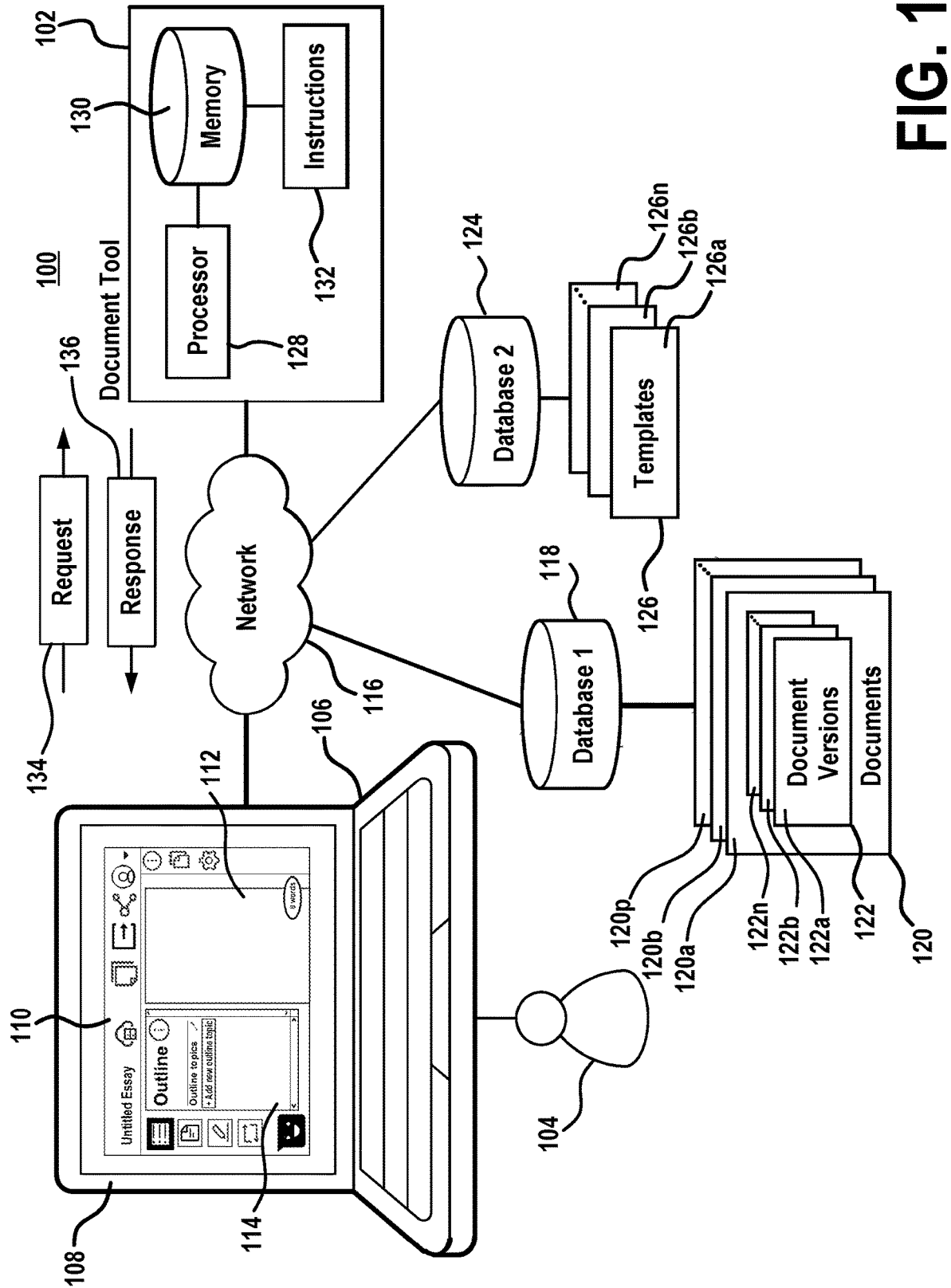
FIG. 1 illustrates an example document editing system.

FIG. 1 illustrates an example system 100 that includes user(s) 104, device(s) 106, network 116, first database 118, second database 124, and document tool 102. Generally, user 104 uses document tool 102 to create and/or edit documents 120. In certain embodiments, user 104 may use document tool 102 to create and/or edit multiple versions 122 of documents 120. In particular, in response to receiving a request 134 from a user 104 seeking to create and/or edit a document 120, document tool 102 generates graphical user interface (GUI) 110 and displays GUI 110 on display 108 of device 106. GUI 110 is configured to display both a text editor 112 and an editing tool 114 that is linked to text editor 112, such that changes made by user 104 to document 120 through editing tool 114 are also reflected in the document content displayed by text editor 112. Similarly, changes made by user 104 to document 120 through text editor 112 may be reflected in the document content displayed by editing tool 114. As an example, in certain embodiments, editing tool 114 may be used to organize the document according to a set of outline topics and to reorder the document content using these outline topics. As another example, in certain embodiments, editing tool 114 may be used to generate multiple versions for one or more document sentences, and to select from amongst the various sentence versions for inclusion within the document. As a further example, in certain embodiments, editing tool 114 may be used to display each document sentence as a separate element and to reorder these sentence elements within the document. The linking between text editor 112 and editing tool 114 may be accomplished through the use of a document data structure that stores the contents of a given document 120. Further details of the manner by which the document data structure may be used to represent a given document 120, and the manner by which document tool 102 uses the data structure to link text editor 112 and editing tool 114 are presented below, in the discussion of FIGS. 16 through 19.

Document tool 102 may be configured to generate any number of editing tools 114 that may be used by a user 104, in conjunction with text editor 112, to create and/or edit a document 120. As an example, in certain embodiments, editing tool 114 may take the form of an outline tool, which user 104 may use to plan and organize the structure of document 120. Further details of the use of the outline tool are presented below, and in the discussion of FIGS. 3A through 6. As another example, in certain embodiments, editing tool 114 may take the form of a sentence rewrite tool, which user 104 may use to revise and/or rewrite the sentences of a given document 120. Further details of the use of the sentence rewrite tool are presented below, and in the discussion of FIGS. 7A through 8. As a further example, in certain embodiments, editing tool 114 may take the form of a sentence reorder tool, which user 104 may use to reorder the sentences of a given document 120. Further details of the use of the sentence reorder tool are presented below, and in the discussion of FIGS. 9A through 11.

Devices 106 are used by users 104 to display GUI 110 and to create and/or edit documents 120 using text editor 112 and editing tool 114 of GUI 110. In certain embodiments, and as illustrated in FIG. 1, devices 106 are used by users 104, located on network 116, to create and/or edit documents 120 by communicating (through requests 134 transmitted using GUI 110 and responses 136) with document tool 102 over network 116. In some embodiments in which processor 128 and memory 130 of document tool 102 correspond to a processor and memory of device 106, device 106 may be used by user 104 to create and/or edit documents 120 regardless of whether device 106 is connected to a network 116.

Devices 106 include any appropriate device for displaying GUI 110, through which user 104 may interact to create and/or edit a document 120. In certain embodiments, devices 106 may display GUI 110 in a web browser. For example, user 104 may use device 106 to open a web browser and to navigate to a website hosted by document tool 102 and designed to present GUI 110 to user 104 as a web application. In some embodiments, devices 106 may display GUI 110 in a window generated by document tool 102. For example, in embodiments in which document tool 102 corresponds to an application installed on device 106 (such that processor 128 and memory 130 of document tool 102 correspond to a processor and memory of device 106) user 104 may use device 106 to launch the application corresponding to document tool 102, resulting in the tool generating a window displaying GUI 110 on display 108 of device.

Device 106 may correspond to any suitable display device with which user 104 may interact to generate a document 120 including, for example, a mobile phone, a computer, a laptop, a wireless or cellular telephone, a tablet, a server, an IoT device, and/or an automated assistant, or any other suitable device that includes and/or is coupled with a display 108 on which document tool 102 may display GUI 110. In certain embodiments, device 106 may also include a keyboard, keypad, or other appropriate terminal equipment usable by user 104 to interact with GUI 110 to create and/or edit a document 120. In some embodiments, devices 106 may be configured for sending and receiving information (e.g., requests 134 and responses 136) over network 116. In certain embodiments, an application executed by a processor of device 106 may perform the functions described herein.

Network 116 facilitates communication between and amongst the various components of system 100. This disclosure contemplates network 116 being any suitable network operable to facilitate communication between such components. Network 116 may include any interconnecting system capable of transmitting audio, video, signals, data, messages, or any combination of the preceding. Network 116 may include all or a portion of a cellular network, a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100. While FIG. 1 illustrates system 100 as including network 116, this disclosure contemplates that certain embodiments of system 100 (e.g., embodiments in which document tool 102 is installed on device 106) may not include network 116.

First database 118 includes any suitable storage location accessible by document tool 102 and configured for storing and retrieving documents 120 generated and/or edited using document tool 102. For the purposes of the present disclosure, a document 120 includes any collection of information including, for example, an essay, an article, a journal entry, a blog post, a book, a patent, and/or any other collection of information, at least a portion of which corresponds to one or more strings of text. For example, a document 120 may include strings of text in the form of title(s), sub-title(s), heading(s), one or more levels of sub-heading(s), sentence(s), reference(s), and/or any other suitable textual information that may be included within the document.

Database 118 may store documents 120 generated and/or edited by any number of users 104. In particular, while FIG. 1 illustrates, for simplicity, system 100 as including a single user 104, this disclosure contemplates that system 100 may include any number of one or more users 104, and that database 118 may store documents 120 created and/or edited by any number of the users 104 of system 100. Each document 120 stored in database 118 may be accessible by the user 104 who created the document. Additionally, in certain embodiments, certain documents (e.g., document 120a) may be accessible by more than one user 104. For example, a first user 104 may generate document 120a, and then invite one or more additional users to edit/revise the document. Each of these additional users may access document 120a and use document tool 102 to edit/revise the document.

Database 118 may store documents 120 in any suitable manner. For example, in certain embodiments and as described in further detail below in the discussion of FIGS. 16 through 16, database 118 may store each document 120 as a document data structure that is formed from a set of data blocks, each of which stores a portion of the content of document 120. In certain embodiments, database 118 may store each document 120 as a set of key-value pairs. In some embodiments, database 118 is configured to store multiple versions 122a through 122n of each document 120. For example, in certain embodiments, document tool 102 is configured to store an original version 122*a* of a document 120*a*, along with one or more subsequent versions 122*b* through 122*n* of the document. The one or more subsequent versions 122*b* through 122*n* of document 120*a* may be stored in database 118 in any suitable manner. For example, in certain embodiments, document tool 102 may be configured to automatically store new versions 122 of document 120*a* in database 118 at regular intervals while user 104 is using document tool 102, each time user 104 ends a session editing document 120*a* using document tool 102, and/or at any other suitable times while user 104 is engaged with document tool 102. In some embodiments, document tool 102 may be configured to store new versions 122 of document 120*a* in database 118 in response to receiving a request 134 to store a new version 122 of document 120*a*. In certain embodiments, each version 122*a* through 122*n* includes the entire contents of document 120*a*, at the time the version is stored in database 118. In some embodiments, a given version (e.g., version 122*c*) stores information identifying the changes that have been made to document 120*a* as compared to a previous version (e.g., version 122*b*) was stored in database 118, rather than the entire contents of that version of document 120*a*.

Second database 124 includes any suitable storage location for storing a set of document templates 126. Each document template 126*a* through 126*n* includes any document content that may be used by a user 104 as a starting point in creating a new document 120. As an example, templates 126 may include an essay template 126*a* that includes an introduction section, an essay body section, and a conclusion section. As another example, templates 126 may include a journal article template 126*b* that includes an abstract section, an introduction section, a background section, a journal article body section, a conclusion section, and a references section. In certain embodiments, one or more of templates 126 may include element(s) designed for use with one or more of the editing tools 114 generated by document tool 102 for use by user 104. For example, in certain embodiments in which editing tool 114 takes the form of an outline tool that may be used to organize and reorder the contents of a document according to a set of outline topics (as described in further detail below, in the discussion of FIGS. 3A through 6), one of more of templates 126 may include suggested outline topic(s), for use by user 104. For example, essay template 126*a* may include an introduction outline topic, one or more essay body outline topics, and a conclusion outline topic. In certain such embodiments, templates 126 may include only the suggested outline topics. In some embodiments, templates 126 may include content in addition to the suggested outline topics. For example, templates 126 may include titles, headings, sentences, and/or any other suitable content in addition to suggested outline topics.

Templates 126 may be stored in database 124 in any suitable manner. As an example, in certain embodiments, an administrator of document tool 102 may generate and store a set of templates 126 in database 124. As another example, in certain embodiments, one or more users 104 may generate and store templates 126 in database 124. For example, user 104 may store a given document 120*a* in database 124 for use as a template 126*a*.

Database 124 may correspond to a storage location accessible to multiple users 104, or a storage location accessible to only a single user 104. As an example, in certain embodiments, database 124 may correspond to local storage on device 106, where user 104 stores his/her templates 126. As another example, in certain embodiments, database 124 may correspond to a remote storage location that is accessible to devices 106 over network 116. In certain embodiments, a user 104 may access database 124 over network 116 to obtain a template 126*a* and/or to store a template 126*b* for use by other users 104.

In the context of the present invention, "database" is intended to be construed broadly enough to describe any suitable storage location and/or device capable of storing, accessing, and/or retrieving data. In particular, first database 118 and/or second database 124 may correspond to any storage location(s) capable of storing documents 120 and/or templates 126. For example, first database 118 and/or second database 124 may correspond to one or more data storage servers, such as a cloud server, a network-attached storage server, a direct-attached storage server, a file server, and/or any other suitable storage server, an external hard drive, a flash drive, any other suitable storage system, and/or any combination of the preceding, in any standard, distributed, and/or clustered environment. First database 118 and/or second database 124 may correspond to storage locations external to both document tool 102 and device 106, or storage location(s) integrated within one or both of document tool 102 and device 106. In certain embodiments, first database 118 and second database 124 correspond to the same storage location. For example, first database 118 and second database 124 may correspond to one or more external storage servers accessible by device 106 and/or document tool 102 over network 116, and/or one or more hard drives and/or other storage devices of device 106.

As seen in FIG. 1, document tool 102 includes a processor 128 and a memory 130. This disclosure contemplates processor 128 and memory 130 being configured to perform any of the functions of document tool 102 described herein. Generally, document tool 102 receives a request 134 from a user 104 seeking to create and/or edit a document 120 using device 106. In response, document tool 102 displays GUI 110 on device 106. GUI 110 is configured to display both a text editor 112 and an editing tool 114 for use by user 104 in creating and/or editing document 120. Editing tool 114 is integrated with text editor 112 such that, in certain embodiments, edits made to document 120 using editing tool 114 are simultaneously reflected in the document content displayed in text editor 112. Similarly, edits made to document 120 using text editor 112 may be simultaneously reflected in the document content displayed in editing tool 114. In this manner, certain embodiments offer improved document visualization and increase the efficiency of the document creation and editing processes, thereby reducing the computational resources expended during these processes, as compared with existing text editors.

Editing tool 114 may be any tool usable by user 104, in conjunction with text editor 112, to generate and/or edit a document 120. For example, in certain embodiments, editing tool 114 may take the form of: (1) an outline tool, with which user 104 may interact to structure and/or organize the content of document 120, as described in further detail below, in the discussion of FIGS. 3A through 6; (2) a sentence rewrite tool, with which user 104 may interact to rewrite one or more sentence(s) of document 120, store multiple variants of the rewritten sentence(s), and select from amongst the various sentence variants, as described in further detail below, in the discussion of FIGS. 7A through 8; and/or (3) a sentence reorder tool, with which user 104 may interact to reorder the sentences within document 120, as described in further detail below, in the discussion of FIGS. 9A through 11.

Processor 128 is any suitable type of electronic processing circuitry, including, but not limited to one or more central processing units (CPUs), graphics processing units (GPUs), application specific integrated circuits (ASIC), field-programmable gate arrays (FPGSs), application specific instruction set processor (ASIP), digital signal processors (DSPs), state machines, programmable logic devices, microcontrollers, microprocessors, and/or any suitable combination of the preceding, that communicatively couples to memory 130 and controls the operation of document tool 102. Processor 128 may be 8-bit, 16-bit, 32-bit, 64-bit or of any other suitable architecture. Processor 128 may include an arithmetic logic unit (ALU) for performing arithmetic and logic operations, a floating-point unit (FPU) for performing operations on floating-point numbers, processor registers that supply operands to the ALU and/or FPU and store the results of ALU and/or FPU operations, and a control unit that fetches instructions from memory and executes them by directing the coordinated operations of the ALU, the FPU, the registers, and other components. Processor 128 may include other hardware and software that operates to control and process information. Processor 128 executes software stored as instructions 132 on memory 130 to perform any of the functions described herein. Processor 128 controls the operation and administration of document tool 102 by processing information received from network 116, device(s) 106, first database 116, second database 124, memory 130, and/or any other suitable components of system 100. Although illustrated in FIG. 1 as a single processor, processor 128 is not limited to a single processing device and may encompass multiple processing devices operating cooperatively and/or in parallel, such as in a multi-processor system.

Memory 130 may store, either permanently or temporarily, data, operational software, or other information 132 for processor 128. Memory 130 may include any one or a combination of volatile or non-volatile local or remote devices suitable for storing information. For example, memory 130 may include random access memory (RAM), read only memory (ROM), magnetic storage devices, optical storage devices, databases, or any other suitable information storage device or a combination of these devices. Memory 130 may store software that includes any suitable set of instructions, logic, or code embodied in a computer-readable storage medium. For example, the software may be embodied in memory, a disk, a CD, or a flash drive. In particular embodiments, the software may include an application executable by processor 128 to perform one or more of the functions described herein. Memory 130 may also store locally cached information, such as one or more documents 120, and/or templates 126 that may be locally created and/or received/retrieved from a remote device, such as device 106, database 118 and/or database 124. This locally cached information may be used by document tool 102 during the course of performing its functions.

Modifications, additions, or omissions may be made to the systems described herein without departing from the scope of the invention. For example, system 100 may include any number of users 104, devices 106, GUIs 110, networks 116, first databases 118, second databases 124, documents 120, document versions 122, templates 126, processors 128, and/or memories 130. The components may be integrated or separated. Moreover, the operations may be performed by more, fewer, or other components. Additionally, the operations may be performed using any suitable logic comprising software, hardware, and/or other logic.

II. Graphical User Interface for Use in Creating and Editing Documents

A. Overview

Figure 2:
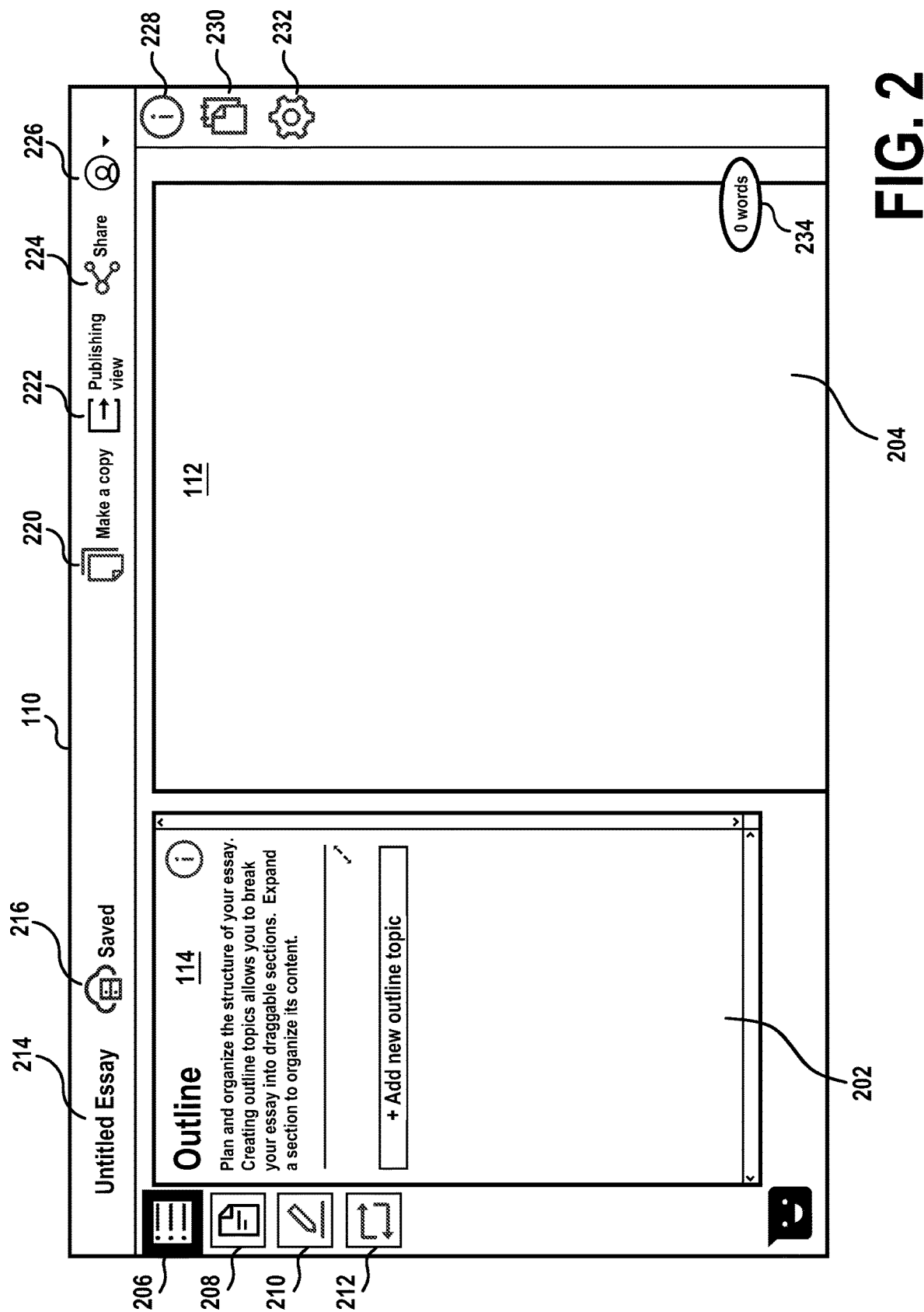
FIG. 2 illustrates an example graphical user interface generated by the document tool of the system of FIG. 1 and displaying a text editor and an integrated editing tool.

FIG. 2 presents an example GUI 110 (described in conjunction with elements of FIG. 1) generated by document tool 102 and presented to user 104 on display 108 of device 106. As illustrated in FIG. 2, GUI 110 includes a first region 202 that is configured to display editing tool 114, and a second region 204 that is configured to display text editor 112. While FIG. 2 illustrates first region 202 as displaying editing tool 114 in the form of an outline tool, this disclosure contemplates that first region 202 may display any form of editing tool 114 including, for example, a sentence rewrite tool, and/or a sentence reorder tool. Furthermore, while illustrated in FIG. 2 as first region 202 positioned to the left of second region 204, this disclosure contemplates that first region 202 and second region 204 may be positioned anywhere within GUI 110.

In addition to displaying editing tool 114 and text editor 112, GUI 110 may be configured to display multiple other elements, designed to enable user 104 to easily view, navigate, share, and/or save versions of document 120, and/or to make edits to document 120 in an intuitive way. In particular, such elements may provide information to user 104 and/or may be selectable by user 104 for various purposes related to the document creation and editing process. As an example, in certain embodiments, GUI 110 is configured to display buttons 206 through 212, with which user 104 may interact to select one or more forms for editing tool 114, to switch between the various forms available for editing tool 114, and/or to stop GUI 110 from displaying editing tool 114. For example, button 206 is associated with the outline tool offered by document tool 102, and is selectable by user 104 to cause first region 202 of GUI 110 to display the outline tool form of editing tool 114. Examples of the use of GUI 110 in response to the selection of outline tool button 206 are presented below, in the discussion of FIGS. 3A through 6. Similarly, button 210 is associated with the sentence rewrite tool offered by document tool 102, and is selectable by user 104 to cause first region 202 of GUI 110 to display the sentence rewrite tool form of editing tool 114. Examples of the use of GUI 110 in response to the selection of sentence rewrite button 210 are presented below, in the discussion of FIGS. 7A through 8. Button 212 is associated with the sentence reorder tool offered by document tool 102, and is selectable by user 104 to cause first region 202 of GUI 110 to display the sentence reorder tool form of editing tool 114. Examples of the use of GUI 110 in response to the selection of sentence reorder button 212 are presented below, in the discussion of FIGS. 9A through 11. On the other hand, button 208 is selectable by user 104 to cause GUI 110 to display text editor 112 on its own, without editing tool 114. This may be desirable during the document composition process, to help user 104 avoid distractions. For example, displaying text editor 112 on its own, without editing tool 114, may help user 104 to focus on generating a first draft of the content for document 120, rather than on editing the content, before a first draft has been completed. User 104 may select one or more of buttons 206 through 212 in any suitable manner. For example, in certain embodiments, user 104 may select one of buttons 206 through 212 by (1) using a mouse and/or trackpad to click on the button, (2) using a mouse and/or trackpad to double-click on the button, (3) using a mouse and/or trackpad to hover a cursor over the button, (4) touching display 108 of device 106 at a location where the button is displayed, and/or (5) in any other suitable manner.

Other examples of elements that may be displayed by GUI 110 are illustrated as buttons/elements/fields 214 through 234 of FIG. 2, described below. User 104 may select and/or otherwise interact with one or more of buttons/elements/fields 214 through 234 in any suitable manner. For example, in certain embodiments, user 104 may interact with one of buttons/elements/fields 214 through 234 by (1) using a mouse/trackpad to click on the button/element/field, (2) using a mouse/trackpad to double-click on the button/element/field, (3) using a mouse/trackpad to hover a cursor over the button/element/field, (4) touching display 108 of device 106 at a location where the button/element/field is displayed, and/or (5) interacting with button/element/field in any other suitable manner. Certain embodiments of GUI 110 may include all, some, or none of buttons/elements/fields 214 through 234.

i. Naming a Document

As illustrated in FIG. 2, field 214 displays a name assigned to document 120. The name may be used to identify document 120 within GUI 110, to identify document 120 within database 118, and/or for any other suitable purposes. In certain embodiments, field 214 is an interactive field through which user 104 may provide and/or edit a string of text corresponding to a name assigned to document 120. For example, in certain embodiments, in response to user 120 generating a new document 120, display tool 102 is configured to generate GUI 110, which displays a phrase such as "Untitled Essay," "Untitled Document," "New Document," or any other suitable name in field 214, to indicate that a default name has been assigned to the document. In some embodiments, user 104 may interact with field 214 (e.g., clicking field 214 with a mouse, touching display 108 at the location of field 214, and/or interacting with field 214 in any other suitable manner) to instruct document tool 102 that user 104 wishes to change the name displayed in field 214. In response, document tool 102 is configured to receive input from user 104 (e.g., through user 104 typing a new name on a keyboard included in and/or connected to device 106, through user 104 speaking a new name into a microphone included in and/or connected to device 106, and/or in any other suitable manner), and to update the name displayed in field 214, based on the received input.

ii. Saving a Document

Element 216 is configured to provide user 104 with information indicating the status of document 120 within database 118. For example, as illustrated in FIG. 2, element 216 displays "Saved," indicating that a version of the document has been saved in database 118. In certain embodiments, in addition to "Saved," element 216 may be configured to display: "Unsaved"—indicating that document 120 has not yet been saved within database 118, and/or "Saving"—indicating that document tool 102 is in the process of saving document 120 to database 118. In certain embodiments, in response to user 104 interacting with element 216 (e.g., hovering a cursor over element 216), document tool 102 is configured to display information indicating when document 120 was last saved. For example, in response to user 104 interacting with element 216, document tool 102 may be configured to generate and display a tooltip that displays the time at which document 120 was last saved.

In certain embodiments, document tool 102 may be configured to automatically save document 120 within database 118. For example, document tool 102 may be configured to automatically save document 120 at regular intervals, after a certain amount of new content has been added to document 120, after a certain amount of changes have been made to document 120, and/or at any other suitable times. In certain embodiments, saving document 120 may include overwriting the previous version of the document stored in database 118. In some embodiments, saving document 120 may include saving a new version 122 of document 120 to database 118. For example, saving document 120 may correspond to saving new version 122b of document 120 within database 118, where version 122a corresponds to the previously saved version of the document.

In certain embodiments in which database 118 corresponds to a storage location that is remote from device 106 and accessible over network 116, user 104 may use document tool 102 to edit document 120 while disconnected from network 116 (e.g., in an "offline" mode). In such embodiments, document tool 102 may be configured to automatically save a new version 122 of document 120 within database 118, once device 106 reconnects to network 116. In particular, document tool 102 may be configured to monitor for a network connection and to save a new version 122 of document 120 automatically, in response to detecting a network connections. In some embodiments, user 104 may instruct document tool 102 to save the current version of document 120. For example, in certain embodiments, user 104 may interact with element 216 to instruct document tool 102 to save the current version of document 120 in database 118 (e.g., by overwriting the previous version of the document stored in database 118, and/or by saving a new version 122 of document 120 to database 118). As another example, in some embodiments, user 104 may interact with button 230 to instruct document tool 102 to save the current version of document 120 in database 118. In particular, button 230 corresponds to a button through which user 104 may view existing versions 122 of document 120, revert document 120 (as displayed by text editor 112 and editing tool 114) to a previous version 122 of document 120, and/or save the current version of document as a new version 122 of document 120 in database 118. Further details of the manner by which user 104 may create and/or access different versions 122 of document 120, in response to interacting with button 230, are presented below, in the discussion of FIG. 15.

iii. Generating Copies of a Document

Button 220 corresponds to a button through which user 104 may interact to generate a copy of document 120. In certain embodiments, in response to user 104 interacting with button 220, document tool 102 is configured to generate a copy of the current version of document 120, as displayed within text editor 112, and to present the copy to user 104 in a second instance of GUI 110. For example, in certain embodiments in which GUI 110 is displayed within a web browser displayed by display 108 of device 106, document tool 102 may be configured generate a second instance of GUI 110 by creating a new tab within the web browser, and displaying the second instance of GUI 110 in the new tab. As another example, in certain embodiments in which document tool 102 is installed on device 106 (e.g., processor 128 and memory 130 correspond to a processor and memory of device 106), document tool 102 may be configured to generate a second instance of GUI 110 by generating a second window in which to display the new instance. In some embodiments, in addition to displaying the copy of document 120 in a new instance of GUI 110, document tool 102 may be configured to save the copy of the document as a new document within database 118. For example, document tool 102 may be configured to save a copy of a given document 120a as a new document 120b within database 118.

iv. Viewing a Document in "Publishing View"

Button 222 enables user 104 to enter a "publishing view" mode within GUI 110. In particular, in response to user 104 selecting button 222, document editing tool 102 is configured to display document 102 in GUI 110, as the document would appear if exported to an external program/application (e.g., an existing text editor that is separate from document tool 102), and/or printed as a physical document using a printer connected to device 106. For example, in certain embodiments, document tool 102 enables user 104 to organize the structure of document 120 according to a set of outline topics (the use of which is described below, in the discussion of FIGS. 3A through 6). In some embodiments, while displayed within text editor 112 and editing tool 114, these outline topics are not actually part of the content of the document that user 104 intends to be published (e.g., the document content that corresponds to the ideas expressed by user 104 through document 120, and which user 104 intends to print, export, share, etc.). Accordingly, user 104 may access the "publishing view" mode of GUI 110 to view the appearance of document 120 when the outline topics are hidden from view. Further details of the "publishing view" mode of GUI 110 are presented below, in the discussion of FIGS. 12A and 12B.

v. Sharing a Document with Other Users

Button 224 corresponds to a button through which user 104 may share document 120 with another user. In response to user interacting with button 224, document tool 102 may be configured to share document 120 with another user in any suitable manner. For example, document editing tool 102 may display a field through which user 104 may enter an email address or other identifying information associated with a second user. Document tool 102 may then use this identifying information to share document 120 with the second user in any suitable manner. As an example, in certain embodiments, document editing tool 102 may use the identifying information associated with the second user to transmit a message to the device of the second user, instructing the second user that he/she has been granted access to the document. In certain embodiments, the message may include a link through which the second user may access the document. As another example, in some embodiments, in response to receiving identifying information associated with a second user with which user 104 desires to share document 120, document editing tool 102 may make document 120 available to the second user in a list of available documents displayed by GUI 110 on a device of the second user. In some embodiments, sharing document 120 may involve changing one or more permissions associated with document 120 and stored along with the document in database 118. As an example, in response to user 104 submitting a request to share document 120 with a particular individual, document tool 102 may adjust one or more permissions associated with the document to indicate that the particular individual may access the document. As another example, in response to user 104 submitting a request to share document 120 with any other users 104, document tool 102 may set one or more permissions associated with document 120 to public, thereby enabling any users 104 of document editing tool 102 to access the document.

In certain embodiments, a student user 104 may use button 224 to share document 120 with a teacher user 104. For example, in certain embodiments, document tool 102 may be configured to operate in multiple modes, including a teacher mode (for use by a teacher 104), and a student mode (for use by a student 104). The profile of the user, as described below, in the discussion of button 226, may be used to specify the mode according to which document tool 102 is to operate for a given user. For instance, the profile of a student user 104 may indicate both that user 104 is a student and that the student belongs to one or more classes. The profile of a teacher user 104 may specify both that user 104 is a teacher and that the teacher is teaching one or more classes. A student user 104 may use document tool 102 to complete assignments (in the form of documents 120) for one or more classes, and a teacher user 104 may use document tool 102 to receive completed assignments (in the form of documents 120) from student users in his/her classes. In particular, in response to interacting with button 224, student user 104 may share document 120 (corresponding to a completed assignment) with a teacher user. In certain embodiments, in addition to sharing the current version of document 120 with the teacher user, document tool 102 may be configured to share information associated with the editing process performed by the student user 104 in generating document 120. For example, document tool 102 may be configured to share information obtained from the previous versions 122a through 122n of document 120, including, for example, the total number of sentences the user rewrote, how the word count of the document changed over time, and/or any other suitable information that may aid the teacher in assessing the user's editing process.

vi. Accessing/Adjusting Settings and Profile Information

Button 226 corresponds to a button through which user 104 may access and/or edit information associated with a profile and/or account belonging to the user. As an example, in certain embodiments, in response to interacting with button 226, user 104 may view and/or edit a username and/or password assigned to the user. User 104 may use this username and/or password to access the features provided by document tool 102. For example, in certain embodiments in which user 104 accesses GUI 110 by navigating to a webpage hosted by document editing tool 102, the webpage may prompt user 104 to enter his/her username and/or password before displaying GUI 110 to the user. As another example, in certain embodiments in which document tool 102 is configured to operate in student and teacher modes, user 104 may interact with button 226 in order to add classes to his/her profile. For example, a student user 104 may add classes in which he/she is enrolled to his/her profile, and a teacher user 104 may add classes that he/she is teaching to his/her profile. As a further example, in certain embodiments, a profile picture associated with user 104 may be displayed as part of and/or adjacent to button 226. The profile picture may correspond to a photo uploaded by user 104 to document editing tool 102 (e.g., a photo of user 104), and/or an image selected by user 104. In some embodiments, user 104 may use button 226 to choose this profile picture. For example, in certain embodiments, in response to interacting with button 226, user 104 may (1) access a photo upload utility, (2) access images from which to select, and/or (3) chose a profile photo to be displayed as part of and/or adjacent to button 226.

User 104 may also interact with button 226 in order to access, edit, and/or set default values for one or more customizable settings associated with document tool 102. For example, user 104 may set a default font type, a default text size, and/or any other suitable default options that may affect how the text of document 120 as displayed by text editor 112, and/or editing tool 114.

In certain embodiments, button 232 also corresponds to a button through which user 104 may interact to access and/or edit settings associated with document 120. For example, in certain embodiments, in response to interacting with button 232, user 104 may adjust the font type, the font size, the line spacing, and/or any other settings that may be associated with document 120. In some embodiments, changes made by user 104 to one or more settings associated with document 120, through button 232, may be document-specific changes, rather than changes to the default settings. For example, in response to user 104 interacting with button 232 and changing the font size from 12 pt. to 14 pt., document tool 102 may cause the font size associated with a document 120*a*, currently displayed by text editor 112 and/or editing tool 114, to increase from 12 pt. to 14 pt. However, document tool 102 may continue to apply the default font size of 12 pt. to any future documents 120*b* created and/or editing by user 104 using document tool 102. In some embodiments, changes made by user 104 to one or more settings associated with document 120, through button 232, may correspond to changes to the default settings offered by document tool 102. Further details associated with the settings accessible to user 104 through button 232 are presented below, in the discussion of FIG. 14.

vii. Accessing Instructional and/or Other Information

Button 228 corresponds to a button through which user 104 may access information that may be useful to the user. As an example, in certain embodiments, button 228 may be used by user 104 to access information associated with the development of document tool 102 (e.g., the current version of the tool, the creators of the tool, etc.). As another example, in certain embodiments, button 228 may be used by user 104 to access tips, suggestions, and/or instructions that user 104 may use in preparing document 120. For example, in certain embodiments, in response to user 104 interacting with button 228, document tool 102 is configured to present a tutorial to user 104. The tutorial may correspond to a guide to help the user understand how to effectively use editing tool 114. In particular, the tutorial may include a number of steps that user 104 may follow to efficiently generate and/or edit document 120. In certain embodiments, in response to user 104 interacting with button 228, document tool 102 may launch an interactive tour in which document tool 102 provides user 104 with examples of the use of various features offered by document tool 102.

As another example, in certain embodiments, button 228 may be used by user 104 to access one or more writing assignments. For example, in certain embodiments in which document tool 102 is configured to operate in multiple modes including a teacher mode (for use by a teacher 104) and a student mode (for use by a student 104). Within the teacher mode, user 104 may interact with button 228 in order to upload instructions corresponding to one or more writing assignments that he/she has assigned to his/her students. Within the student mode, user 104 may interact with button 228 in order to view the writing assignment(s) that have been assigned to him/her. In certain embodiments, one or more of the writing assignments may be associated with template(s) 126 for use by user 104 in completing the assignment.

viii. Word Count

Element 234 is configured to display information associated with the word count of document 120. For example, in certain embodiments, element 234 displays the total number of words included in document 120, a word count goal that user 104 has set for document 120, a progress towards reaching the word count goal (e.g., a percentage of the total words of document 120 to the word count goal), and/or any other suitable information associated with the number of words within document 120. In certain embodiments, element 234 is configured to update automatically as user 104 adds words to document 120 through text editor 112 and/or editing tool 114.

It should be understood that buttons/elements 214 through 234 are presented only as examples of types of buttons/elements/fields that may be displayed by GUI 110 and through which user 104 may interact with and/or otherwise obtain information from document tool 102. This disclosure contemplates that GUI 110 may include all, some, or none of buttons/elements/fields 214 through 234, and that a person of ordinary skill would recognize that GUI 110 may display any number of other interactive buttons, elements, and/or fields through which user 104 may access information, settings, and/or features offered by document editing tool 102.

B. Editing Tools

Figure 6:
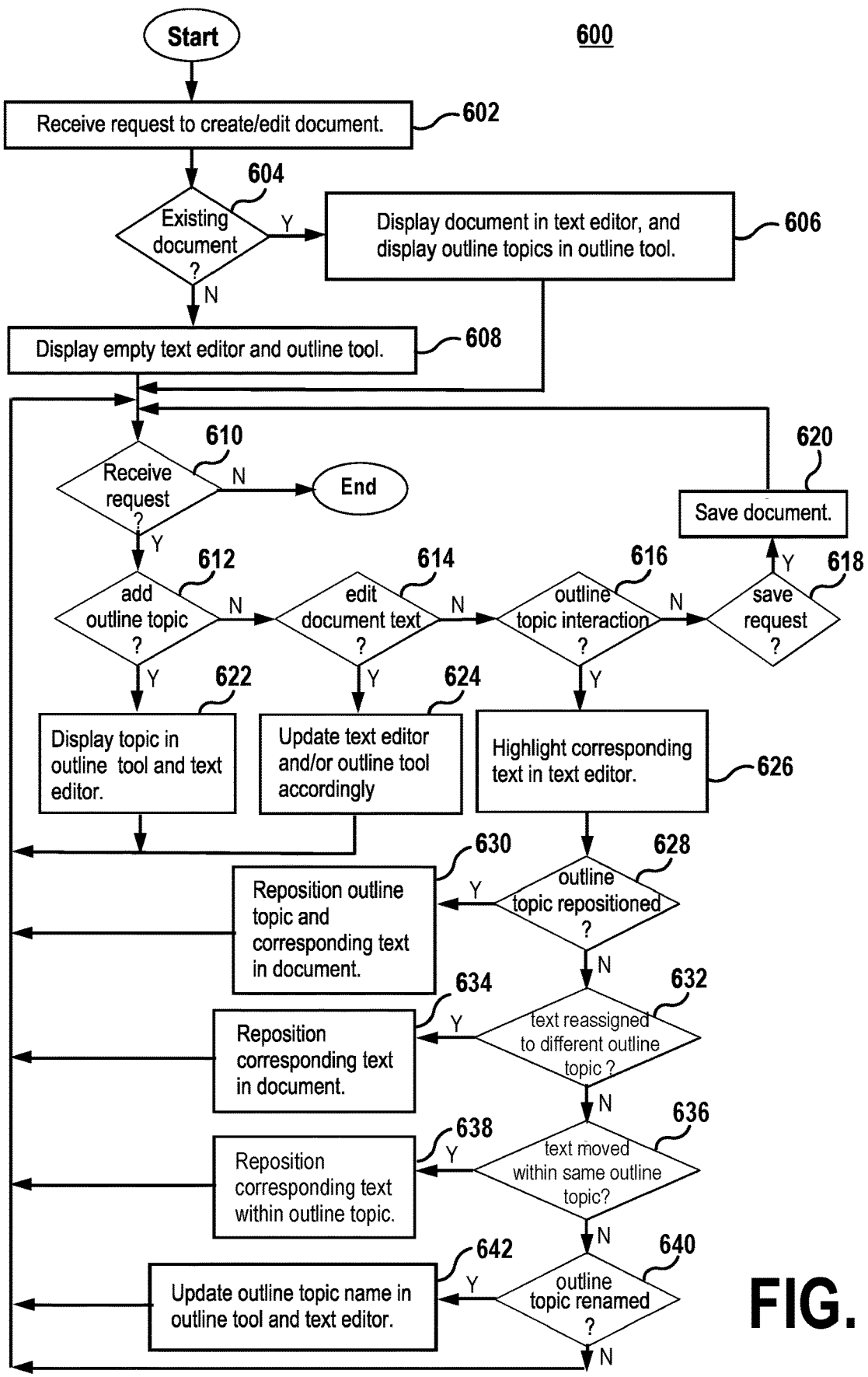
FIG. 6 presents a flowchart illustrating an example method by which the outline tool displayed in FIG. 3A may be used to organize the contents of a document.
Figure 7A:
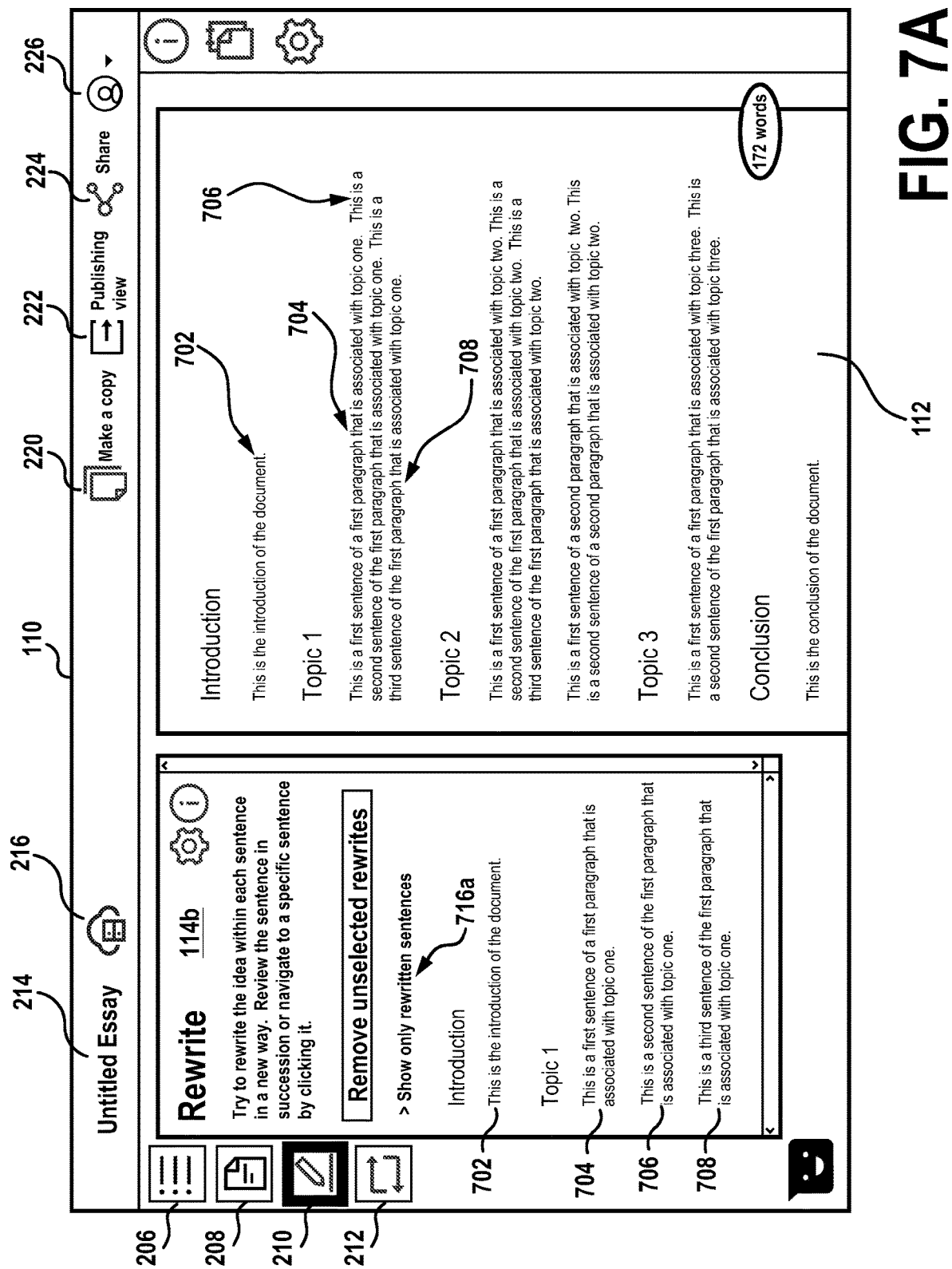
FIG. 7A illustrates the graphical user interface generated by the document tool of the system of FIG. 1 displaying the text editor and the integrated editing tool in the form of a sentence rewrite tool.
Figure 7B:
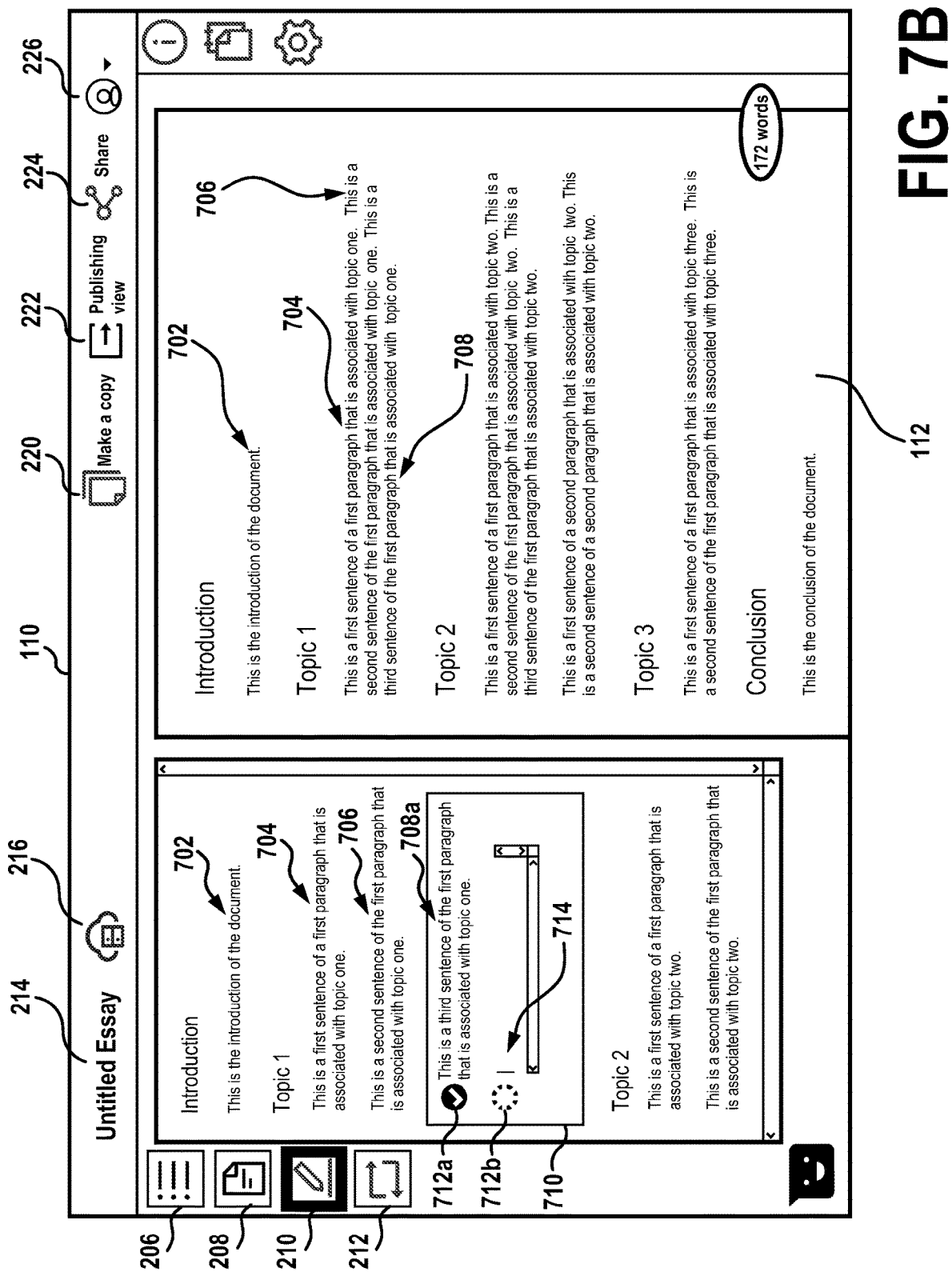
FIG. 7B through 7D present an example illustrating the use of the integrated sentence rewrite tool displayed in FIG. 7A to generate and select from amongst sentence variants for sentences of a document.
Figure 7C:
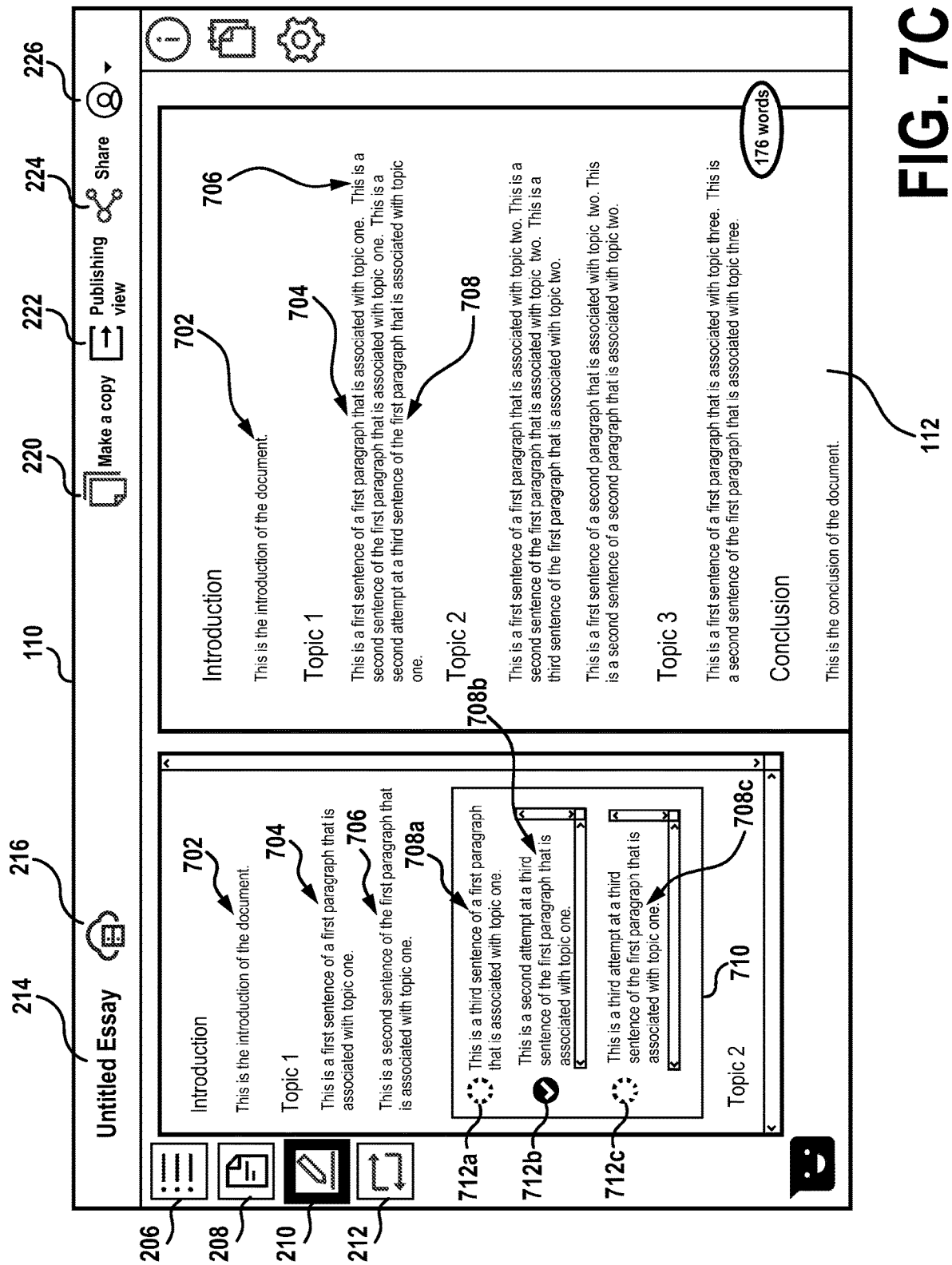
Figure 7D:
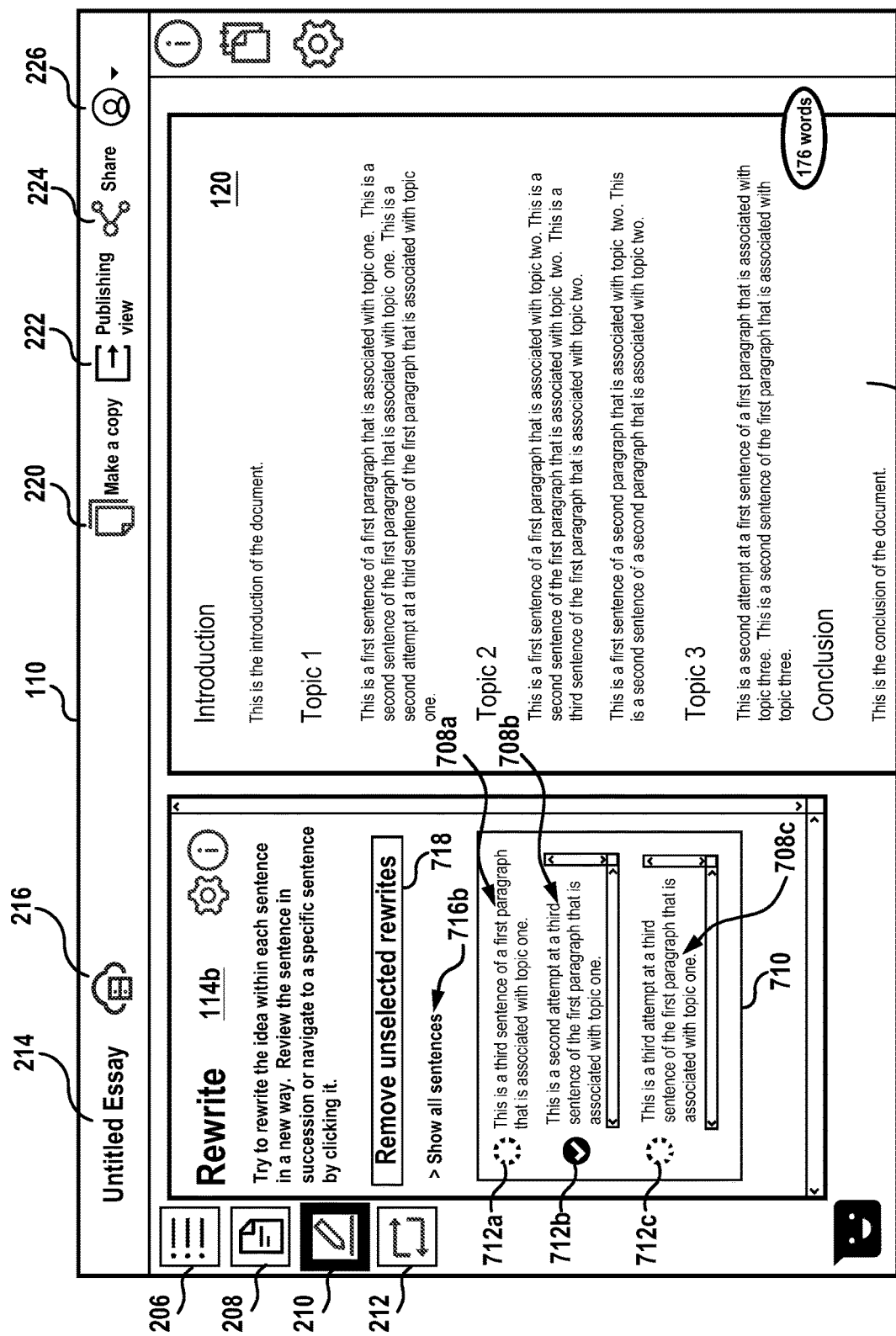
Figure 8:
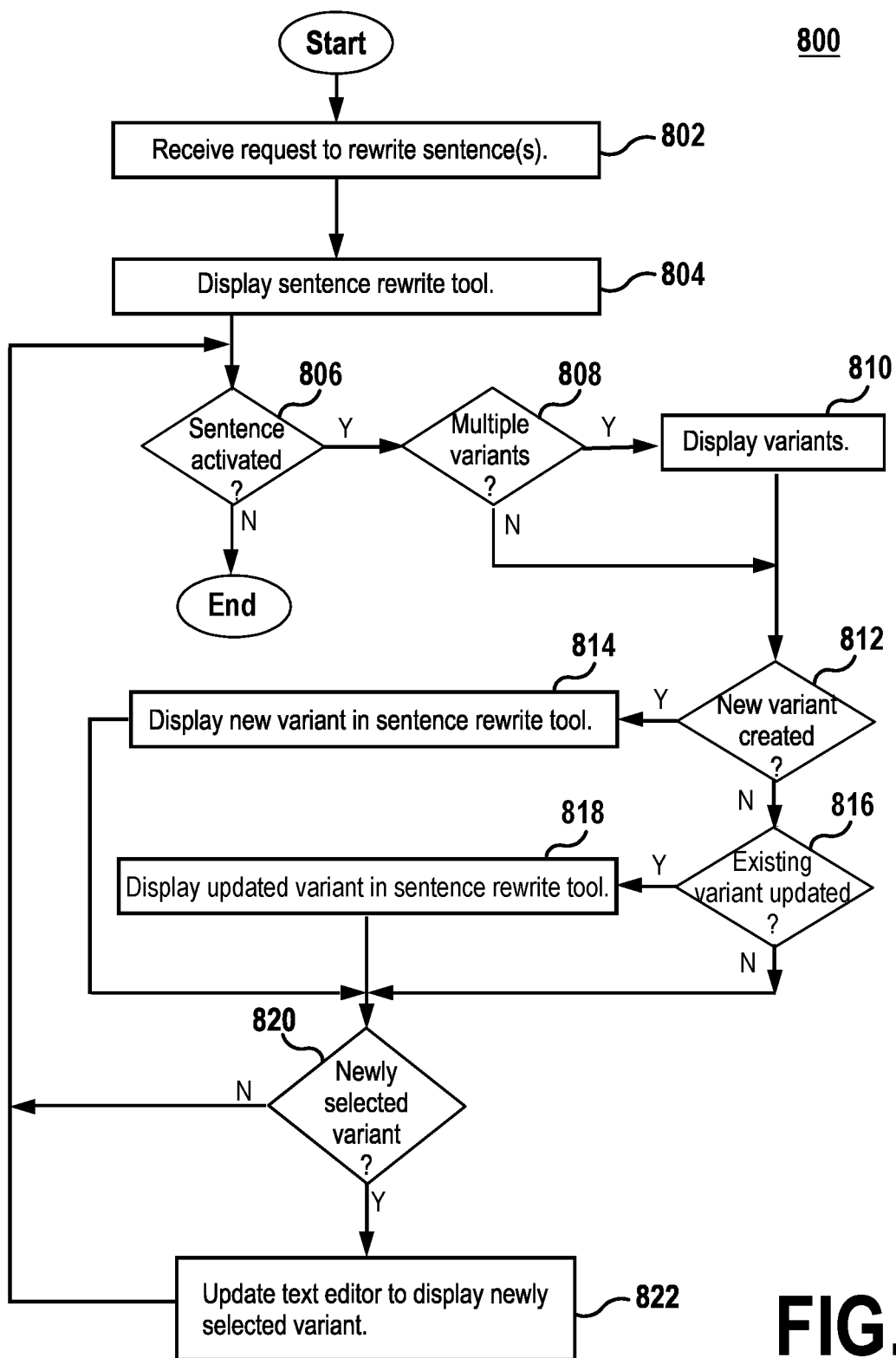
FIG. 8 presents a flowchart illustrating an example method by which the sentence rewrite tool displayed in FIG. 7A may be used to generate and select from amongst sentence variants for sentences of a document.

FIGS. 3A through 11 illustrate the use of the various forms of editing tool 114, in conjunction with text editor 112, to create and/or edit documents 120. In particular, FIGS. 3A through 6 illustrate the use of editing tool 114 in the form of an outline tool 114*a*, FIGS. 7A through 8 illustrate the use of editing tool 114 in the form of a sentence rewrite tool 114*b*, and FIGS. 9A through 11 illustrate the use of editing tool 114 in the form of a sentence reorder tool 114*c*. While the below discussion specifically describes the use of outline tool 114*a*, sentence re-write tool 114*b*, and sentence reorder tool 114*c*, this disclosure contemplates that one of ordinary skill in the art would recognize that editing tool 114 may take a variety of different forms in addition to those presented herein, each of which may be integrated with text editor 112 and used to create and/or edit documents 120.

i. Outline Tool

User 104 may use outline tool 114*a* to plan and/or organize the structure of a document 120. In certain embodiments, outline tool 114*a* is the default form for editing tool 114, such that editing tool 114 takes the form of outline tool 114*a* when document tool 102 initially displays GUI 110. In some embodiments, user 104 may switch editing tool 114 from any of the other forms it may take (e.g., sentence rewrite tool 114*b*, sentence reorder tool 114*c*) to outline tool 114*a* by selected button 206 on GUI 110. As illustrated in FIGS. 3A through 5C, in certain embodiments, button 206 may be highlighted on GUI 110 when editing tool 114 takes the form of outline tool 114*a*.

Figure 3A:
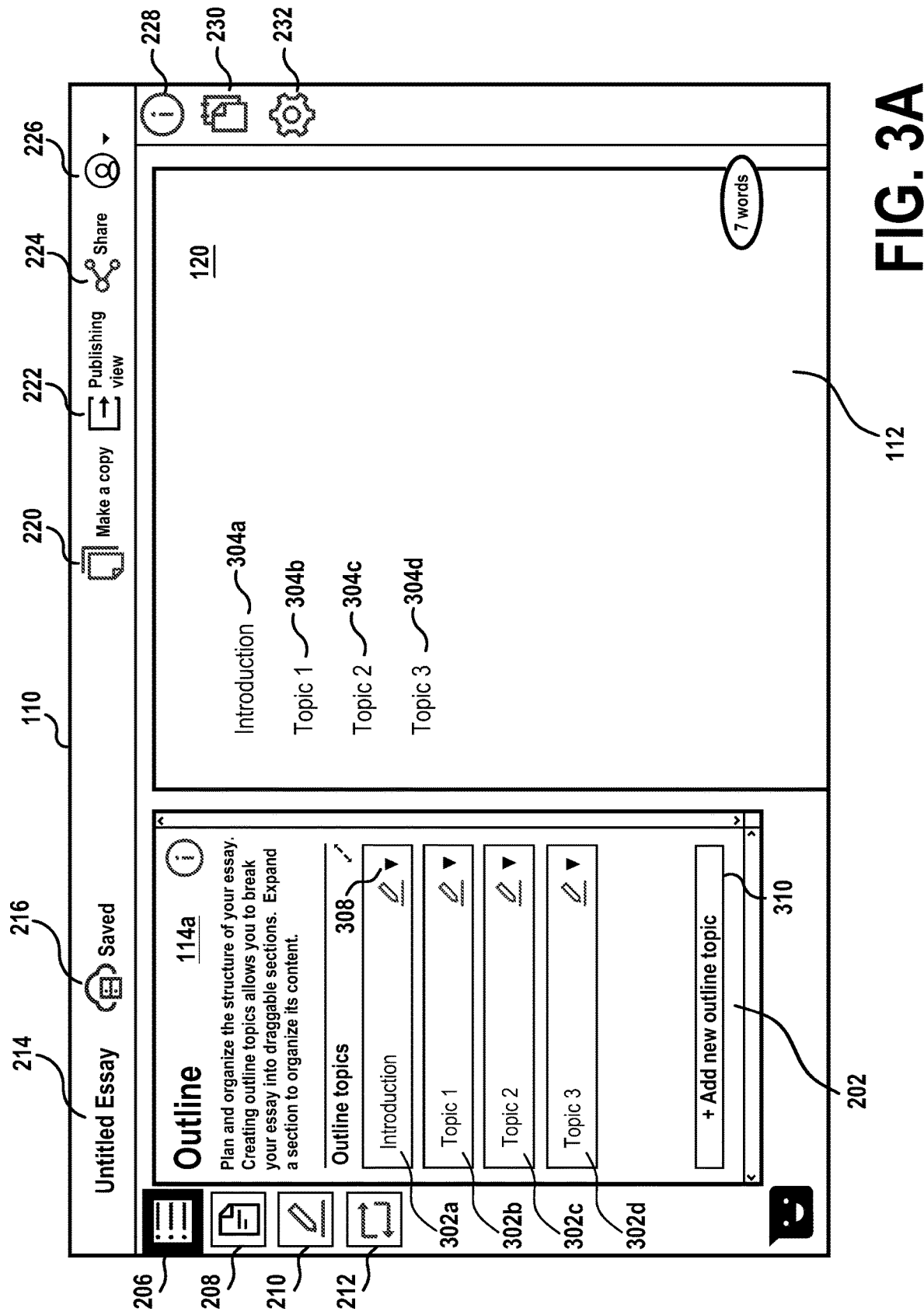
FIG. 3A illustrates the graphical user interface generated by the document tool of the system of FIG. 1 displaying the text editor and the integrated editing tool in the form of an outline tool.
Figure 3B:
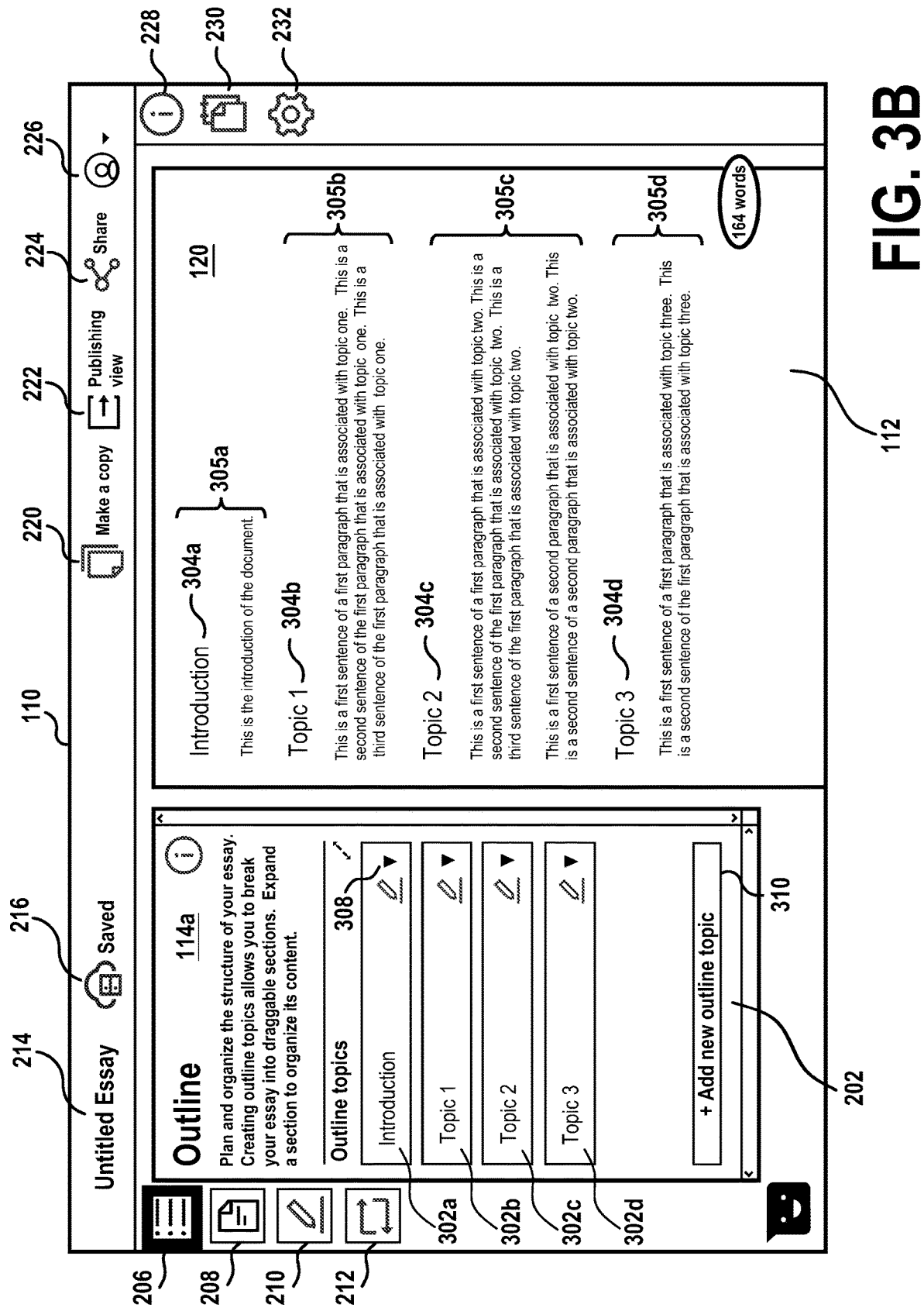
FIGS. 3B through 3E present an example illustrating the use of the integrated outline tool displayed in FIG. 3A to organize the contents of a document according to a set of outline topics.
Figure 3C:
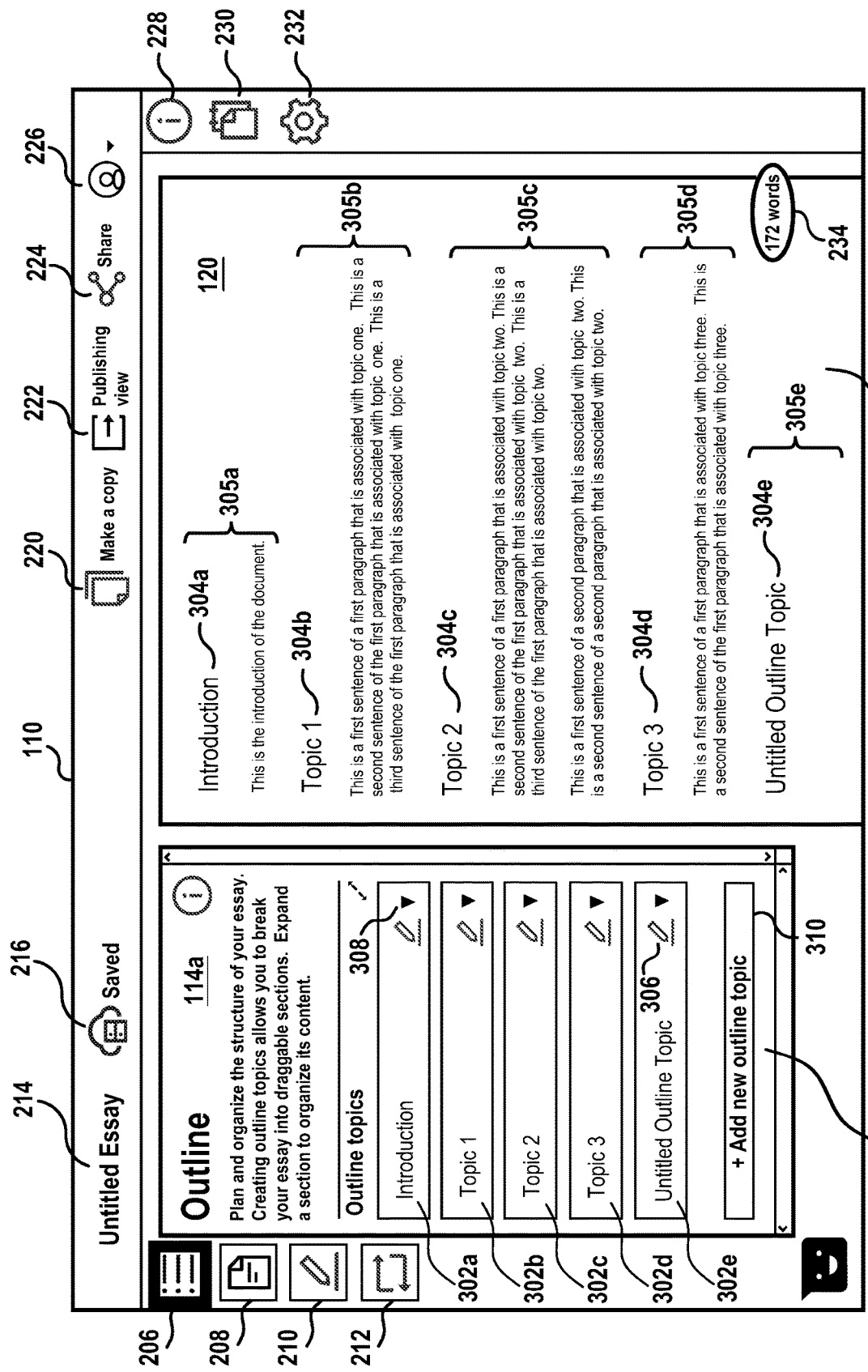
Figure 3D:
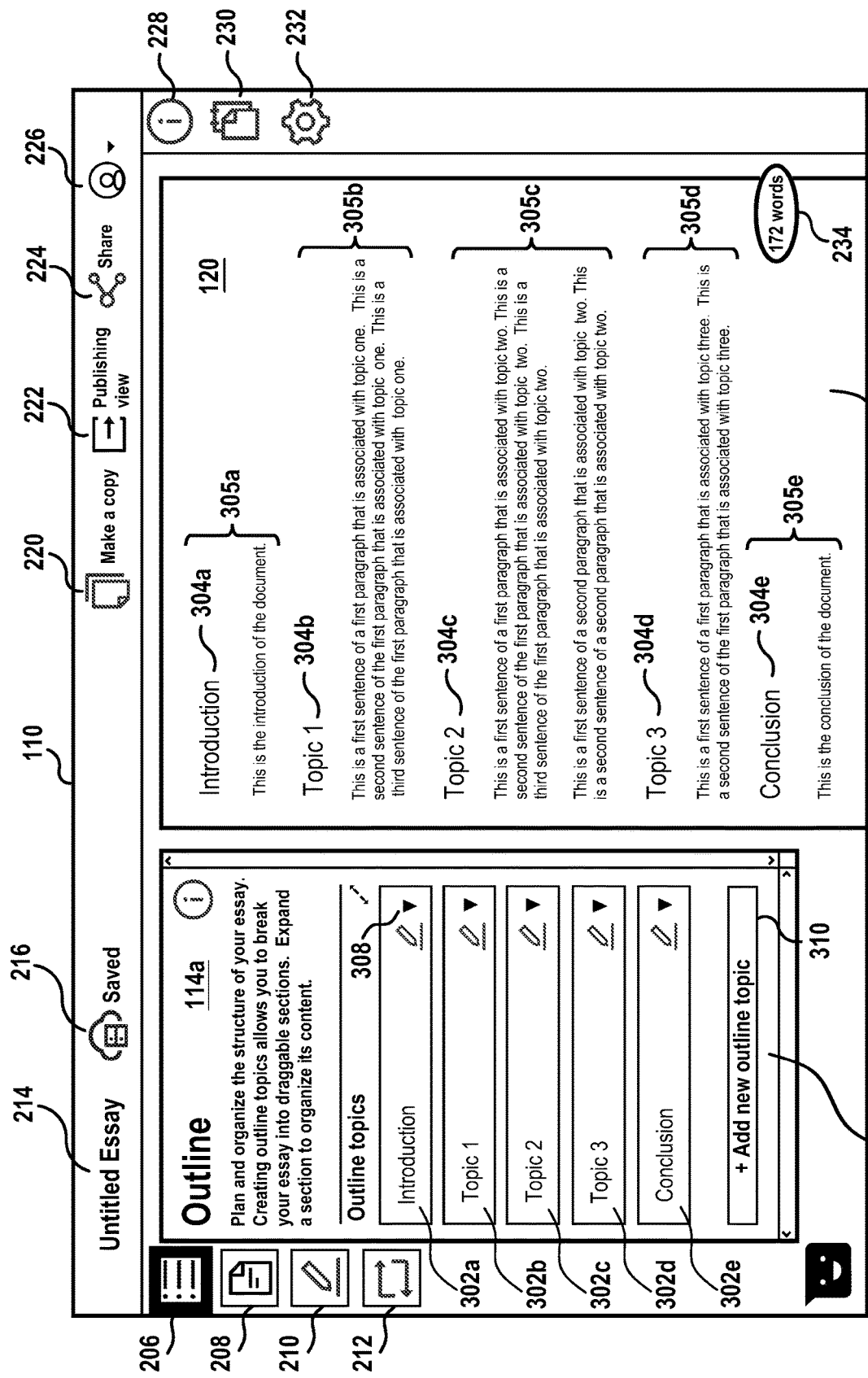
Figure 3E:
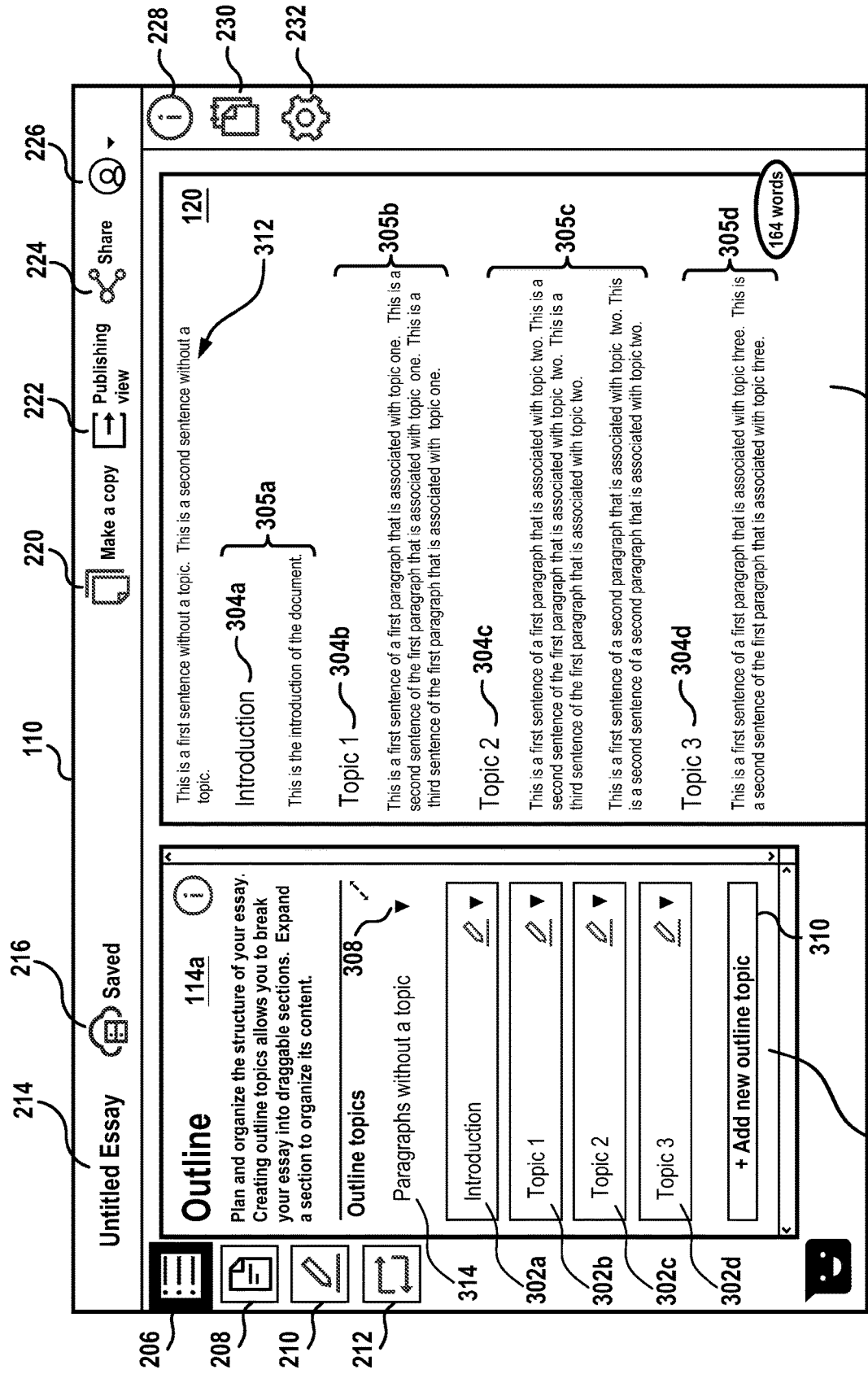
Figure 4A:
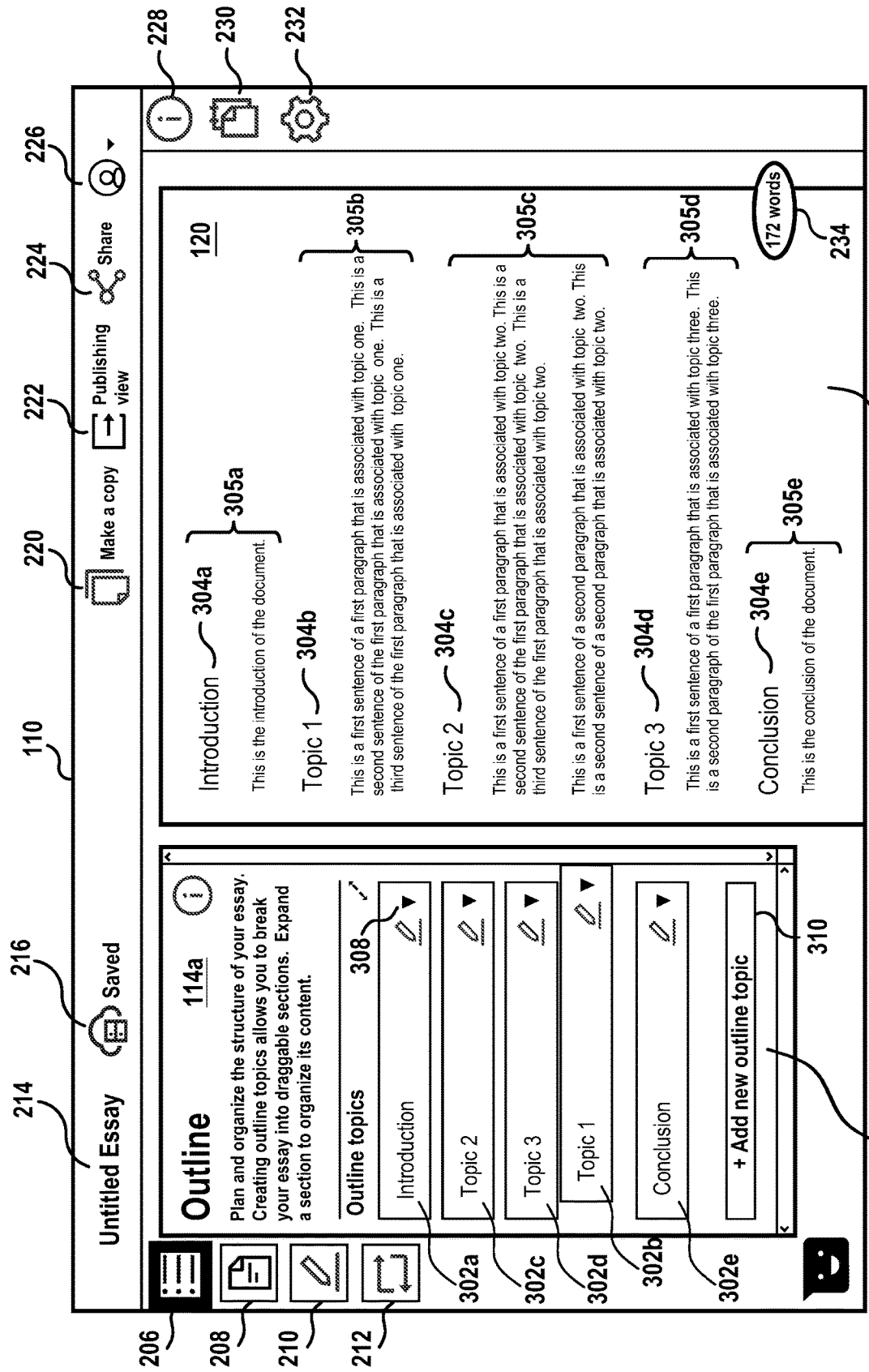
FIGS. 4A and 4B present an example illustrating the use of the outline tool of FIG. 3A to reorganize the contents of a document, by reordering the outline topics within the document.
Figure 4B:
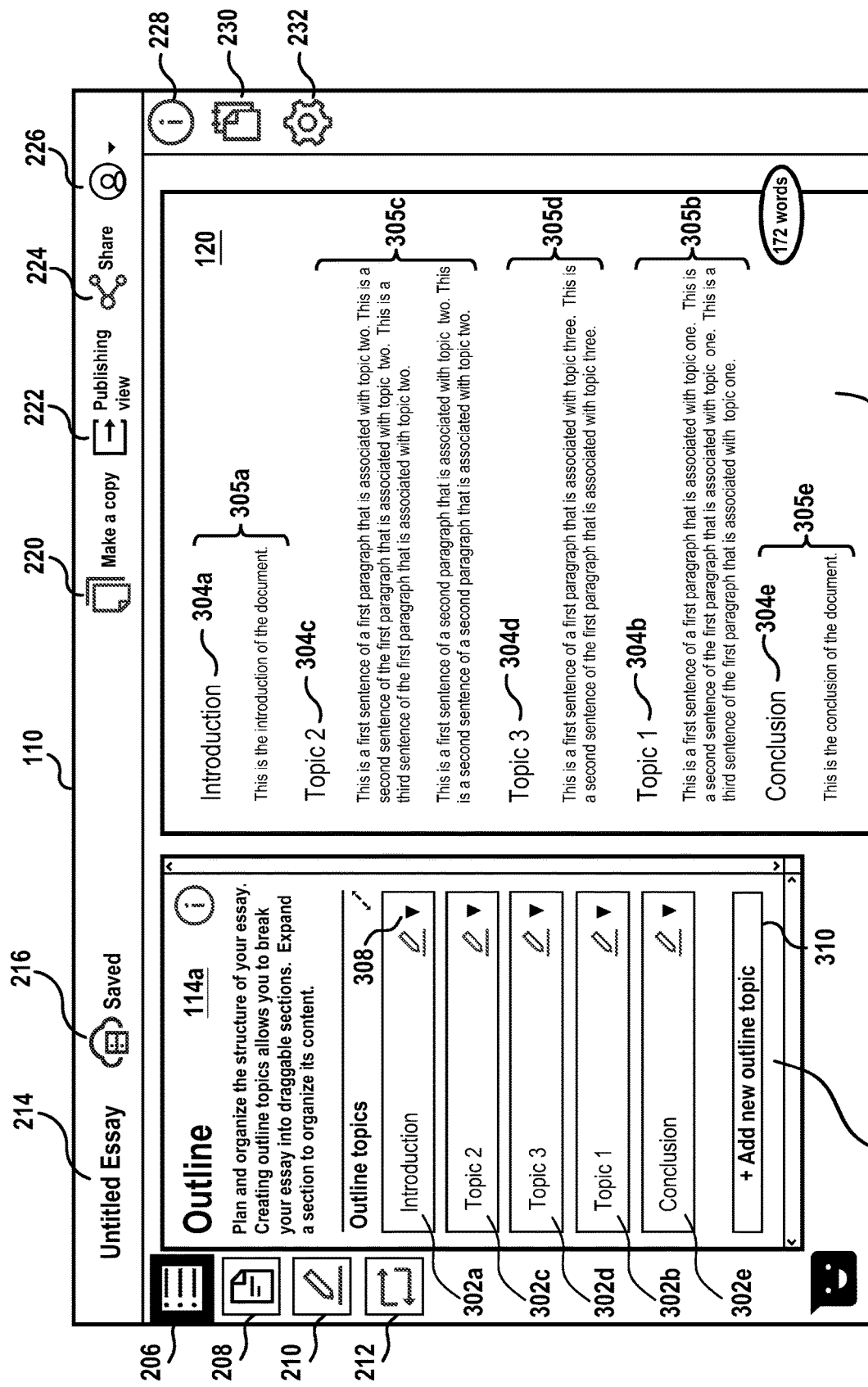
Figure 5A:
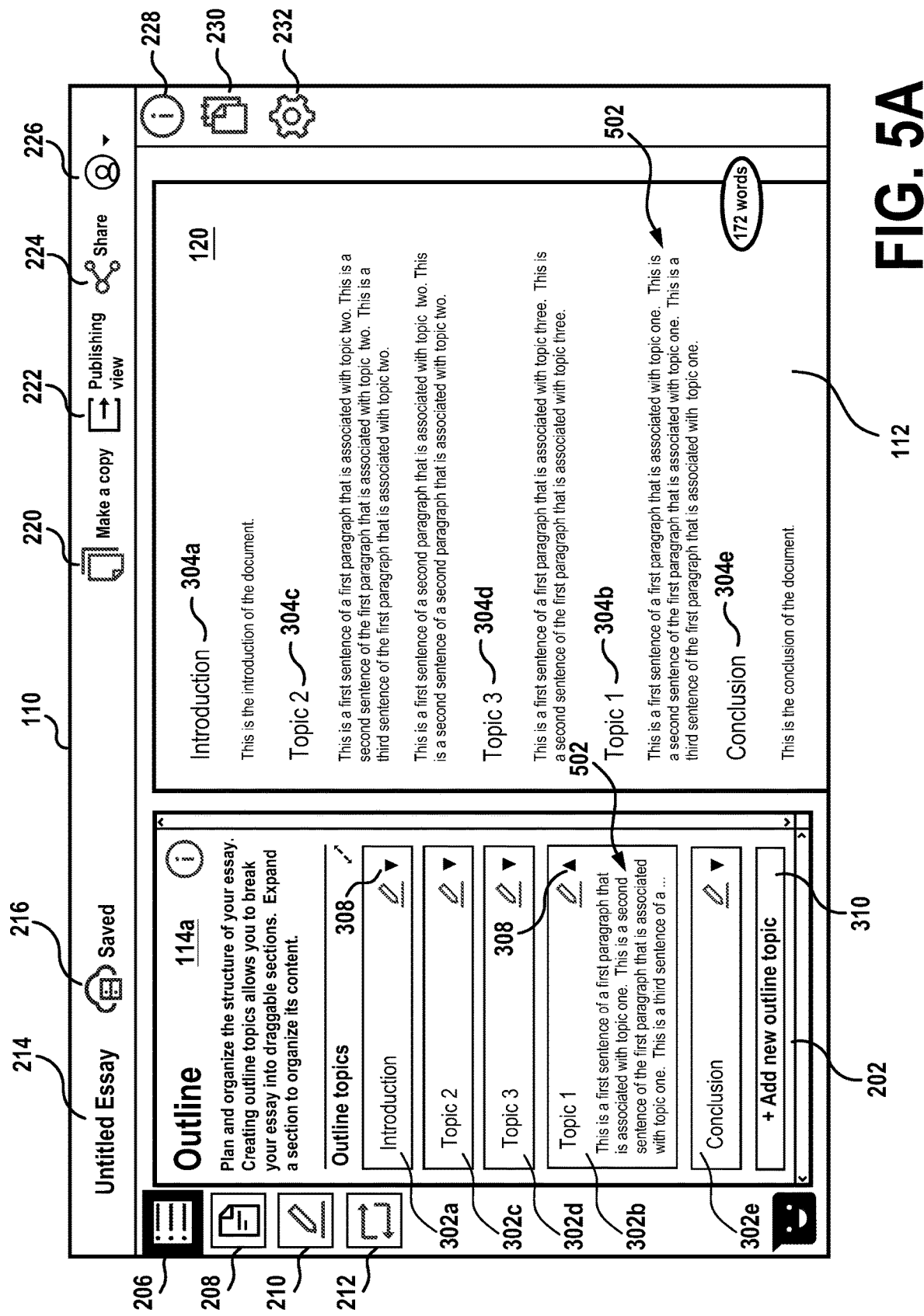
FIGS. 5A through 5C present another example illustrating the use of the integrated outline tool of FIG. 3A to reorganize the contents of a document, by moving portions of the document from one outline topic to another.
Figure 5B:
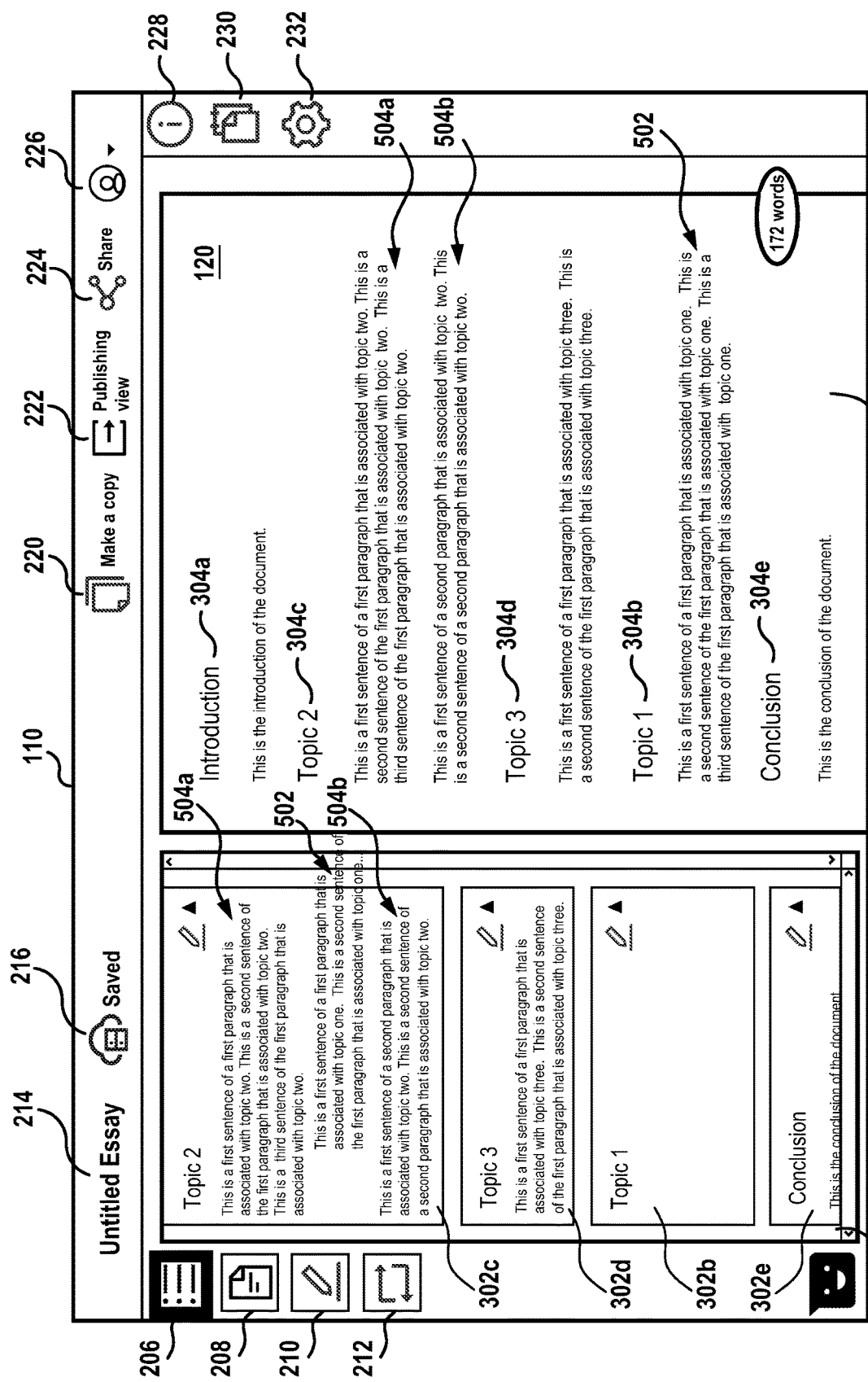
Figure 5C:
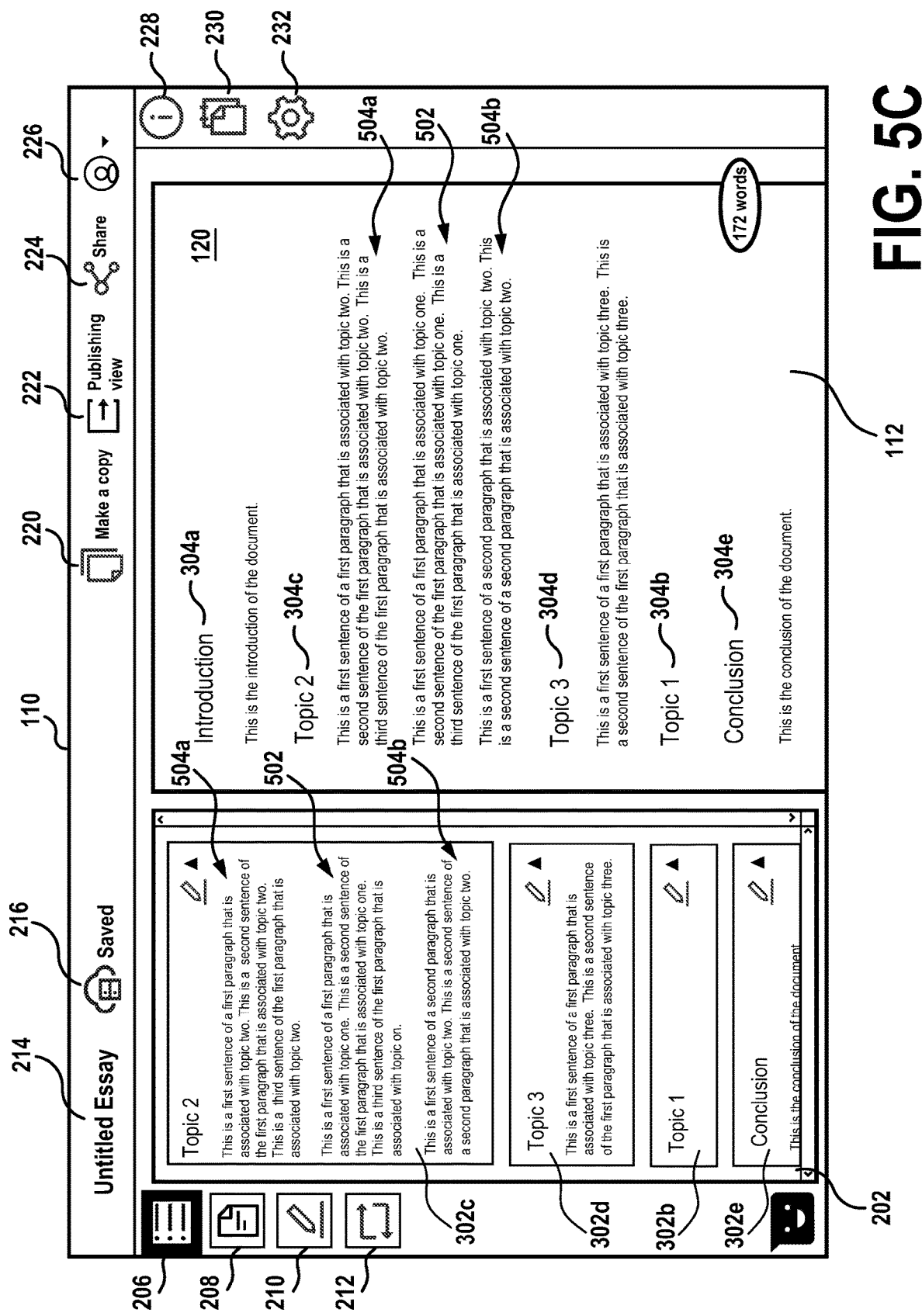

FIGS. 3A through 5C illustrate the use of outline tool 114*a* to organize the content of document 120 according to a set of outline topics, and to use those outline topics to adjust the position of the associated document content within document 120. In particular, FIGS. 3A through 3E illustrate the use of outline tool 114*a* to add outline topics to document 120, in order to plan the structure of document 120. In particular, the outline topics added to document 120 may be used to organize the content of document 120 into a sequence of parts, each of which is associated with a given outline topic. FIGS. 4A through 5C then illustrate the use of outline tool 114*a* to reorder the content of document 120, with the aid of the outline topics. Specifically, FIGS. 4A and 4B illustrate the use of outline tool 114*a* to reorder outline topics and their associated parts within document 120, while FIGS. 5A through 5C illustrate the use of outline tool 114*a* to reorder individual paragraphs within document 120.

a. Organizing a Document into a Set of Outline Topics

As explained above, FIGS. 3A through 3E illustrate the use of outline tool 114*a* to structure the content of document 120 according to a set of outline topics 304*a* through 304*e*. In certain embodiments, user 104 may use outline tool 114*a* to plan the structure of document 120, prior to adding any sentences/paragraphs to the document. For example, FIG. 3A presents an example in which a set of four outline topics 304a through 304d have been used to structure document 120. In certain embodiments, user 104 may add outline topics 304a through 304d to document 120 using outline tool 102, as described in detail below, in the discussion of FIGS. 3C and 3D. In some embodiments, user 104 may instruct document tool 102 to load a template 126 from database 124, which already includes outline topics 304a through 304d. While this disclosure refers to outline topics 304a through 304d as forming a part of the content of document 120, in certain embodiments, outline topics 304a through 304d are not part of the "publishable" content of document 120. For example, in some embodiments, outline topics 304a through 304d are used for organizational purposes only and are not included in the content of document 120 that is printed to generate a physical document, and/or exported for display in an external application.

When user 104 adds "publishable" content to document 120 (e.g., sentences, paragraphs, lists, figures, tables, etc.), document tool 102 assigns that content to the outline topic according to which the content is organized. For example, FIG. 3B illustrates an example in which sentences and paragraphs have been added to document 120 and organized according to the set of outline topics 304a through 304d. As illustrated in FIG. 3B, outline topics 304a through 304d are used to group the content of document 120 into a sequence of four parts 305a through 305d, each of which is associated with an outline topic of the set of outline topics 304a through 304d and includes a portion of the content of document 120 that is located between the associated outline topic and the next outline topic (if any) that appears in the document. For example, first part 305a is associated with first outline topic 304a (named "Introduction") and includes the portion of document 120 that is located between first outline topic 304a and second outline topic 304b (e.g., "This is the introduction of the document."). Similarly, second part 305b is associated with second outline topic 304b (named "Topic 1") and includes the portion of document 120 that is located between second outline topic 304b and third outline topic 304c; third part 305c is associated with third outline topic 304c (named "Topic 2") and includes the portion of document 120 that is located between third outline topic 304c and fourth outline topic 304d; and fourth part 305d is associated with fourth outline topic 304d (which is named "Topic 3") and includes the portion of document 120 that is located between fourth outline topic 304d and the end of document 120. While, in the example illustrated in FIG. 3B, the content of document 120 that is included in each part 305a through 305d includes sentence(s) and/or paragraph(s), this disclosure contemplates that any type of document content may be included in a given part of the set of parts 305a through 305d of document 120. For example, the document content included in a given part of parts 305a through 305d may include one or more headings, sub-headings, lists, images, and/or any other suitable document content.

Each outline topic 304a through 304d and its associated document content, which together makes up a part of the sequence of parts 305a through 305d displayed by text editor 112, is linked to a corresponding outline topic element 302a through 302d of a sequence of outline topic elements that is displayed by outline tool 114a. As illustrated in FIGS. 3A and 3B, in certain embodiments, each outline topic element 302a through 302d is configured to display the name of the outline topic 304 to which it is linked. For example, as illustrated in FIG. 3B, outline topic element 302a is linked to first part 305a and displays the name of outline topic 304a (e.g., "Introduction"); outline topic element 302b is linked to second part 305b and displays the name of outline topic 304b (e.g., "Topic 1"); outline topic element 302c is linked to third part 305c and displays the name of outline topic 304c (e.g., "Topic 2"); and outline topic element 302d is linked to fourth part 305d and displays the name of outline topic 304d (e.g., "Topic 3"). In certain embodiments, each outline topic element 302a through 302d may be configured to display additional content of document 120 (e.g., content to which the outline topic element is linked). For example, each outline topic element 302a through 302d may be configured to display all or a portion of the content displayed by the part of the sequence of parts 305a through 305d, to which the outline topic element is linked. In certain embodiments, the document content displayed by each outline topic element 302a through 302d is adjustable by user 104. For example, each outline topic element 302a through 302d may include an interactive button 308 through which user 104 may interact to adjust the document content displayed by the outline topic element. For instance, user 104 may interact with button 308 of outline topic element 302a to cause outline topic element 302a to switch between displaying (1) a portion of the document content associated with linked part 305a (e.g., the name of the linked outline topic 304a), and (2) the entire document content associated with linked part 305a (e.g., the name of the linked outline topic 304a and any sentences/paragraphs associated with outline topic 304a).

While FIG. 3B illustrates an example in which each part 305a through 305d of document 120 is associated with an outline topic of the set of outline topics 304a through 304d, in certain embodiments, a part of document 120 may not be associated with any of outline topics 304a through 304d. For example, FIG. 3E illustrates an embodiment in which document 120 includes a first paragraph 312 that is located before first outline topic 304a, and is therefore not associated with any of outline topics 304a through 304d (and, equivalently, does not belong to any of parts 305a through 305d, each of which is associated with an outline topic of outline topics 304a through 304d). In certain embodiments in which a part of document 120 (e.g., paragraph 312) is not associated with any of outline topics 304a through 304d, document tool 102 is configured to generate a special outline topic element 314 and to link the part of document 120 (e.g., paragraph 312) that is not associated with any outline topics to the special outline topic element 314. As illustrated in FIG. 3E, because special outline topic element 314 is not associated with any of outline topics 304a through 304d, it does not display the name of any of outline topics 304a through 304d. In certain embodiments, special outline topic element 314 displays a descriptive label indicating that the document content associated with the element (e.g., paragraph 312) is not associated with any outline topics included within document 120. For example, as illustrated in FIG. 3E, special outline topic element 314 may display the label "Paragraphs without a topic," to indicate that the document content that is linked to the element is not associated with any of outline topics 304a through 304d. As illustrated in FIG. 3E, in certain embodiments, the label displayed by special outline topic element 314 is not part of the content ("publishable" or otherwise) of document 120 (e.g., is not displayed by text editor 112).

As mentioned above, outline topics 304a through 304d (each corresponding to a linked outline topic element of the sequence of outline topic elements 302a through 302d) may be added to document 120 in any suitable manner. As an example, user 104 may add anew outline topic 304 to document 120 by interacting with button 310 displayed by outline tool 114a in first region 202 of GUI 110. User 104 may interact with button 310 in any suitable manner. For example, in embodiments in which display 108 is a touch-screen display, user 104 may interact with button 310 by touching display 108 at the location of button 310. In some embodiments, user 104 may interact with button 310 using a mouse/trackpad. For example, user 104 may use a mouse/trackpad to interact with button 310 by clicking on button 310, double-clicking on button 310, hovering over button 310, or interacting with button 310 in any other suitable manner.

FIGS. 3C and 3D present an example of the behavior of outline tool 114a in response to user 104 interacting with button 310 to generate a new outline topic. As illustrated in FIG. 3C, in response to user 104 interacting with button 310, document tool 102 is configured to create a new outline topic element 302e and to display the new outline topic element in outline tool 114a. Document tool 102 is also configured to create a new part 305e within document 120 that is linked to the new outline topic element, and to display the new part in text editor 112. The new part 305e includes the new outline topic 304e. In certain embodiments, and as illustrated in FIG. 3C, in response to user 104 interacting with button 310, document tool 102 is configured to automatically assign a name to the new outline topic 304e generated by the tool. For instance, document tool 102 may assign a generic name such as "Untitled Outline Topic," "New Outline Topic," and/or any other suitable name to the newly generated outline topic. User 104 may then edit this generic name. This disclosure contemplates that user 104 may edit the automatically assigned, generic outline topic name in any suitable manner. As an example, in certain embodiments, user 104 may edit the name assigned to outline topic 304e using button 306. For instance, in response to user 104 interacting with button 306, the name of outline topic 304e, as displayed by outline topic element 302e, may become an editable field with which the user may interact. The user may then enter a new name for the outline topic into the editable field. As another example, user 104 may edit the automatically generated name for outline topic 304e directly within text editor 112. FIG. 3D illustrates an example in which user 104 has updated the name of outline topic 304e from "Untitled Outline Topic" to "Conclusion." User 104 may also edit any of the names previously assigned to outline topics 304a through 304d in a similar manner (e.g., by interacting with buttons 306 and/or by editing the names within text editor 112).

As another example of the manner by which a new outline topic 304e (corresponding to linked outline topic element 302e) may be added to document 120, in certain embodiments user 104 may add a new outline topic 304e to document 120 by entering text associated with the new outline topic 304e into text editor 112. For instance, user 104 may indicate to text editor 112 that the text he/she is about to enter corresponds to the name of a new outline topic 304e by, for example, right clicking within text editor 112 and selecting an outline topic text type. User 104 may then enter text corresponding to the name of the new outline topic 304e (e.g., "Conclusion") into text editor 112. In response to user 104 creating a new outline topic 304e by entering text corresponding to the new outline topic into text editor 112, document tool 102 is configured to generate a corresponding outline topic element 302e that is linked to the new outline topic 304e, and to display the new outline topic element 302e within outline tool 114a.

As illustrated in FIGS. 3C and 3D, the newly added outline topic 304e is associated with a new part 305e of document 120, to which user 104 may add content. User 104 may add content to new part 305e in any suitable manner. For example, user 104 may use text editor 112 to enter new content into document 120 at a location in text editor following outline topic 304e (e.g., user 104 may enter the sentence "This is the conclusion of the document." at a location following outline topic 304e, in text editor 112). Document tool 102 then links the new document content to the corresponding outline topic element 302e, displayed by outline tool 114a.

While FIGS. 3C through 3D present an example in which user 104 uses outline tool 114a and/or text editor 112 to add new outline topics (e.g., outline topic 304e) to document 120, this disclosure contemplates that document tool 102 may arrange the content of document 120 according to a set of outline topics 304a through 304e in any suitable manner. As an example, in certain embodiments, document tool 102 may be configured to automatically assign each paragraph of document 120 to its own outline topic. As another example, in certain embodiments, document tool 102 may be configured to identify one or more headings within document 120 and generate an outline topic for each identified heading. For example, in certain embodiments, document tool 102 may be configured to import an existing document 120, generated using an external text editor, into the tool. As part of the importation process, document tool 102 may automatically convert the headings included in the imported document into a set of outline topics.

In certain embodiments, document tool 102 may use a machine learning algorithm stored as part of instructions 132 in memory 130 to arrange the content of document 120 into a set of outline topics. For instance, in response to user 104 generating a document 120 that does not include any outline topics (e.g., by typing words into text editor 112), document tool 102 may be configured to apply a machine learning algorithm to the content of the document, to split the content into a set of parts and to assign each part to an outline topic. For example, the machine learning algorithm may be configured to split the paragraphs of document 120 into groups of one or more sequential paragraphs (based on, for example, (1) shared features exhibited by the paragraphs within each group, (2) at least a threshold similarity score calculated between pairs of paragraphs within each group, and/or (3) any other suitable measure of relatedness), and to assign each group of one or more sequential paragraphs to an outline topic. As a specific example, user 104 may use text editor 112 to generate a document 120 that corresponds to a biography of a famous person. The first three paragraphs of the biography may provide details of the famous person's childhood, the next five paragraphs may describe the famous person's early career, and the last four paragraphs may describe an idea/action for which the famous person is known. The machine learning algorithm may be configured to process the paragraphs of the document (e.g., using natural language processing techniques) and to assign the first three paragraphs to a first group of similar paragraphs, the next five paragraphs to a second group of similar paragraphs, and the last four paragraphs to a third group of similar paragraphs. Document tool 102 may then assign each group of paragraphs to an outline topic.

Document tool 102 may use any suitable machine learning algorithm to arrange the content of document 120 into a set of outline topics. For example, in certain embodiments, the machine learning algorithm may be an unsupervised classification algorithm. In certain embodiments, the machine learning algorithm may include a neural network model, a K-means clustering algorithm, and/or any other suitable machine learning algorithm. In certain embodiments, user 104 may specify a particular number of outline topics into which the machine learning algorithm is to organize the content of document 120. In some embodiments, the machine learning algorithm may be designed to choose the number of outline topics into which to organize the content of document 120.

b. Reordering Document Content

After outline topics 304a through 304e have been used to organize the content of document 120 into a set of parts 305a through 305e, outline tool 114a may be used to efficiently reorganize the content of document 120 (e.g., reorder the sequence of parts 305a through 305e within document 120 and/or move document content between two or more of parts 305a through 305e of document 120). In particular, user 104 may use outline tool 114a to modify the order in which content is presented within document 120, as displayed by text editor 112, by performing a corresponding modification to outline topic elements 302a through 302e, each of which is linked to a corresponding part of the sequence of parts 305a through 305e of document 120. By enabling a user to reorganize content within a multi-page document using outline topic elements 302a through 302e displayed within outline tool 114a rather than scrolling through the document content displayed within text editor 112 and copying/pasting content from one location within the document to another, certain embodiments conserve significant processing resources as compared with existing text editors. FIGS. 4A through 5C present two examples of the use of outline tool 114a to reorganize the content of document 120.

As a first example of the manner by which user 104 may use outline tool 114a to reorder the content of document 120, FIGS. 4A and 4B illustrate the use of outline topic elements 302a through 302e to reorder the sequence of parts 305a through 305e within document 120. In particular, FIGS. 4A and 4B illustrate an example in which user 104 repositions second part 305b (including "Topic 1" outline topic 304b and its associated document content) from a first position within document 120 (located between first part 305a and third part 305c), to a second position within document 120 (located between fourth part 305d and fifth part 305e), by repositioning outline topic element 302b (which is linked to second part 305b) within the sequence of outline topic elements 302a through 302e displayed by outline tool 114a. Specifically, FIG. 4A illustrates the movement of outline topic element 302b (which is linked to second part 305b) from a first position within the sequence of outline topic elements displayed by outline tool 114a on region 202 of GUI 110 (located between first outline topic element 302a and third outline topic element 302c), to a second position within the sequence of outline topic elements displayed by outline tool 114a on region 202 (located between fourth outline topic element 302d and first outline topic element 302e). User 104 may move outline topic element 302b within first region 202 of GUI 110 in any suitable manner. As an example, in certain embodiments in which display 108 corresponds to a touch screen display, user 104 may move outline topic element 302b from the first position on first region 202 to the second position on first region 202 by touching the display at the location of outline topic element 302b and dragging his/her finger from the first position on region 202 to the second position on region 202. As another example, in some embodiments, user 104 may move outline topic element 302b from the first position on region 202 of GUI 110 to the second position on region 202 by using a mouse/trackpad to select outline topic element 302b (e.g., by clicking on outline topic element 302b) and to drag the outline topic element from the first position on region 202 to the second position on region 202.

In response to a user 104 repositioning outline topic element 302b from the first position on region 202 (located between first outline topic element 302a and third outline topic element 302c) to the second position on region 202 (located between fourth outline topic element 302d and fifth outline topic element 302e), document tool 102 is configured to update the content displayed by both outline tool 114a and text editor 112. FIG. 4B illustrates the result of such update. In particular, as illustrated in FIG. 4B, document tool 102 updated the sequence of outline topic elements 302a through 302e displayed by outline tool 114a, such that outline topic element 302b is positioned between outline topic element 302d and outline topic element 302e. Similarly, document tool 102 performed a corresponding update on the sequence of parts 305a through 305e displayed by text editor 112, such that second part 305b is positioned between fourth part 305d and fifth part 305e.

As a second example of the manner by which user 104 may use outline tool 114a to reorder the content of document 120, FIGS. 5A through 5C illustrate the use of outline tool 114a to reposition a given paragraph 502 within document 120. As illustrated in FIG. 5A, paragraph 502 is associated with "Topic 1" outline topic 304b in document 120. If user 104 desires to reposition paragraph 512, but not "Topic 1" outline topic 304b, within document 120, user 104 may interact with button 308 of outline topic element 302b, which is linked to outline topic 304b and its associated document content, to cause outline topic element 302b to display paragraph 502. User 104 may then move paragraph 502, as displayed in outline tool 114a, from a first position on region 202 of GUI 110 (within outline topic element 302b), to a second position on region 202 (within a new outline topic element). For example, FIG. 5B illustrates user 104 moving paragraph 502 from outline topic element 302b to outline topic element 302c. User 104 may move paragraph 502, as displayed in outline tool 114a, in any suitable manner. For example, in certain embodiments in which display 108 corresponds to a touch screen display, user 104 may move paragraph 502 from the first position on first region 202 (e.g., within outline topic element 302b) to the second position on first region 202 (e.g., within outline topic element 302c) by touching the display at the location of paragraph 502 and dragging his/her finger from the first position on region 202 to the second position on region 202. As another example, in some embodiments, user 104 may move paragraph 502 from the first position on first region 202 (e.g., within outline topic element 302b) to the second position on first region 202 (e.g., within outline topic element 302c) by using a mouse/trackpad to select paragraph 502 (e.g., by clicking on paragraph 502) and to drag the paragraph from the first position on region 202 to the second position on region 202.

As illustrated in FIG. 5B, in certain embodiments, in response to user 104 selecting a paragraph (e.g., paragraph 502) displayed by a given outline topic element (e.g., outline topic element 302b) and moving the paragraph out of the given outline topic element, document tool 102 is configured to cause one or more of the other outline topic elements (e.g., outline topic element 302c) to display the document content to which those element(s) are linked. For example, as illustrated in FIG. 5B, in response to user 104 selecting paragraph 502 and moving paragraph 502 from outline topic element 302b, document tool 102 is configured to cause outline topic element 302c to display paragraphs 504a and 504b of document 120, to which outline topic element 302c is linked. User 104 may then choose to position paragraph 502 within outline topic element 302c, relative to paragraphs 504a and 504b. For example, as illustrated in FIG. 5B, user 104 may position paragraph 502 between paragraph 504a and paragraph 504b.

In response to a user 104 repositioning paragraph 502 from the first position on region 202 (located within outline topic element 302b) to the second position on region 202 (located between paragraph 504a and paragraph 504b, within outline topic element 302c), document tool 102 is configured to update the content displayed by both outline tool 114a and text editor 112. FIG. 5C illustrates the result of such update. In particular, as illustrated in FIG. 5C, document tool 102 updated the document content linked with outline topic elements 302b and 302c such that paragraph 502 is no longer linked with outline topic element 302b (e.g., outline topic element 302b is no longer configured to display paragraph 502). Instead, paragraph 502 is linked with outline topic element 302c (e.g., outline topic element 302c is configured to display paragraph 502 between paragraph 504a and paragraph 504b). Similarly, document tool 102 performed a corresponding update on the content of document 120, as displayed by text editor 112, such that paragraph 502 is positioned between paragraph 504a and paragraph 504b (and associated with "Topic 2" outline topic 304c).

In certain embodiments, using outline tool 114a to reposition/reorder content within document 120 may conserve significant computational resources, as compared with repositioning/reordering the content directly within text editor 112. For example, consider a situation in which document 120 is a multi-page document, with "Topic 1" outline topic 304b and its associated document content (e.g., part 305b of document 120) covering multiple pages, "Topic 2" outline topic 304c and its associated document content (e.g., part 305c of document 120) covering multiple pages, and "Topic 3" outline topic 304d and its associated document content (e.g., part 305d of document 120) covering multiple pages. If user 104 chooses to move "Topic 1" outline topic 304b and its associated document content (e.g., part 305b of document 120) to a position within document 120 after "Topic 3" outline topic 304d and its associated document content (e.g., part 305d of document 120), performing such reordering directly within text editor 112 would likely require user 104 to select the multiple pages of document content associated with "Topic 1" outline topic 304b, and to scroll through the multiple pages of document content associated with "Topic 2" outline topic 304c and "Topic 3" outline topic 304d in order to reposition the document content associated with "Topic 1" outline topic 304b after the document content associated with "Topic 3" outline topic 304d. On the other hand, user 104 could perform the same reordering using outline tool 114a simply by selecting a single element (outline topic element 302b) and moving that element two elements down in the sequence of outline topic elements 302a through 302e displayed by outline tool 114a c. Method of Operation

FIG. 6 presents a flowchart illustrating an example method 600 (described in conjunction with elements of FIGS. 1 through 5C) through which outline tool 114a may be used to organize/reorganize the contents of a document 120 according to a set of outline topics.

At operation 602 document tool 102 receives a request 134 to create and/or edit a document 120. At operation 604 document tool 102 determines whether document 120 is an existing document stored in database 118 or a new document to be created by the tool. If, at operation 604 document tool 102 determines that document 120 is an existing document stored in database 118, at operation 606 document tool 102 displays the content of the document in text editor 112. In particular, document tool 102 displays the content of document 102 as a sequence of parts 305a through 305e within text editor 112. Each part of the sequence of parts 305a through 305e includes an outline topic of a set of outline topics 304a through 304e, and a portion of the content of document 120 that is associated with the outline topic. Document tool 102 also displays a sequence of outline topic elements 302a through 302e in outline tool 114a. Each outline topic element of the sequence of outline topic elements 302a through 302e is linked to a corresponding part of the sequence of parts 305a through 305e. If, at operation 604 document editing tool 102 determines that document 120 does not already exist, at operation 608 document editing tool 102 displays an empty text editor 112 and an empty outline tool 114a on GUI 110.

At operation 610 document editing tool 102 determines whether it has received a request 134 from user 104. Request 134 may take any suitable form. For example, request 134 may correspond to a request to add an outline topic 304 to document 120, a request to add content to document 120, a request to remove content from document 120, a request to edit content of document 120, and/or any other suitable request associated with document 120. User 104 may cause request 134 to be transmitted to document editing tool 102 in any suitable manner. For example, in certain embodiments, user 104 may cause request 134 to be transmitted to document tool 102 by typing on a keyboard, using a mouse/trackpad to interact with GUI, speaking into a microphone, and/or interacting with GUI 110, device 106, and/or any user interface connected to device 106 in any suitable manner.

If, at operation 610 document editing tool 102 determines that it has received a request 134 from user 104, at operation 612 the tool next determines whether request 134 is a request to add an outline topic to document 120. For example, document tool 102 may determine whether user 104 generated request 134 by interacting with the "Add new outline topic" button 310 displayed by outline tool 114a. If, at operation 612 document editing tool 102 determines that request 134 is a request to add a new outline topic to document 120, at operation 622 document editing tool 102 adds the new outline topic to document 120. In particular, document editing tool 102 displays the new outline topic (e.g., outline topic 304e) within document 120 (e.g., within part 305e of document 120), as displayed by text editor 112. Document tool 102 additionally generates a new outline topic element (e.g., element 302e) corresponding to the new outline topic and displays the new outline topic element in outline tool 114a. The new outline topic element (e.g., element 302e) displayed in outline tool 114a is linked to the new outline topic displayed in text editor 112 (along with any document content associated with the new outline topic), such that any changes made by user 104 to the new outline topic element (e.g., element 302e) in outline tool 114a are reflected within text editor 112, and any changes made by user 104 to the new outline topic (e.g., outline topic 304e) and/or any document content associated with the new outline topic (e.g., the document content associated with part 305e) are correspondingly made to the linked outline topic element (e.g., outline topic element 302e) displayed in outline tool 114a. Method 600 then returns to operation 610.

If, at operation 612 document tool 102 determines that request 134 is not a request to add a new outline topic to document 120, at operation 614 document tool 102 determines whether request 134 is a request to add content to document 120, remove content from document 120, and/or edit content within document 120. For example, document tool 102 may determine whether user 104 has interacted with a keyboard of device 106 in order to add text to document 120 through text editor 112, remove text from document 120 using text editor 112, and/or edit text within document 120 using text editor 112. If, at operation 614 document tool 102 determines that request 134 is a request to add content to document 120, remove content from document 120, and/or edit content within document 120, at operation 624 document tool 102 modifies the content of document 120 accordingly. As an example, in response to determining that request 134 is a request to add content to document 120, document tool 102 displays the new content in text editor 112 as part of document 120. Document tool 102 additionally identifies an outline topic (if any) associated with the new content. For instance, document tool 102 may determine that the new content was added to document 120 at a position within document 120 after a first outline topic and before a second outline topic (e.g., after outline topic 304a and before outline topic 304b), indicating that the new content is associated with the first outline topic (e.g., outline topic 304a). Document tool 102 next identifies the corresponding outline topic element that is linked to the first outline topic (e.g., outline topic element 302a, which is linked to outline topic 304a), and links that outline topic element to the new content. As another example, in response to determining that request 134 is a request to remove content from document 120, document tool 102 removes the content from text editor 112 and removes any link between the content and any of the outline topic elements displayed by outline tool 114a. As another example, in response to determining that request 134 is a request to edit content within document 120, document 102 updates the content displayed by text editor 112 to reflect the edit, leaving the link between the updated content and its associated outline topic element displayed within outline tool 114a unchanged. Method 600 then returns to operation 610.

If, at operation 614 document tool 102 determines that request 134 is not a request to add content to document 120, at operation 616 document tool 102 determines whether request 134 corresponds to an interaction performed by user 104 with an outline topic element of the sequence of outline topic elements 302a through 302e displayed by outline tool 114a. An interaction performed by user 104 with a given outline topic element may correspond to user 104 selecting the outline topic element (e.g., by clicking on the outline topic element, touching screen 108 of device 106 at a location associated with the outline topic element, and/or performing any other interaction with GUI 110 that indicates that user 104 is selecting the outline topic element), interacting with a button (e.g., button 306 or button 308) displayed as part of the outline topic element by outline tool 114a, moving the outline topic element to a new position within outline tool 114a, moving a portion of the content displayed by the outline topic element to a different outline topic element, and/or performing any other suitable interaction with the outline topic element. If, at operation 616 document tool 102 determines that request 134 corresponds to an interaction performed by user 104 with a given outline topic element (e.g., outline topic element 302b), in certain embodiments, document tool 102 highlights the document content that is linked to the given outline topic element within document 120, as displayed by text editor 112 (e.g., highlights part 305b that is linked to outline topic element 302b). Document tool 102 may highlight the linked document content (e.g., part 305b) within text editor 112 in any suitable manner. For example, in certain embodiments, document tool 102 may adjust a background color of the content, adjust a font color of any text included in the content, add a box around the content, adjust a font size of any text included in the content, adjust a font type of any text included in the content, and/or otherwise distinguish the content from the rest of the content of document 120. In some embodiments, in response to determining that request 134 corresponds to an interaction performed by user 104 with a given outline topic element, document tool 102 adjusts the content displayed by the outline topic element. For example, in response to user 104 interacting with outline topic element 302b by interacting with button 308 displayed on outline topic element 302b, document tool 102 may update the content displayed by outline topic element 302b such that outline topic element 302b displays all, some, or none of the content of document 120 that is linked to the outline topic element (e.g., the document content included in part 305b of document 120).

At operation 628 document tool 102 determines whether the interaction performed by user 104 with the outline topic element (e.g., outline topic element 302b) corresponds to a repositioning of the outline topic element from a first position within outline tool 114a (e.g., a position between outline topic element 302a and outline topic element 302c) to a second position within outline tool 114a (e.g., a position between outline topic element 302d and outline topic element 302e). If, at operation 628 document tool 102 determines that the interaction corresponds to a repositioning of the outline topic element from a first position within outline tool 114a to a second position within outline tool 114a, at operation 630 document tool 102 updates outline tool 114a and document 120 (as displayed by text editor 112) according to the repositioning. In particular, document tool 102 updates outline tool 114a by moving the outline topic element (e.g., outline topic element 302b) from the first position (e.g., the position between outline topic element 302a and outline topic element 302c) to the second position (e.g., the position between outline topic element 302d and outline topic element 302e). Document tool 102 also updates document 120 according to the repositioning, by moving the document content linked to the outline topic element (e.g., part 305b, linked to outline topic element 302b) in a corresponding manner, from a first position within document 120 (e.g., a position between part 305a and part 305c) to a second position within document 120 (e.g., between part 305d and part 305e), as dictated by the new position of the outline topic element within the sequence of outline topic elements 302a through 302e. Method 600 then returns to operation 610.

If, at operation 628 document tool 102 determines that the interaction performed by user 104 with the outline topic element does not correspond to a repositioning of the outline topic element within outline tool 114a, at operation 632 document tool 102 determines whether the interaction performed by user 104 corresponds to a reassignment of all or a portion of the content of document 120 that is linked to the outline topic element from the outline topic element to a new outline topic element. If, at operation 632 document tool 102 determines that the interaction performed by user 104 corresponds to a reassignment of all or a portion of the content of document 120 that is linked to the outline topic element from the outline topic element to a new outline topic element (e.g., a reassignment of paragraph 502 from outline topic element 302b to outline topic element 302c, as illustrated in FIGS. 5A through 5C), at operation 634 document tool 102 updates outline tool 114a and document 120 (as displayed by text editor 112) according to the reassignment. In particular, document tool 102 updates outline tool 114a by moving the content that is linked to the outline topic element (e.g., paragraph 502 that is linked to outline topic element 302b) from the outline topic element (e.g., outline topic element 302b) to the new outline topic element (e.g., outline topic element 302c). Document tool 102 also updates document 120 according to the reassignment, by moving the linked document content (e.g., paragraph 502) in a corresponding manner, from a first position within document 120 (e.g., a position associated with outline topic 304b and linked to outline topic element 302b) to a second position within document 120 (e.g., a position associated with outline topic 304c and linked to outline topic element 302c), as dictated by the new position of the document content within the new outline topic element. Method 600 then returns to operation 610.

If, at operation 632 document tool 102 determines that the interaction performed by user 104 with the outline topic element does not correspond to a reassignment of all or a portion of the content of document 120 that is linked to the outline topic element to another outline topic element, at operation 636 document tool 102 determines whether the interaction corresponds to a movement of a portion of the content of document 120 that is linked to the outline topic element to a new position within the outline topic element. If, at operation 636 document tool 102 determines that the interaction performed by user 104 corresponds to a movement of a portion of the content of document 120 that is linked to the outline topic element to a new position within the outline topic element (e.g., a movement of paragraph 504b to before paragraph 504a rather than after 504a), at operation 638 document tool 102 updates outline tool 114a and document 120 (as displayed by text editor 112) according to the movement. In particular, document tool 102 updates outline tool 114a by moving the portion of the content (e.g., paragraph 504b) to the new location with the same outline topic element (e.g., from after paragraph 504a to before paragraph 504a, within outline topic element 302c). Document tool 102 also updates document 120 according to the movement, by moving the linked document content (e.g., paragraph 504b) in a corresponding manner, from a first position within document 120 (e.g., a position after paragraph 504a) to a second position within document 120 (e.g., a position before paragraph 504a), as dictated by the new position of the document content within the outline topic element. Method 600 then returns to operation 610.

If, at operation 636 document tool 102 determines that the interaction performed by user 104 with the outline topic element does not correspond to a movement of a portion of text within the outline topic element, at operation 640 document tool 102 determines whether the interaction corresponds to an attempt by user 104 to rename the outline topic that is linked to the outline topic element. For example, document tool 102 may determine whether the interaction corresponds to user 104 selecting button 306 displayed on the outline topic element. (As described above, in the discussion of FIG. 3C, selecting button 306 on a given outline topic element instructs document tool 102 to transform the outline topic name displayed by the outline topic element into an editable field.) If, at operation 640 document tool 102 determines that the interaction corresponds to an attempt by user 104 to rename the outline topic that is linked to the given outline topic element (e.g., an attempt to rename outline topic 304e, which is linked to outline topic element 302e), at operation 642 document tool 102 updates the name of the outline topic within document 120 (e.g., updates the name of outline topic 304e), and within outline tool 114a (e.g., updates the outline topic name displayed by outline topic element 302e). For example, outline tool 102 may transform the outline topic name displayed by the outline topic element (e.g., the outline topic name displayed by outline topic element 302e) into an editable field, and may update the name according to text entered by user 104 into the editable field. Document tool 102 may then automatically update the name of the linked outline topic (e.g., outline topic 304e, which is linked to outline topic element 302e) to match the name entered by user 104. Method 600 then returns to operation 610.

If, at operation 616 document tool 102 determines that request 134 does not correspond to an interaction performed by user 104 with an outline topic element of the sequence of outline topic elements 302a through 302e displayed by outline tool 114a, at operation 618 document tool 102 determines whether request 134 corresponds to a request to save the current version of document 120 in database 118. For example, document tool 102 may determine whether user 104 has interacted with button 230 displayed on GUI 110, through which user 104 may request that document tool 102 save a copy of document 120 in database 118, as explained above, in the discussion of FIG. 2. If, at operation 618 document tool 102 determines that request 134 corresponds to a request from user 104 to save the current version of document 120 in database 118, at operation 620 document tool 102 saves the document. As an example, in certain embodiments in which document 120 has not previously been saved by user 104, document tool 102 may save a new document 120 in database 118. As another example, in certain embodiments in which user 104 previously saved a version of document 120 in database 118, document tool 102 may save the current version of document 120 by overwriting the previous version of document 120 within database 118. As a further example, in certain embodiments in which user 104 previously saved a version 122a of document 120 in database 118, document tool 102 may save the current version of document 120 as a new version 122b of document 120 in database 118. Method 600 then returns to operation 610.

Modifications, additions, or omissions may be made to method 600 depicted in FIG. 6. Method 600 may include more, fewer, or other operations. For example, operations may be performed in parallel or in any suitable order. As an example, while method 600 illustrates the decisions associated with operations 612, 614, 616, and 618 performed sequentially and in a specific order, these decisions may be performed in parallel, or in any suitable order. Similarly, while method 600 illustrates the decisions associated with operations 628, 632, 636, and 640 performed sequentially and in a specific order, these decisions may be performed in parallel, or in any suitable order. While discussed as document tool 102 (or components thereof, including, for example, outline tool 114a) performing certain operations, any suitable components of system 100, including, for example, device 106, may perform one or more operations of the method.

ii. Sentence Rewrite Tool

User 104 may use editing tool 114 in the form of sentence rewrite tool 114b to edit one or more of the sentences included in document 120. In particular, user 104 may use sentence rewrite tool 114b to generate multiple versions of a given sentence that is included in the document (referred to herein as sentence variants), and to experiment with the use of those different sentence variants within the document, in order to identify and select a preferred sentence variant. Accordingly, rather than losing prior versions of a sentence each time user 104 edits the sentence, certain embodiments of document tool 102 enable user 104 to maintain multiple different versions of the sentences within document 120, that the user may select from amongst. In this manner, certain embodiments conserve computational resources otherwise expended by the user rewriting a given sentence of document 120 only to decide at a later time that he/she preferred the original version of the sentence, and then having to search through previous versions of the document in an attempt to locate the original version of the sentence, and/or attempting to reproduce the original version of the sentence from scratch, if no previous versions of document 120 were saved.

FIGS. 7A through 7D illustrate the use of sentence rewrite tool 114*b*. In certain embodiments, user 104 may cause editing tool 114 to take the form of sentence rewrite tool 114*b* by selecting sentence rewrite button 210 on GUI 110. In some embodiments, and as illustrated in FIGS. 7A through 7D, document tool 102 may highlight button 210 on GUI 110 when sentence rewrite tool 114*b* is in use (e.g., when sentence rewrite tool 114*b* is displayed in region 202 of GUI 110).

a. Generating Sentence Variants

As illustrated in FIG. 7A, sentence rewrite tool 114*b* is configured to display one or more sentences 702 through 708 of document 120. In particular, in certain embodiments, in response to user 104 selecting sentence rewrite button 210 on GUI 110, document tool 102 is configured to identify one or more sentences 702 through 708 within document 120, and to display each sentence 702 through 708 as a separate element on sentence rewrite tool 114*b*. While FIG. 7A illustrates sentence rewrite tool 114*b* displaying less than all of the sentences of document 120, this disclosure contemplates that in certain embodiments, any of the sentences of document 120 may be viewed within sentence rewrite tool 114*b*. For example, in certain embodiments, sentence rewrite tool 114*b* may display a scroll bar with which user 104 may interact to view any of the sentences of document 120 within sentence rewrite tool 114*b*. In some embodiments and as described in further detail below in the discussion of FIG. 7D, only a subset of the sentences of document 120 (e.g., those sentences for which multiple versions exist) may be viewed within sentence rewrite tool 114*b*.

Document tool 102 may identify individual sentences 702 through 708 from the strings of text entered by user 104 into text editor 112 in any suitable manner. As an example, in certain embodiments, document tool 102 may identify each sentence 702 through 708 by identifying one or more sentence delimiters within document 120 (e.g., periods, exclamation points, question marks, etc.). As another example, in some embodiments, instructions 132 stored in memory 130 of document tool 102 may include a set of rules for identifying the sentences of document 120. In particular, because the period character may take the role of both a sentence delimiter and an abbreviation marker within a sentence, in certain embodiments, instructions 132 may include rules for distinguishing between period characters that are sentence delimiters and period characters that are used to denote abbreviations, decimal points, ellipses, email addresses, etc. As a further example, in certain embodiments, document tool 102 may include one or more machine learning algorithms stored within instructions 132 of memory 130, which have been trained to identify sentences within documents. Such machine learning algorithm(s) may include any suitable machine learning algorithm for identifying sentence boundaries. For example, the machine learning algorithms may include a decision tree algorithm, a neural network algorithm, a support vector machine, and/or any other suitable machine learning algorithm for identifying sentence boundaries.

As described above, user 104 may use sentence rewrite tool 114*b* to generate new versions (sentence variants) for one or more of the sentences of document 120. FIG. 7B presents an example in which user 104 seeks to generate a new version of sentence 708 of document 120.

User 104 may indicate to document tool 102 that the user seeks to generate a new version of a given sentence of document 120 (e.g., sentence 708) in any suitable manner. As an example, in certain embodiments, user 104 may select sentence 708, as displayed within sentence rewrite tool 114*b*, to indicate to document tool 102 that the user seeks to generate a new sentence variant for sentence 708. As another example, in some embodiments, user 104 may select sentence 708, as displayed within text editor 112, to indicate that the user seeks to generate a new sentence variant for the sentence. User 104 may select sentence 708 in any suitable manner. For example, in certain embodiments, user 104 may select sentence 708 (as displayed in text editor 112 and/or sentence rewrite tool 114*b*) by (1) touching display 108 of device 106 at a location associated with the sentence, (2) using a mouse coupled to device 106 to click on the sentence, (3) using a trackpad of device 106 to click on the sentence, (4) using a mouse and/or trackpad of device 106 to hover a cursor over the sentence, and/or (5) interacting with device 106, display 108, and/or a user interface coupled to device 106 in any suitable manner to select the sentence.

In response to user 104 selecting sentence 708, document tool 102 is configured to display a sentence variant input and selection box 710 associated with sentence 708 within sentence rewrite tool 114*b*. Sentence variant input and selection box 710 is configured to display one or more sentence variants (e.g., sentence variant 708*a*) associated with sentence 708. For each sentence variant of sentence 708, sentence variant input and selection box 710 is also configured to display an indication 712 (e.g., indication 712*a* associated with sentence variant 708*a*) indicating whether or not the associated sentence variant is the selected sentence variant that is included in document 120. For example, as illustrated in FIG. 7B, indication 712*a*, which is associated with sentence variant 708*a*, indicates that sentence variant 708*a* is the selected variant that is included in document 120. In particular, sentence variant 708*a* corresponds to sentence 708, which is displayed by text editor 112 as part of document 120. While FIG. 7B presents an example in which only a single sentence variant 708*a* exists for sentence 708, this disclosure contemplates that any number of sentence variants may exist for a given sentence, each of which may be displayed within sentence variant input and selection box 710.

User 104 may create new sentence variant(s) for a given sentence 708 in any suitable manner. For example, as illustrated in FIG. 7B, in certain embodiments, sentence variant input and selection box 710 is configured to display a field 714 into which user 104 may enter a new sentence variant for sentence 708. In certain embodiments and as illustrated in FIG. 7B, when initially displayed by sentence rewrite tool 114*b*, field 714 is a blank field into which user 104 may enter text associated with a new sentence variant for sentence 708. In some embodiments, document tool 102 may automatically populate field 714 with text, which user 104 may then edit in order to generate anew sentence variant for sentence 708. As an example, in certain embodiments, document tool 102 is configured to automatically populate field 714 with the previous version of the sentence (e.g., variant 708a of sentence 708), which user 104 may then edit to generate a new sentence variant. This may be desirable in certain embodiments in which user 104 seeks to make minor edits to the sentences within document 120. In particular, this may conserve the processing resources that otherwise would have been associated with the user re-typing a large portion of the content from the original version of the document that remains unchanged between versions. As another example of a manner by which document tool 102 may automatically populate field 714 with text, in certain embodiments, document tool 102 may be configured to automatically populate field 714 with a suggested sentence variant for sentence 708. For example, document tool 102 may use one or more machine learning algorithms stored as part of instructions 132 in memory 130 to generate a suggested sentence variant for sentence 708. The machine learning algorithms may be trained to generate suggested sentence variants in any suitable manner. As an example, in certain embodiments, the machine learning algorithm(s) may correspond to one or more sentence simplification algorithms that have been trained to modify the content and structure of a sentence in order to make it easier to read and/or understand, while preserving the idea expressed by the original sentence. Such machine learning algorithms may be any suitable machine learning algorithms trained to generate suggested sentence variants for a given sentence. In particular, the machine learning algorithms may include one or more neural network models, including, for example, recurrent neural network models. In some embodiments, the machine learning algorithms may include one or more reinforcement learning models.

In certain embodiments, in addition to or instead of providing sentence-level suggestions, document tool 102 may be configured to generate document-level suggestions for document 120. As an example, where the majority of the sentences within document 120 begin with the word "The," document tool 102 may generate a document-level suggestion to edit one or more of these sentences such that they begin with a word other than "The." As another example, where the majority of the sentences within document 120 are twenty words or longer, document tool 102 may generate a document-level suggestion to edit document 120 by reducing the word counts of the sentences within the document. Document tool 102 may present such document-level suggestions to user 104 in any suitable manner. For example, in certain embodiments, document tool 102 may be configured to present such suggestions to user 104 in a pop-up displayed on GUI 110. As another example, in certain embodiments, GUI 110 may include a region that is used to display such suggestions.

Document tool 102 may be configured to generate such document-level suggestions in any suitable manner. For example, in certain embodiments, document tool 102 may use one or more machine learning algorithms stored as part of instructions 132 in memory 130 to generate such suggestions. Such machine learning algorithms may be any suitable machine learning algorithms trained to generate document-level suggestions for a given document 120. In particular, the machine learning algorithms may include one or more neural network models, including, for example, recurrent neural network models. In some embodiments, the machine learning algorithms may include one or more reinforcement learning models.

In some embodiments, document tool 102 may be configured to provide document-level suggestions to users 104 in the form of one or more relevant video clips. As an example, document tool 102 may store a set of video clips in memory 130, each of which includes information that may be helpful during the writing process. For instance, the set of video clips may include video clips related to certain grammatical issues, along with suggestions for ways to address those grammatical issues. The set of video clips may also include video clips related to improving writing style.

Document tool 102 may present such video clips to user 104 in any suitable manner. As an example, in response to determining that document 120 includes one or more instances of a particular grammatical issue, document tool 102 may present a video clip related to that grammatical issue to user 104 (e.g., in a pop-up window displayed on GUI 110, in a specific region of GUI 110, etc.). As another example, document tool 102 may display video clips to user 104 at various stages during the user's writing process, with the content included in the video clips related to the writing stage. For instance, while user 104 is generating outline topics for document 120, document tool 102 may display a video clip that provides tips for organizing/structuring a document. Similarly, while user 104 is rewriting various sentences within document 120, document tool 102 may display one or more video clips that provide suggestions for improving writing style.

b. Selecting from Amongst Available Sentence Variants

FIG. 7C illustrates an example in which a pair of new sentence variants—sentence variant 708b and sentence variant 708c—have been created for sentence 708, in addition to original sentence variant 708a. Each sentence variant 708a through 708c is associated with an indication 712a through 712c, which indicates whether or not the associated sentence variant has been selected for inclusion within document 120. FIG. 7C illustrates an example in which second sentence variant 708b has been selected for inclusion within document 120. Accordingly, indication 712b, which is associated with sentence variant 708b, distinguishes sentence variant 708b from the other two sentence variants 708a and 708c. In particular, in certain embodiments and as illustrated in FIG. 7C, indication 712b includes a check mark, to indicate that its associated sentence variant 708b is the selected sentence variant, while indications 712a and 712c, associated with sentence variants 708a and 708c, respectively, do not include such a check mark.

User 104 may select a given sentence variant (e.g., sentence variant 708b) of a set of existing sentence variants 708a through 708c as the selected sentence variant for inclusion within document 120 in any suitable manner. For example, in certain embodiments, user 104 may interact with indications 712a through 712c to switch between selected sentence variants. For instance, in an embodiment in which sentence variant 708a is originally the selected sentence variant, user 104 may set sentence variant 708b to be the selected sentence variant by interacting with indication 712b. Such interaction may cause indication 712a, associated with sentence variant 708a, to switch from indicating that sentence variant 708a is the selected sentence variant, to indicating that sentence 708a is not the selected sentence variant. Similarly, the interaction may cause indication 712b, associated with sentence variant 708b, to switch from indicating that sentence variant 708b is not the selected sentence variant, to indicating that sentence 708b is the selected sentence variant. User 104 may interact with indication 712b in any suitable manner. For example, in certain embodiments, user 104 may interact with indication 712*b* by (1) touching screen 108 of device 106 at a location associated with indication 712*b*, (2) using a mouse and/or trackpad associated with device 106 to click on indication 712*b*, (3) using a mouse and/or trackpad associated with device 106 to hover a cursor over indication 712*b*, and/or (4) using device 106, display 108, and/or a user interface coupled to device 106 to interact with indication 712*b* in any other suitable manner.

In response to user 104 selecting a new sentence variant (e.g., sentence variant 708*b*) for inclusion within document 120, document tool 102 is configured to update document 120, as displayed in text editor 112, to reflect this change. In particular, document tool 102 is configured to replace the previously selected sentence variant (e.g., sentence variant 708*a*) with the newly selected sentence variant (e.g., sentence variant 708*b*) within document 120, as displayed in text editor 112. For example, a comparison between FIG. 7B (for which sentence variant 708*a* was the selected sentence variant) and FIG. 7C (for which sentence variant 708*b* is the selected sentence variant) illustrates the update made to sentence 708 of document 120, as displayed in text editor 112, in response to user 104 setting sentence variant 708*b* to be the selected sentence variant instead of sentence variant 708*a*. In particular, in FIG. 7B, sentence 708 displayed in text editor 112 corresponds to sentence variant 708*a* and reads: "This is a third sentence of the first paragraph that is associated with topic one.". On the other hand, in FIG. 7C, sentence 708 displayed in text editor 112 corresponds to sentence variant 708*b* and reads: "This is a second attempt at a third sentence of the first paragraph that is associated with topic one.".

c. Collaboratively Editing a Document

While the above discussion describes a single user 104 generating sentence variants 708*a* through 708*c*, this disclosure contemplates that any number of users 104 may collaborate on a document 120 by proposing sentence variants for the sentences within document 120. In particular, as described above in the discussion of FIG. 2, certain embodiments of document tool 102 enable user 104 to share a document 120 that he/she created with one or more other users. In certain such embodiments, each of those other users may be able to generate new sentence variants for any of the sentences of document 120. For example, sentence variant 708*b*, displayed in FIG. 7C, may correspond to a sentence variant created by a first other user with whom user 104 has shared document 120, and sentence variant 708*c* may correspond to a sentence variant created by a second other user with whom user 104 has shared document 120.

By enabling other users with whom user 104 has shared document 120 to generate sentence variants for the sentences of document 120, certain embodiments of document tool 102 may enable multiple users to edit the same document at the same time. For example, in certain embodiments, document tool 102 may be configured to determine that multiple users are simultaneously accessing a given document 120. In such embodiments, document tool 102 may allow all such users to simultaneously edit the document 120 by proposing new sentence variants for the sentences of document 120. Because any number of sentence variants may be generated for a given sentence displayed in text editor 112, multiple users can simultaneously generate new sentence variants for a given sentence displayed in text editor 112, without interfering with one another's work. In certain embodiments, the new sentence variants created by multiple users who are simultaneously editing document 120 may be viewed by each of the users within sentence rewrite tool 114*b* in real time, as they are created.

In some embodiments, document tool 102 may lock certain features of GUI 110 for one or more users when multiple users are simultaneously editing a document 120. As an example, in certain embodiments, in response to determining that a second user has accessed a document 120 that user 104 is currently editing, document tool 102 may allow the second user to generate sentence variants for any of the sentences displayed in text editor 112, but may prevent that user from selecting new sentence variants for inclusion within document 120 (e.g., by interacting with indications 712*a* through 712*c*).

When multiple users collaborate on a document 120, sentence rewrite tool 114*b* may include features to distinguish between the sentence variants generated by the various users. As an example, in certain embodiments, for each sentence variant associated with a given sentence (e.g., each of sentence variants 708*a* through 708*c* associated with sentence 708), sentence variant input and selection box 710 may be configured to display information identifying the user who generated the sentence variant. Such identifying information may take any suitable form. As an example, in certain embodiments, document tool 102 may assign a different text color to each user who has collaborated on a given document 120, and sentence variant input and selection box 710 may use the text color assigned to a given user to display the sentence variant(s) generated by that user. As another example, in certain embodiments, document tool 102 may assign metadata to each sentence variant 708*a* through 708*c* that identifies the user who generated the variant. In some such embodiments, in response to user 104 interacting with a given sentence variant displayed by sentence variant input and selection tool 710 (e.g., by hovering a cursor over the sentence variant), sentence rewrite tool 114*b* may be configured to display the metadata that identifies the user who generated the variant within a tooltip displayed on GUI 110.

By enabling multiple users to simultaneously edit the same document, certain embodiments conserve storage resources as compared with existing text editing applications, which lock a document while a first user is editing it, such that a second user seeking to edit the document may need to generate and store a copy of it, and to make edits to the copy. Such embodiments may further conserve the processing resources otherwise associated with merging any changes the second user makes to the copy of the document with those changes made by the first user to the original document.

d. Reviewing and Removing Sentence Variants

Once user 104 (and/or other users collaboratively editing document 120) has generated sentence variant(s) for one or more of the sentences included in document 120, the user may wish to review those existing sentence variants. To facilitate such review, sentence rewrite tool 114*b* includes element 716*a/b*. As illustrated in FIGS. 7A and 7D, user 104 may interact with element 716*a/b* to toggle between sentence rewrite tool 114*b* displaying all of the sentences of document 120 or only those sentences for which multiple sentence variants exist. In particular, FIG. 7A illustrates an example in which sentence rewrite tool 114*b* is currently configured to display all of the sentences of document 120. Accordingly, in response to user 104 interacting with element 716*a*, sentence rewrite tool 114*b* is configured to switch to displaying only those sentences of document 120 for which multiple sentence variants exist. This may be desirable when user 104 wishes to review the existing sentence variants that have been generated for document 120. On the other hand, FIG. 7D illustrates an example in which sentence rewrite tool 114b is currently configured to display only those sentences of document 120 for which multiple sentence variants exist. Accordingly, in response to user 104 interacting with element 716b, sentence rewrite tool 114b is configured to switch to displaying all sentences of document 120. This may be desirable when user 104 wishes to return to the editing process and generate sentence variants for sentences for which multiple variants may not yet exist.

Once user 104 is confident in his/her selection of sentence variants for inclusion within document 120, the user may choose to delete any of the unselected sentence variants. Deleting unwanted sentence variants may be desirable to conserve storage resources within system 100. In certain embodiments, sentence rewrite tool 114b includes "Remove unselected rewrites" button 718 to efficiently accomplish this task. In particular, in response to user 104 interacting with button 718, document tool 102 is configured to delete any sentence variants which have not been selected for inclusion in document 120. Because button 718 may be used to delete all of the unselected sentence variants associated with document 120 through a single user action, this may conserve significant processing resources that would otherwise be expended by user 104 selecting and deleting each individual unselected sentence variant. As an example (described with respect to FIG. 7D), in response to user 104 interacting with button 718, document tool 102 is configured to delete unselected sentence variants 708a and 708c.

User 104 may delete the unselected sentence variants associated with document 120 any number of times. For example, in response to user 104 deleting the unselected sentence variants associated with sentence 708 (e.g., sentence variants 708a and 708c), user 104 may generate new sentence variants for sentence 708 and then select a preferred sentence variant from amongst those new sentence variants for inclusion within document 120, in a similar manner as described above in the discussion of FIGS. 7B and 7C. User 104 may then interact with button 718 to delete any unselected sentence variants.

User 104 may interact with element 716a/b and/or button 718 in any suitable manner. For example, in certain embodiments, user 104 may interact with element 716a/b and/or button 718 by (1) touching screen 108 of device 106 at a location associated with the element or button, (2) using a mouse and/or trackpad associated with device 106 to click on the element or button, (3) using a mouse and/or trackpad associated with device 106 to hover a cursor over the element or button, and/or (4) using device 106, display 108, and/or a user interface coupled to device 106 to interact with element 716a/b and/or button 718 in any other suitable manner.

e. Method of Operation

FIG. 8 presents a flowchart illustrating an example method 800 (described in conjunction with elements of FIGS. 1, and 7A through 7D) by which sentence rewrite tool 114b may be used to generate sentence variants (e.g., variants 708b/c) for one or more sentences (e.g., sentence 708) of document 120 and to select from amongst available sentence variants (e.g., variants 708a through 708c) for inclusion in document 120.

At operation 802 document tool 102 receives a request 134 from a user 104 seeking to rewrite one or more sentences of document 120. Document tool 102 may receive request 134 in any suitable manner. For example, in certain embodiments, user 104 may transmit request 134 to document tool 102 by selecting sentence rewrite button 210, displayed on GUI 110. At operation 804 document tool 102 displays sentence rewrite tool 114b in first region 202 of GUI 110.

At operation 806 document tool 102 determines whether user 104 has interacted with a given sentence of document 120 (e.g., "activated" the given sentence, as illustrated in FIG. 8). User 104 may interact with a given sentence of document 120 (as displayed within sentence rewrite tool 114b and/or as displayed within text editor 112) in any suitable manner. For example, in certain embodiments, user 104 may interact with a sentence by (1) touching display 108 of device 106 at a location associated with the sentence, (2) using a mouse coupled to device 106 and/or a trackpad associated with the device to click on the sentence, (3) using a mouse and/or trackpad of device 106 to hover a cursor over the sentence, and/or (4) interacting with device 106, display 108, and/or a user interface coupled to device 106 in any suitable manner to select the sentence.

If, at operation 806 document tool 102 determines that user 104 interacted with a given sentence of document 120, at operation 808 document tool 102 determines whether multiple variants exist for the sentence with which the user interacted. If, at operation 808 document tool 102 determines that multiple variants exist for the sentence, at operation 810 document tool 102 displays the set of existing variants within sentence rewrite tool 114b. Document tool 102 also displays an indication of which of the multiple sentence variants is the currently selected sentence variant (e.g., the sentence variant currently displayed as part of document 120 by text editor 112) within sentence rewrite tool 114b. In certain embodiments in which only a single sentence variant exists for the selected sentence (as illustrated, for example, in FIG. 7A for sentence 708), document tool 102 may display an indication associated with the sentence variant indicating that the single sentence variant is included in document 120, as displayed in text editor 112. In certain embodiments, document tool 102 additionally displays a field within sentence rewrite tool 114b, into which user 104 may enter a new sentence variant for the selected sentence.

At operation 812 document tool 102 determines whether user 104 has created a new sentence variant for the selected sentence. For example, document tool 102 may determine whether user 104 has entered text associated with a new sentence variant into a field displayed in sentence rewrite tool 114b for the entry of such anew variant. As another example, in certain embodiments, determining that user 104 has created a new sentence variant for the selected sentence may correspond to determining that the user has requested that document tool 102 automatically generate a new sentence variant for the selected sentence. In certain such embodiments, document tool 102 may then apply a machine learning algorithm to the selected sentence to generate a new version of the sentence. Document tool 102 may apply any suitably trained machine learning algorithm to the selected sentence to generate a new version of the sentence. For example, document tool 102 may apply a deep reinforcement learning algorithm that has been trained to reduce the complexity of sentences, to the selected sentence, to generate a new version of the sentence.

If, at operation 812 document tool 102 determines that user 104 has created a new sentence variant for the selected sentence, at operation 814 document tool 102 displays the new sentence variant along with any existing sentence variants currently displayed within sentence rewrite tool 114b. If, at operation 812 document tool 102 determines that user 104 has not created a new sentence variant for the selected sentence, at operation 816 document tool 102 determines whether user 104 has updated/modified an existing sentence variant displayed within sentence rewrite tool 114b. If, at operation 816 document tool 102 determines that user 104 has updated/modified an existing sentence variant displayed within sentence rewrite tool 114b, at operation 818 document tool 102 displays the updated/modified version of the sentence variant along with any other sentence variants currently displayed within sentence rewrite tool 114b.

At operation 820 document tool 102 determines whether user 104 has selected a new sentence variant from amongst the set of available sentence variants for inclusion within document 120. If, at operation 820 document tool 102 determines that user 104 has selected a new sentence variant for inclusion within document 120, at operation 822 document tool 102 updates both sentence rewrite tool 114b and text editor 112 to reflect this selection. In particular, document tool 102 updates sentence rewrite tool 114b to display an indication associated with the newly selected sentence variant, to indicate that the sentence variant is currently included within document 120. Document tool 102 also updates text editor 112 by replacing the previously selected sentence variant displayed in text editor 112 with the newly selected sentence variant.

Modifications, additions, or omissions may be made to method 800 depicted in FIG. 8. Method 800 may include more, fewer, or other operations. For example, operations may be performed in parallel or in any suitable order. While discussed as document tool 102 (or components thereof, including, for example, sentence rewrite tool 114b) performing certain operations, any suitable components of system 100, including, for example, device 106, may perform one or more operations of the method.

iii. Sentence Reorder Tool

User 104 may use editing tool 114 in the form of sentence reorder tool 114c to edit document 120 by reordering the sentences within document 120. In particular, user 104 may use sentence reorder tool 114c to reposition one or more sentences within a paragraph, to move a sentence from one paragraph to another, and/or to move a sentence to a new paragraph. FIGS. 9A through 10B illustrate the use of sentence reorder tool 114c. In certain embodiments, user 104 may cause editing tool 114 to take the form of sentence reorder tool 114c by selecting sentence reorder button 212 on GUI 110. In some embodiments, and as illustrated in FIGS. 9A through 10B, document tool 102 may highlight button 212 on GUI 110 when sentence reorder tool 114c is in use (e.g., when sentence reorder tool 114c is displayed in region 202 of GUI 110).

Figure 9B:
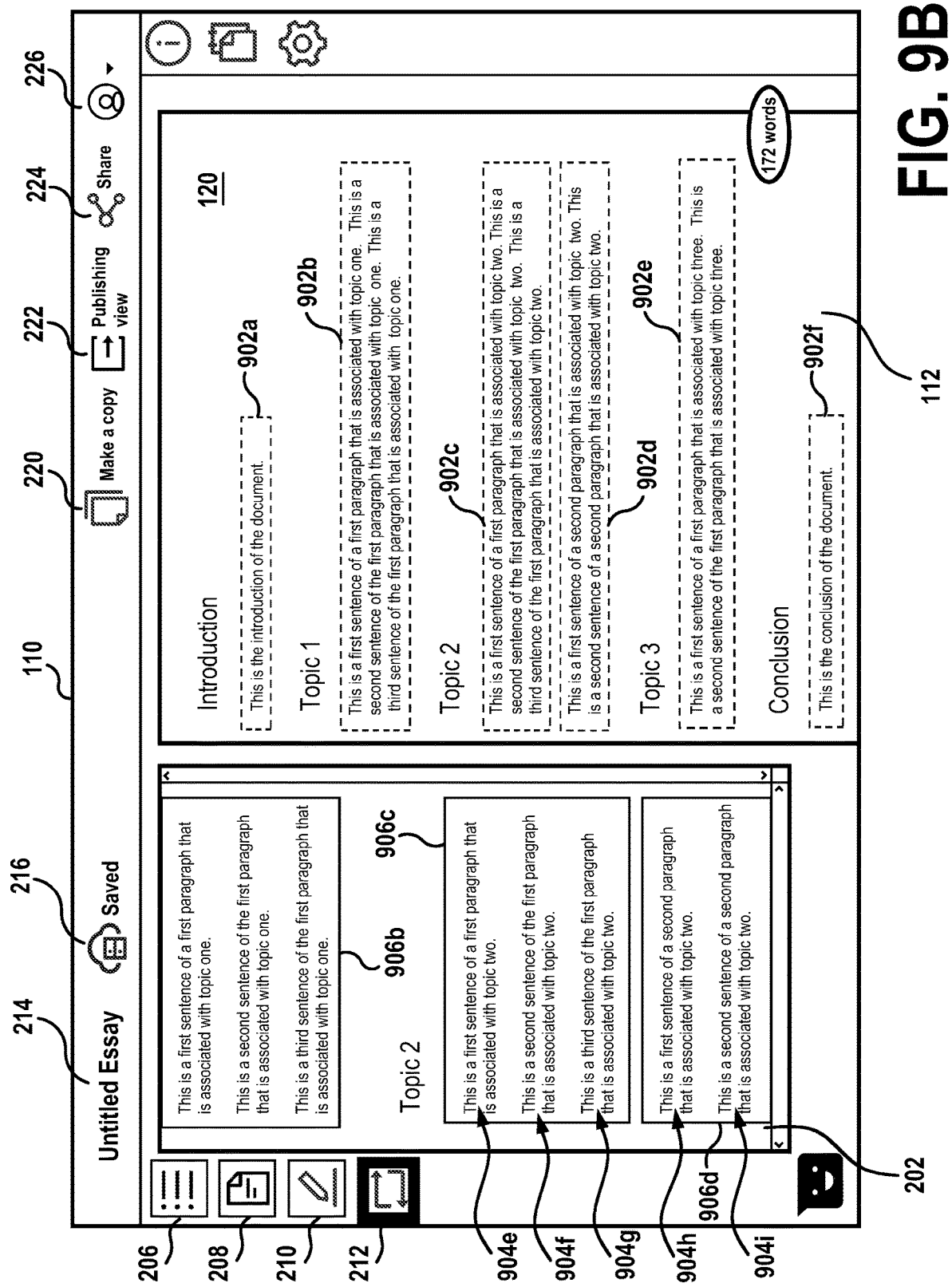

As illustrated in FIGS. 9A and 9B, sentence reorder tool 114c is configured to display one or more lists 906a through 906d of sentences of document 120. Each list 906a through 906d is associated with a paragraph of document 120 and displays the sentences included within the associated paragraph as separate elements within the list. For example, as illustrated in FIGS. 9A and 9B, sentence reorder tool 114c displays list 906a, which is associated with first paragraph 902a of document 120 and includes sentence 904a, list 906b, which is associated with second paragraph 902b of document 120 and includes sentences 904b through 904d, list 906c, which is associated with third paragraph 902c of document 120 and includes sentences 904e through 904g, and list 906d, which is associated with fourth paragraph 902d of document 120 and includes sentences 904h and 904i. While not illustrated in FIGS. 9A and 9B, this disclosure contemplates that sentence reorder tool 114c may similarly display lists of the sentences of paragraphs 902e through 902f of document 120. In particular, because display 108 of device 106 may not be large enough to display the entire contents of GUI 110, in certain embodiments, the sentences of all of paragraphs 902a through 902f of document 120 may be viewable within sentence reorder tool 114c through a scroll bar displayed by sentence reorder tool 114c. By displaying the sentences of document 120 as individual elements within sentence reorder tool 114c, certain embodiments enable user 104 to easily identify and direct his/her focus to one or more individual sentences within the document.

Document tool 102 may identify individual sentences 904a through 904i within the strings of text forming document 120 in any suitable manner. As an example, in certain embodiments, document tool 102 may identify each sentence 904a through 904i by identifying one or more sentence delimiters within document 120 (e.g., periods, exclamation points, question marks, etc.). As another example, in some embodiments, instructions 132 stored in memory 130 of document tool 102 may include a set of rules for identifying the sentences of document 120. In particular, because the period character may take the role of both a sentence delimiter and an abbreviation marker within a sentence, in certain embodiments, instructions 132 may include rules for distinguishing between period characters that are sentence delimiters and period characters that are used to denote abbreviations, decimal points, ellipses, email addresses, etc. As a further example, in certain embodiments, document tool 102 may include one or more machine learning algorithms stored within instructions 132 of memory 130, which have been trained to identify sentences within documents. Such machine learning algorithm(s) may include any suitable machine learning algorithm for identifying sentence boundaries. For example, the machine learning algorithms may include a decision tree algorithm, a neural network algorithm, a support vector machine, and/or any other suitable machine learning algorithm for identifying sentence boundaries.

Figure 9D:
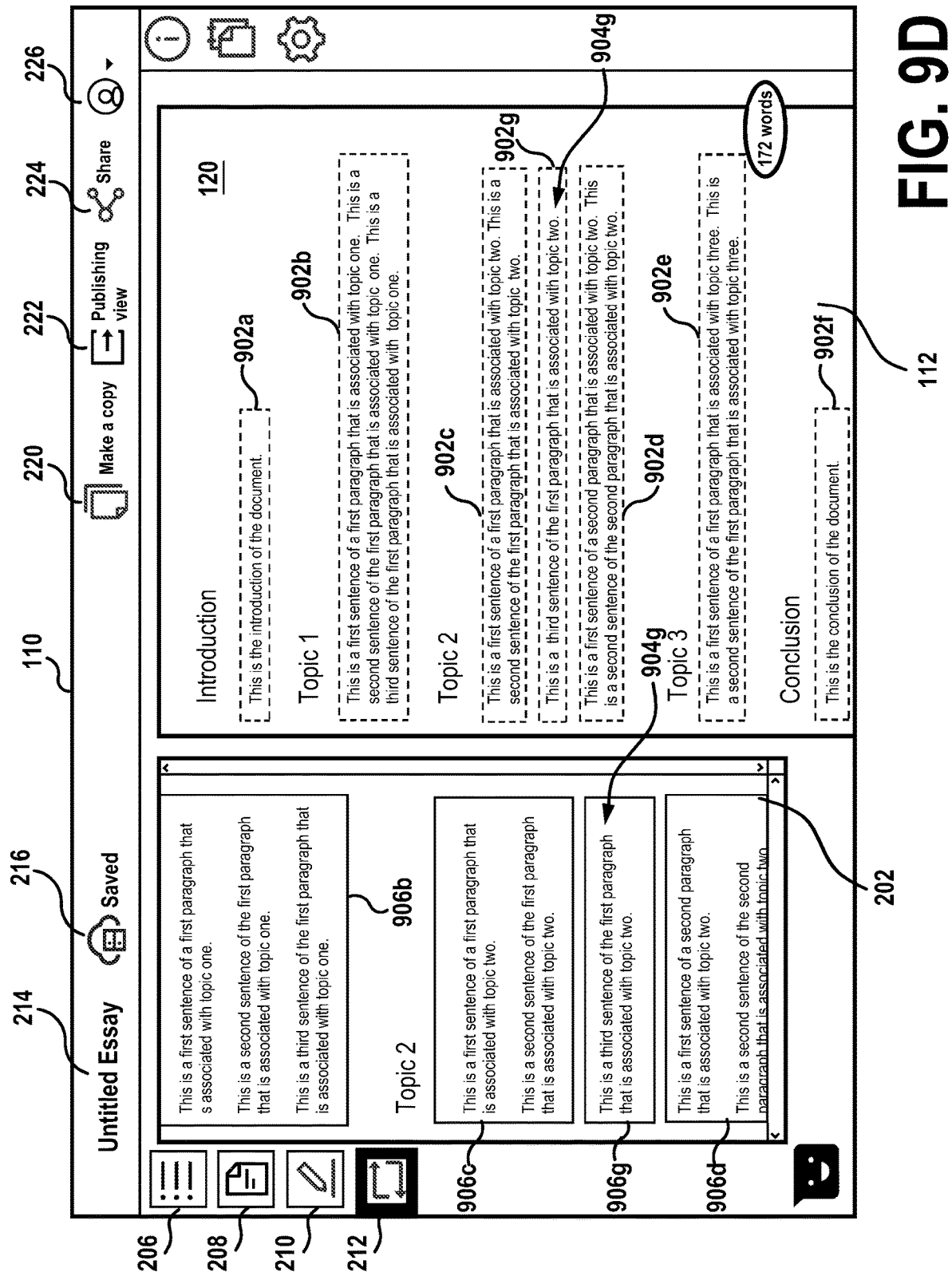

As described above, user 104 may use sentence reorder tool 114c to reorder the sentences 904 within document 120. FIGS. 9B through 9D illustrate an example in which user 104 uses sentence reorder tool 114c to move a given sentence of an existing paragraph of document 120 into a newly created paragraph, and FIGS. 10A and 10B illustrate an example in which user 104 uses sentence reorder tool 114c to move a given sentence of an existing paragraph of document 120 into another existing paragraph of the document.

In the example illustrated in FIGS. 9B through 9D, user 104 moves sentence 904g to a new location within document 120. As illustrated in FIG. 9B, sentence 904g belongs to paragraph 902c of document 120. Accordingly, sentence reorder tool 114c initially displays sentence 904g as an element within list 906c, which is the list that corresponds to paragraph 902c. FIG. 9C illustrates the behavior of sentence reorder tool 114c in response to user 104 moving sentence 904g out of list 906c. In particular, in response to user 104 moving sentence 904g from list 906c to a position on sentence reorder tool 114c that is not within any of the lists associated with paragraphs 902a through 902f, document tool 102 is configured to create a new list 906g at that position. For example, in response to user 104 moving sentence 904g from list 906c to a position on sentence reorder tool 114c between list 906c (associated with paragraph 902c of document 120) and list 906d (associated with paragraph 902d of document 120), document tool 102 generates list 906g between list 906c and list 906d, and displays sentence 904g as an element of the new list 906g.

In response to user 104 moving a sentence displayed within sentence reorder tool 114c to a new position within the tool, document tool 102 is configured to apply a corresponding movement of the sentence within document 120, as displayed by text editor 112. FIG. 9D illustrates the behavior of text editor 112 in response to user 104 moving sentence 904g from list 906c into a new list 906g within sentence reorder tool 114c. As illustrated in FIG. 9D, in response to this movement within sentence reorder tool 114c, document tool 102 is configured to correspondingly move sentence 904g within text editor 112, from paragraph 902c into a new paragraph—paragraph 902g, positioned within document 120 at a location between paragraph 902c (corresponding to list 906c displayed by sentence reorder tool 114c) and paragraph 902d (corresponding to list 906d displayed by sentence reorder tool 114c).

Figure 10A:
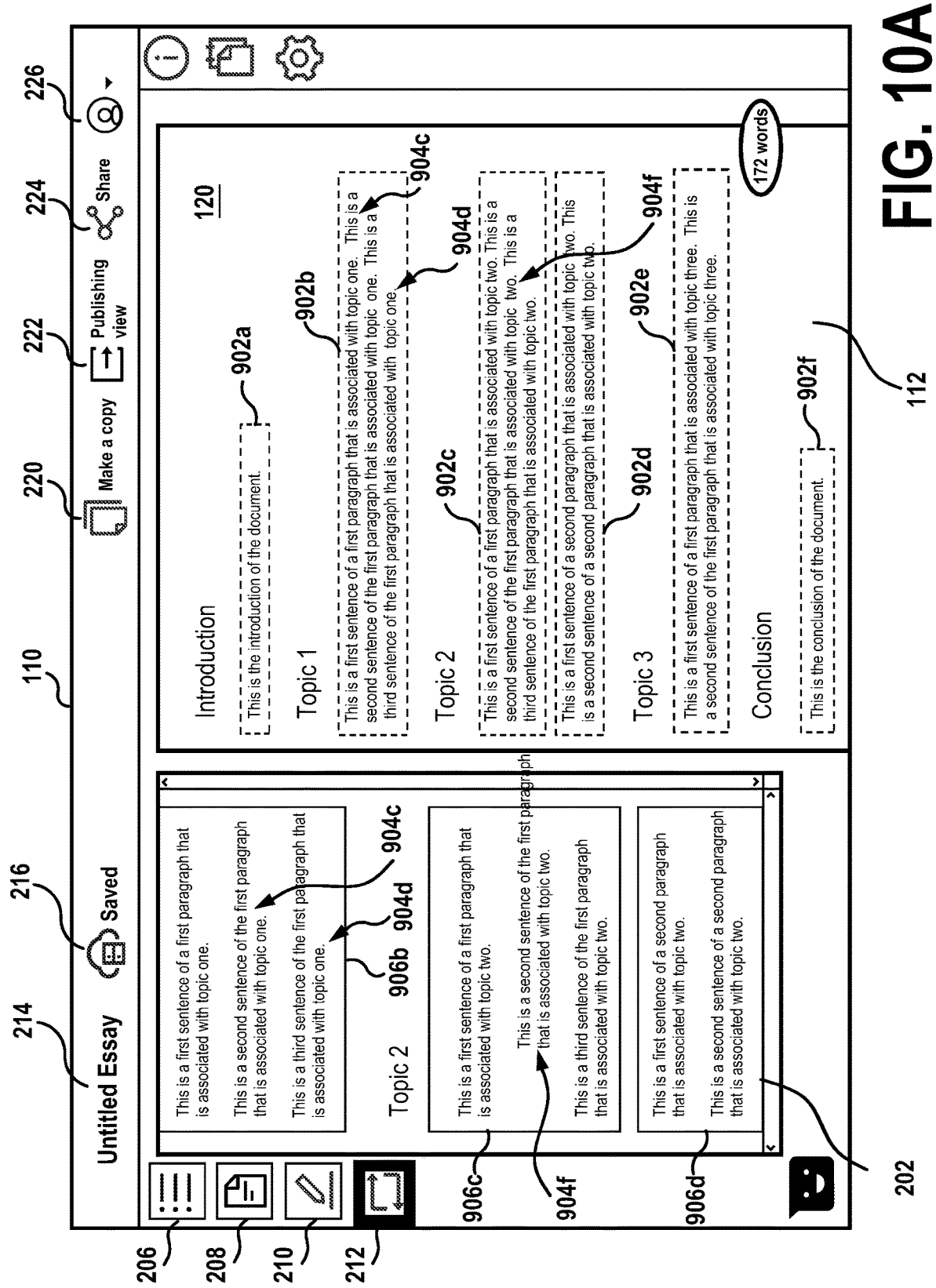
FIGS. 10A and 10B present an example illustrating the use of the integrated sentence reorder tool displayed in FIG. 9A to move a sentence from one paragraph of the document into another paragraph.
Figure 10B:
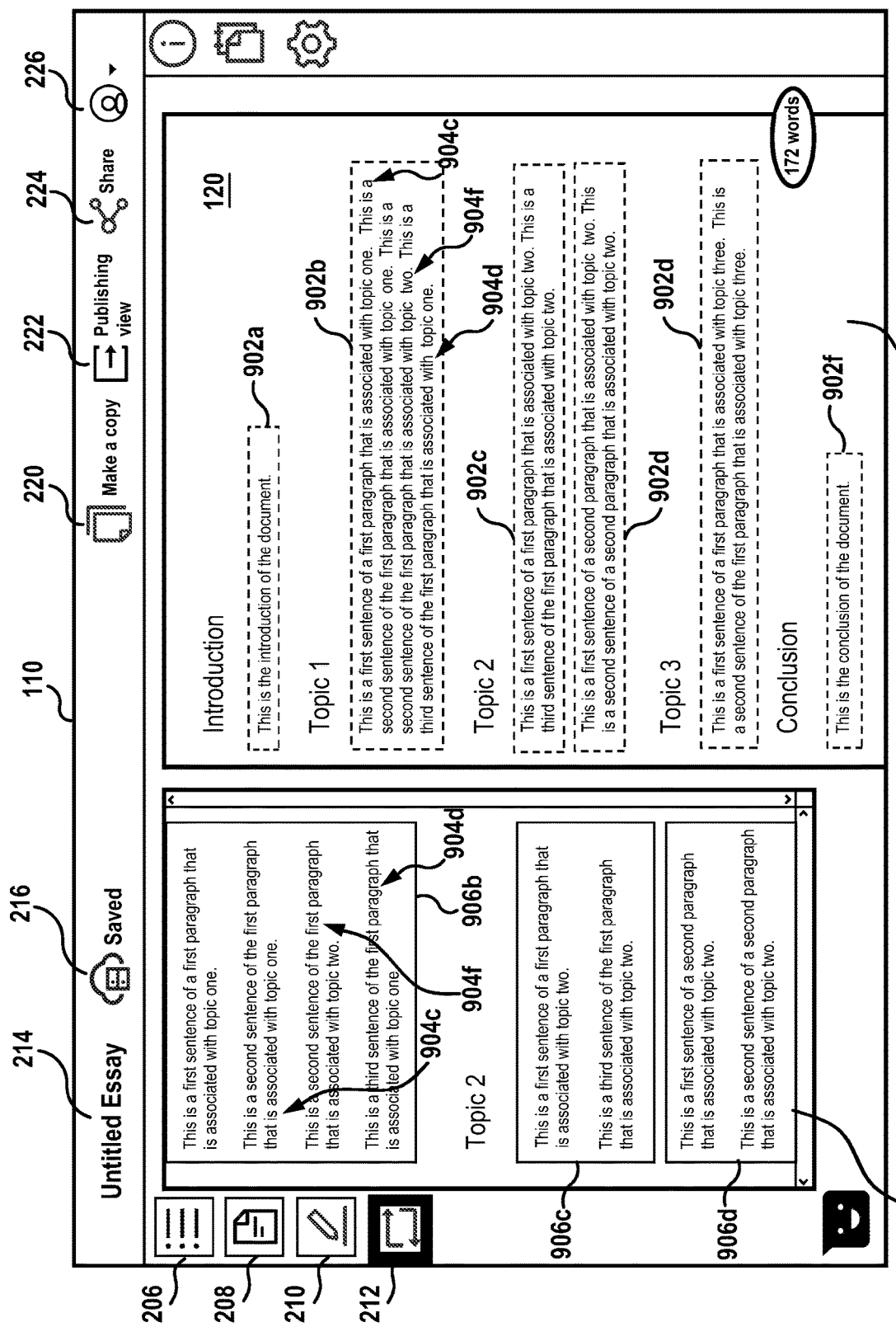

FIGS. 10A and 10B present another example in which user 104 moves a sentence—here, sentence 904f—within document 120. As illustrated in FIG. 10A, sentence 904f belongs to paragraph 902c of document 120. Accordingly, sentence reorder tool 114c initially displays sentence 904f within list 906c, which is the list that corresponds to paragraph 902c. FIG. 10B illustrates the behavior of both sentence reorder tool 114c and text editor 112 in response to user 104 moving sentence 904f from list 906c into list 906b. With respect to sentence reorder tool 114c, in response to user 104 moving sentence 904f from list 906c into list 906b, sentence reorder tool 114c is configured to display sentence 904f within list 906b, at a position dictated by user 104's movement of the sentence. In particular, in response to user 104 moving sentence 904f from list 906c to a position within list 906b located between sentence 904c and sentence 904d, document tool 102 is configured to update sentence reorder tool 114c such that sentence 904f is displayed between sentence 904c and sentence 904d within list 906b, as illustrated in FIG. 10B. With respect to text editor 112, in response to user 104 moving sentence 904f from list 906c into list 906b, at a position between sentences 904c and 904d, document tool 102 is configured to apply a corresponding movement of sentence 904f within document 120, as displayed by text editor 112. Accordingly, in response to user 104 moving sentence 904f from list 906c into list 906b, document tool 102 is configured to move sentence 904f from paragraph 902c into paragraph 902b, at a position in paragraph 902b after sentence 904c and before sentence 904d.

User 104 may move any number of sentences to new locations within sentence reorder tool 114c. This disclosure contemplates that user 104 may interact with device 106, display 108, and/or any other suitable interface connect to device 106 in any suitable manner to move a given sentence (e.g., sentence 904g) from a first position within sentence reorder tool 114c to a second position within sentence reorder tool 114c. For example, in certain embodiments, user 104 may move the sentence by (1) touching screen 108 of device 106 at a location corresponding to the first position of the sentence, as displayed within sentence reorder tool 114c, and then moving his/her finger to drag the sentence to a second location on screen 108 corresponding to the second position of the sentence within sentence reorder tool 114c, (2) using a mouse and/or trackpad associated with device 106 to click on the sentence, as displayed within sentence reorder tool 114c, and then dragging the sentence from the first position within sentence reorder tool 114c to the second position within sentence reorder tool 114c, and/or (3) using device 106, display 108, and/or a user interface coupled to device 106 to move the sentence from the first position within sentence reorder tool 114c to the second position within sentence reorder tool 114c in any other suitable manner. By enabling user 104 to reorder the sentences within document 120 simply by dragging sentence elements within sentence reorder tool 114c, certain embodiments conserve processing resources, as compared with existing text editors. In particular, certain embodiments conserve the processing resources otherwise associated with selecting a sentence by manually selecting each portion of text forming the sentence.

While FIGS. 10A and 10B illustrate the movement of a sentence from a first paragraph 902c into a given position within a second paragraph 902b, this disclosure contemplates that sentence reorder tool 114c may also be used to move a sentence from a first position within a paragraph to a second position within the same paragraph, in a similar manner, by moving the corresponding sentence element displayed by sentence reorder tool 114c from a first position within the list of sentences associated with the paragraph to a second position within the list. For example, sentence reorder tool 114c may be used to move sentence 904d of second paragraph 902b from the end of the paragraph to the middle of the paragraph, by dragging sentence 904d from the end of list 906b to the middle of list 906b, within sentence reorder tool 114c.

Figure 11:
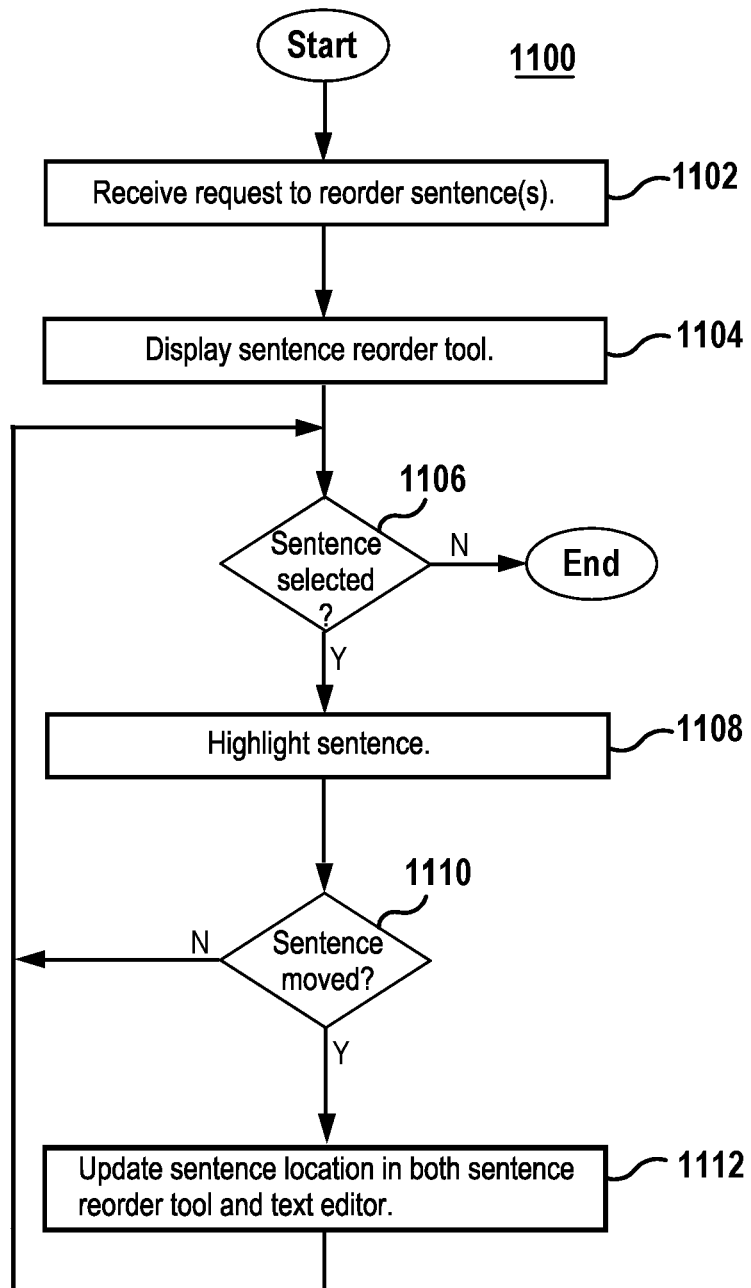
FIG. 11 presents a flowchart illustrating an example method by which the sentence reorder tool displayed in FIG. 9A may be used to reorder sentences within a document.

FIG. 11 presents a flowchart illustrating an example method 1100 (described in conjunction with elements of FIGS. 1, and 9A through 10B) by which sentence reorder tool 114c may be used to reorder the sentences within document 120.

At operation 1102 document tool 102 receives a request 134 from a user 104 seeking to reorder the sentences of document 120. Document tool 102 may receive request 134 in any suitable manner. For example, in certain embodiments, user 104 may generate request 134 by selecting sentence reorder button 212, displayed on GUI 110. At operation 1104 document tool 102 displays sentence reorder tool 114c in first region 202 of GUI 110.

At operation 1106 document tool 102 determines whether user 104 has selected a sentence displayed within sentence reorder tool 114c, to move to a new location within document 120. User 104 may select a given sentence of document 120 (as displayed within sentence reorder tool 114c) in any suitable manner. For example, in certain embodiments, user 104 may select a sentence displayed by sentence reorder tool 114c by (1) touching display 108 of device 106 at a location associated with the sentence, (2) using a mouse coupled to device 106 and/or a trackpad associated with the device to click on the sentence, and/or (3) interacting with device 106, display 108, and/or a user interface coupled to device 106 in any suitable manner to select the sentence, as it is displayed in sentence reorder tool 114c.

If, at operation 1106 document tool 102 determines that user 104 has selected a given sentence displayed by sentence reorder tool 114c, in certain embodiments, document tool 102 highlights the corresponding sentence displayed within text editor 112. For example, in some embodiments, document tool 102 may highlight the corresponding sentence displayed within text editor 112 by (1) changing the color of the background behind the sentence, (2) changing the color of the text of the sentence, (3) changing the font type of the text of the sentence, (4) changing the font size of the text of the sentence, (5) adding an outline to the sentence, and/or (6) performing any other suitable action to distinguish the sentence from the other sentences displayed by text editor 112.

At operation 1110 document tool 102 determines whether user 104 has moved the selected sentence. For example, in certain embodiments, document tool 102 determines whether user 104 has dragged the sentence from a first position within sentence reorder tool 114c to a second position within sentence reorder tool 114c. The second position within sentence reorder tool 114c may be: (1) a position within the same list of sentences in which the sentence was originally displayed (corresponding to the same paragraph within document 120), (2) a position within a different list of sentences (corresponding to a different paragraph within document 120), or (3) a position within sentence reorder tool 114c that is not within any of the existing lists displayed by the tool (corresponding to a new paragraph within document 120). If, at operation 1110 document tool 102 determines that user 104 has moved the selected sentence to a new position within sentence reorder tool 114c, at operation 1112 document tool 102 updates the position of the sentence as displayed in both sentence reorder tool 114c and text editor 112, according to the movement.

Modifications, additions, or omissions may be made to method 1100 depicted in FIG. 11. Method 1100 may include more, fewer, or other operations. For example, operations may be performed in parallel or in any suitable order. While discussed as document tool 102 (or components thereof, including, for example, sentence reorder tool 114c) performing certain operations, any suitable components of system 100, including, for example, device 106, may perform one or more operations of the method.

C. Additional Features

Figure 12A:
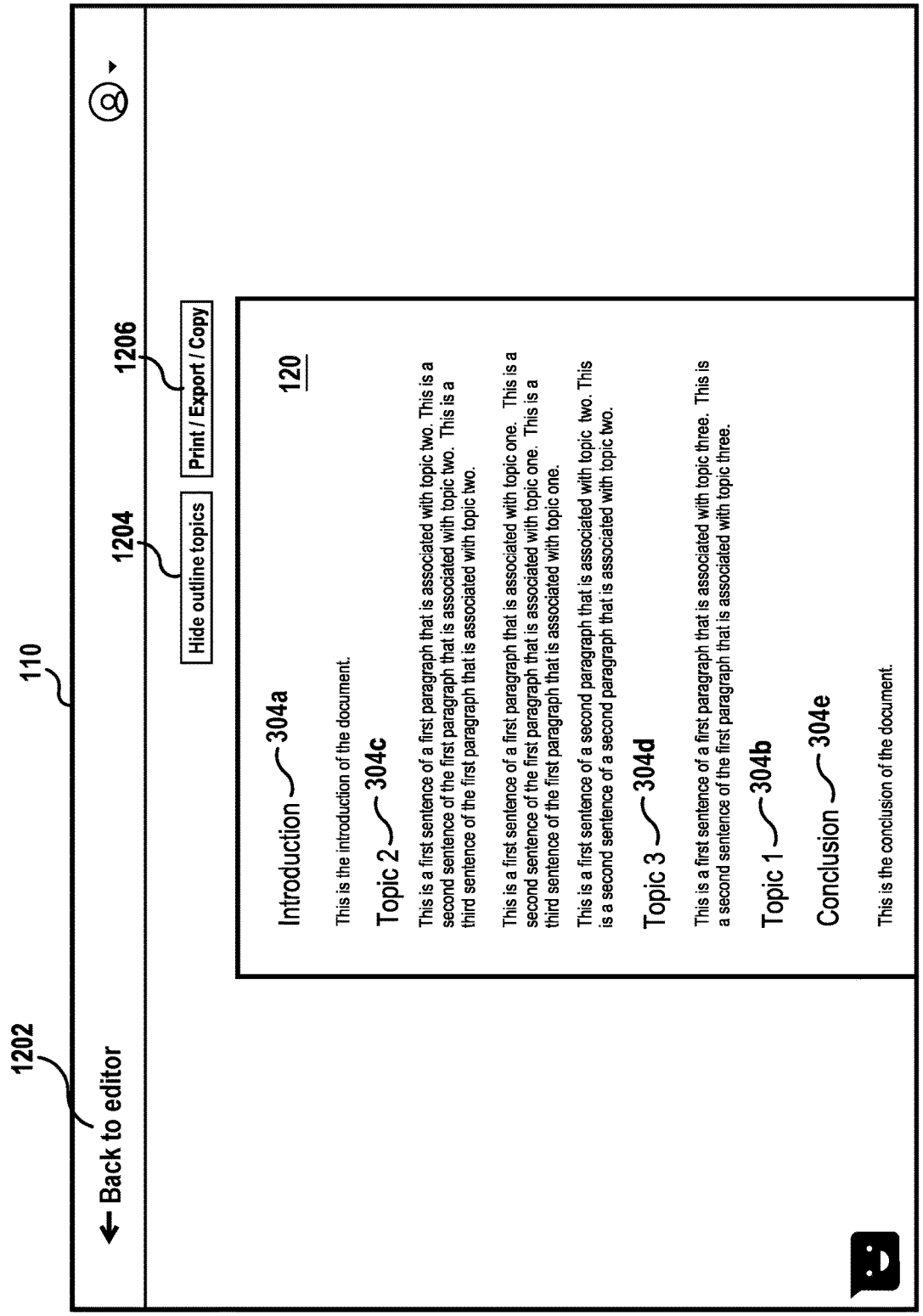
FIGS. 12A and 12B illustrate a publishing view of a document as displayed by the graphical user interface generated by the document tool of the system of FIG. 1.
Figure 14:
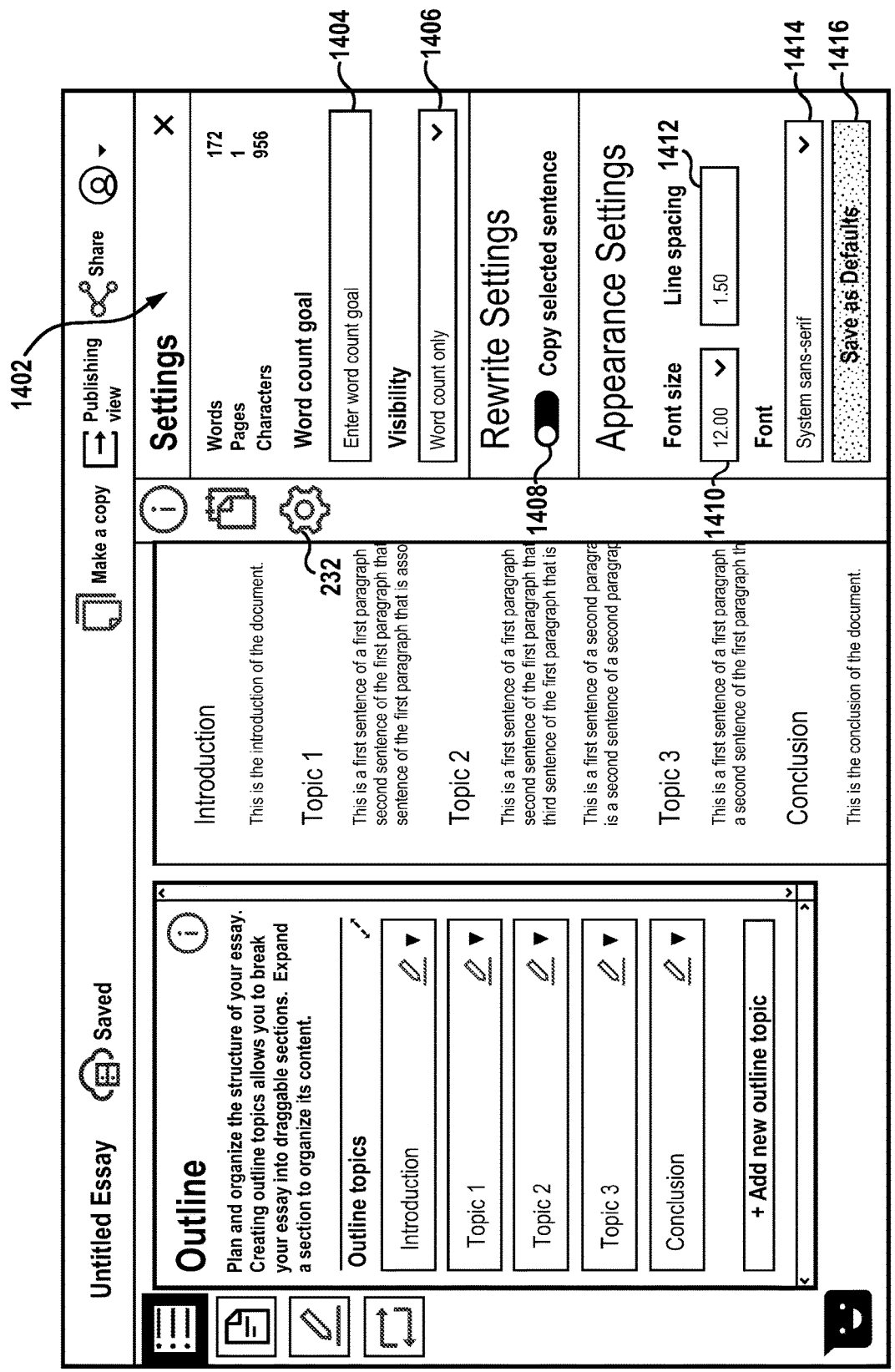
FIG. 14 illustrates an example of various customizable settings offered by the graphical user interface generated by the document tool of the system of FIG. 1.
Figure 15:
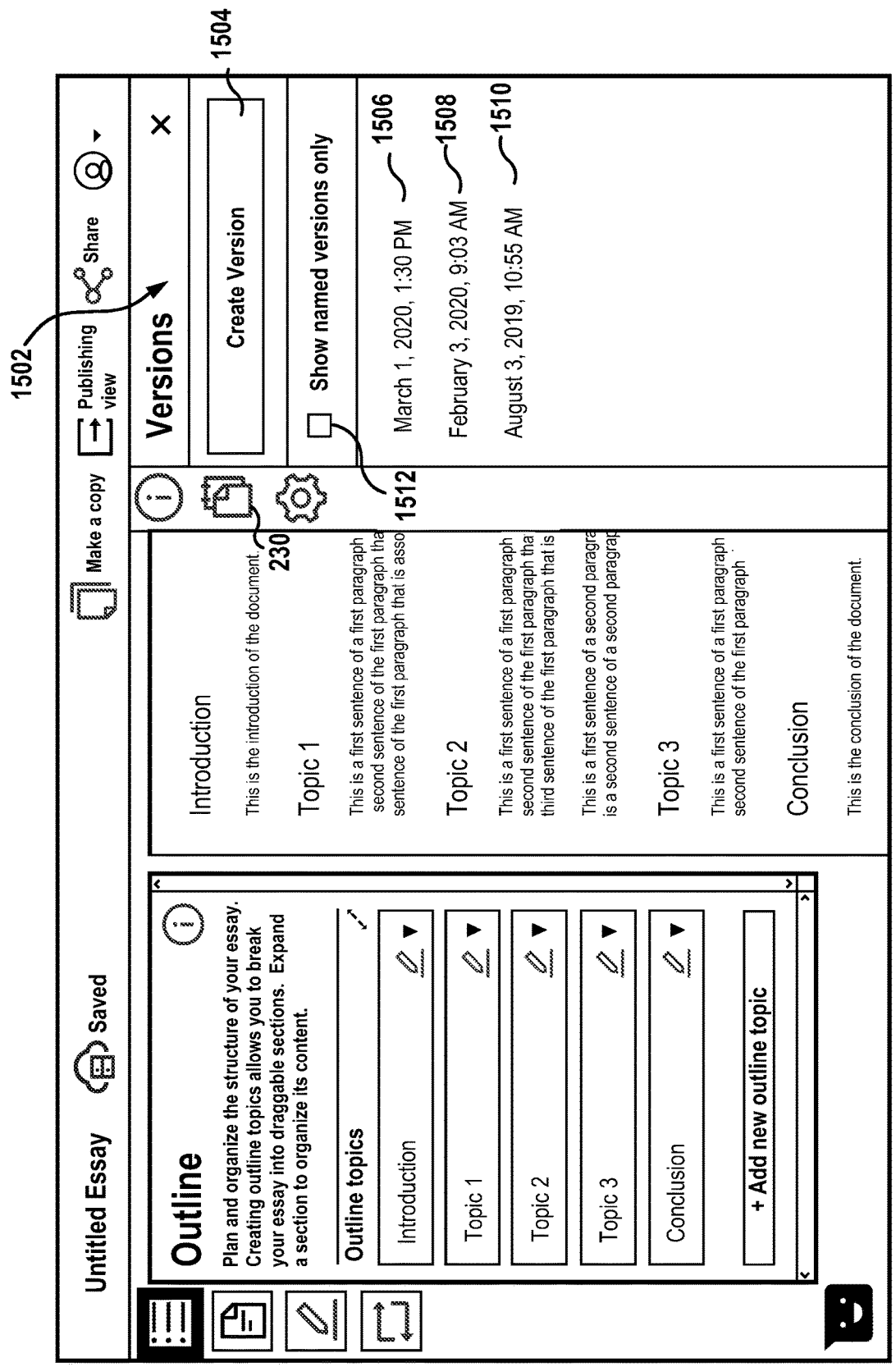
FIG. 15 illustrates a version control feature offered by the document tool of the system of FIG. 1.

FIGS. 12A through 15 illustrate examples of additional features offered by document tool 102 to user 104, through GUI 110. In particular, FIGS. 12A and 12B illustrate a document publishing view offered by document tool 102, which enables user 104 to view document 120 as it will appear when printed as a physical document and/or exported into a format for use with an external application; FIG. 13 illustrates a document production mode offered by document tool 102, which may enable user 104 to efficiently create an initial version of document 120; FIG. 14 presents examples of various settings that may be adjusted by user 104; and FIG. 15 presents an example of a version control system that may be used to generate multiple versions 122 of a given document 120.

i. Document Publishing View

As mentioned above, FIGS. 12A and 12B illustrate a document publishing view offered by document tool 102. In certain embodiments, user 104 may access the document publishing view at any point while creating and/or editing a document 120, to view how the document will appear if printed as a physical document and/or exported into an external application.

User 104 may enter the document publishing view by interacting with a button displayed on GUI 110. For example, as described above in the discussion of FIG. 2, user 104 may enter the document publishing view by interacting with button 222 displayed on GUI 110. In response to user 104 requesting that GUI 110 enter the document publishing view, document tool 102 is configured to update GUI 110 as illustrated in FIG. 12A. In particular, document tool 102 is configured to remove editing tool 114 and text editor 112 from GUI 110 and to display document 120, as it would appear if printed as a physical document and/or exported into an external application. In certain embodiments, user 104 may print and/or export document 120 from within the publishing view. As an example, in certain embodiments, user 104 may select button 1206 to instruct document tool 102 to cause a printer coupled to device 106 to print a physical copy of document 120. As another example, in certain embodiments, user 104 may select button 1206 to instruct document tool 102 to export document 120 in a specified format, for use with an external application. For instance, user 104 may select button 1206 to instruct document tool 102 to export document 120 as a PDF document, a DOC/DOCX document, a TXT document, an HTML document, and/or any other suitable format of document. As a further example, in certain embodiments, user 104 may select button 1206 to instruct document tool 102 to copy the text of document 120 to a clipboard stored by device 106. In such embodiments, user 104 may then paste the text of the document from the clipboard into an external application.

Figure 12B:
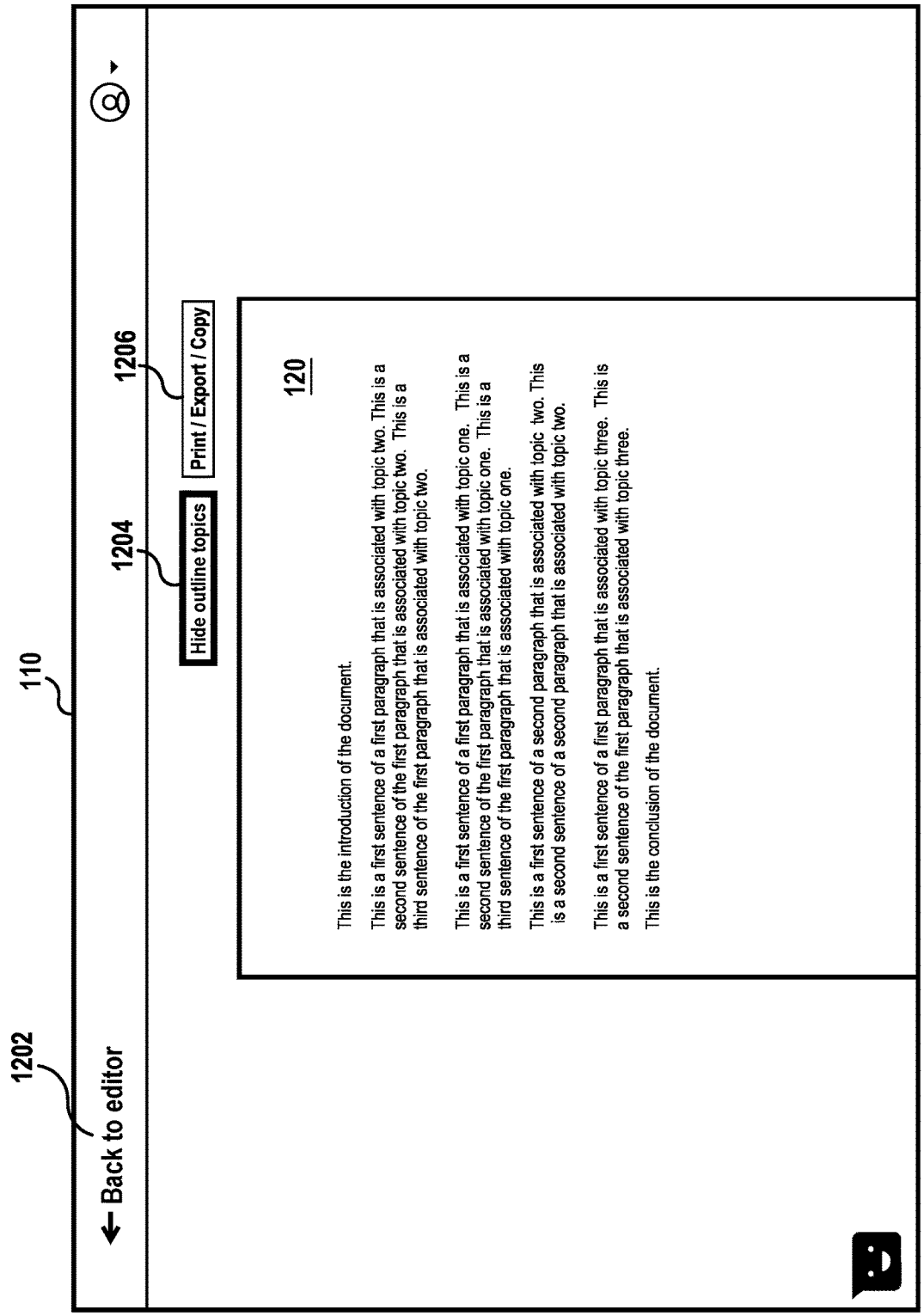

As described above, in the discussion of FIG. 2, in certain embodiments, outline topics 304a through 304e are intended to help user 104 to structure and organize the content of document 120, but are not meant to be included within the "publishable" content of document 120. In such embodiments, document publishing view may enable user 104 to view the appearance of document 120 without outline topics 304a through 304e. In particular, user 104 may interact with element 1204 to hide the outline topics within document 120. For example, in certain embodiments, in response to user 104 interacting with element 1204 (e.g., touching screen 108 at a location associated with element 1204, using a mouse/trackpad to click on element 1204, and/or interacting with element 1204 in any other suitable manner) document tool 102 may be configured to update the appearance of document 120 within the document publishing view, by removing outline topics 304a through 304e, as illustrated in FIG. 12B. In certain embodiments, user 104 may interact with element 1204 a second time to cause outline topics 304a through 304e to reappear on document 120, as displayed within the document publishing view. This disclosure contemplates that in certain embodiments, outline topics 304a through 304e are not included in the publishable content of document 120, such regardless of whether the outline topics are displayed within the document in the publishing view, when printed and/or exported, the outline topics are not included within the document content. On the other hand, in some embodiments, user 104 may choose whether or not to include outline topics 304a through 304e within the publishable content of document 120. For example, user 104 may choose to use outline topics 304a through 304e as headings within document 120. In such embodiments, user 104 may interact with element 1204 to remove the outline topics from the publishable content of document 120.

In certain embodiments, element 1204 is a "Show outline topics" button instead of the "Hide outline topics" button illustrated in FIGS. 12A and 12B. In such embodiments, in response to user 104 entering the document publishing view, GUI 110 is configured to display document 120 without any outline topics 304a through 304e (e.g., as illustrated in FIG. 12B). User 104 may then interact with the "Show outline topics" button to cause GUI 110 to display outline topics 304a through 304e on document 120 (e.g., for use as headings within document 120).

In certain embodiments, user 104 may be able to alter the appearance of document 120 in one or more additional ways, while within the document publishing view. For example, in certain embodiments, user 104 may add a title page, a table of contents, a reference section, page numbers, headers, footers, and/or any other suitable sections and/or content to document 120, while within the document publishing view.

User 104 may leave the document publishing view in any suitable manner. For example, in certain embodiments, user 104 may leave document publishing view by interacting with element 1202 (e.g., by touching display 108 at a location associated with element 1202, using a mouse and/or trackpad to click on element 1202, and/or in any other suitable manner). In response to user 104 interacting with element 1202, document editing tool 102 is configured to cause GUI 110 to display the current version of document 120 within text editor 112 and editing tool 114.

ii. Document Production Mode

FIG. 13 illustrates a document production mode offered by document tool 102. As illustrated in FIG. 13, while operating in document production mode, GUI 110 is configured to display text editor 112, but not editing tool 114. This may be desirable while user 104 is initially creating document 120, to help user 104 focus on generating a first draft of the content for document 120, rather than revising the content, before a first draft has been completed. In certain embodiments, user 104 may enter document production mode by interacting with document production button 208, displayed on GUI 110. In some embodiments, and as illustrated in FIG. 13, document tool 102 may highlight button 208 on GUI 110 when user 104 has entered the document production mode. In certain embodiments, user 104 may exit document production mode by selecting any of buttons 206, 210, and 212, thereby instructing document tool 102 to display editing tool 114 (in the form of outline tool 114a, sentence rewrite tool 114b, and sentence reorder tool 114c, respectively) on GUI 110.

iii. GUI Settings

FIG. 14 illustrates various settings that user 104 may adjust and/or set for text editor 112 and/or editing tool 114. As explained in the discussion of FIG. 2 above, in certain embodiments, user 104 may access these settings by interacting with settings button 232. In particular, in response to user 104 interacting with settings button 232, document tool 102 is configured to display the settings available to user 104 on a region 1402 of GUI 110. In certain embodiments, and as illustrated in FIG. 14, region 1402 is configured to overlap a portion of text editor 112 on GUI 110.

As illustrated in FIG. 14, in certain embodiments, the settings available to user 104 and displayed in region 1402 may include settings associated with the word count of document 120, settings associated with how user 104 may generate sentence variants for the sentences of document 120, and/or settings associated with the appearance of the content of document 120 displayed withing text editor 112 and/or editing tool 114.

a. Word Count Settings

As mentioned above, region 1402 may display one or more settings associated with the word count of document 120. For example, in certain embodiments, region 1402 displays a field 1404 into which user 104 may enter a word count goal for document 120. Region 1402 may also display a menu 1406 through which user 104 may specify information associated with the document word count, to be displayed within text editor 112. Such information may include the current word count for document 120, the word count goal for document 120, the progress the user has made toward reaching the word count goal, and/or any other suitable information associated with the word count of document 120 and/or the user's word count goal for document 120. As a specific example, in certain embodiments, user may select from amongst the following options within menu 1406: (1) "Word count only," the selection of which may cause document tool 102 to display the current word count for document 120 within element 234 of GUI 110 (as illustrated, for example, in FIG. 2); (2) "Hidden," the selection of which may cause document tool 102 not to display element 234 on GUI 110; (3) "Progress only," the selection of which may cause document tool 102 to display the user's progress towards reaching his/her word count goal within element 234 (where the user's progress may correspond, for example, to the percentage of the user's word count goal met by the current word count for document 120; and/or (3) "Progress & word count," the selection of which may cause document tool 102 to display both the current word count for document 120 and the user's progress towards reaching his/her word count goal within element 234.

b. Sentence Variant Settings

Region 1402 may also display one or more settings associated with sentence rewrite tool 114b. In particular, region 1402 may display one or more settings associated with the manner in which user 104 may use sentence rewrite tool 114c to generate sentence variants for the sentences of document 120. As an example, in certain embodiments, settings region 1402 displays a setting 1408 through which user 104 may instruct document tool 102 to automatically populate the field through which user 104 may create a new sentence variant for a given sentence of document 120 (e.g., field 714, as illustrated in FIG. 7B), with an existing sentence variant for that sentence (e.g., the currently selected sentence variant, the original sentence variant, and/or any other suitable sentence variant). Automatically populating the field through which user 104 may create a new sentence variant for a given sentence with an existing sentence variant for that sentence may be desirable where user 104 does not intend to significantly modify the sentences of document 120. In such situations, editing a copy of an existing sentence variant (e.g., the currently selected sentence variant) may be associated with less time (and, accordingly, less processing resources) than generating a new sentence variant from scratch.

While not illustrated in FIG. 14, in certain embodiments, settings region 1402 may include an additional setting through which user 104 may specify whether or not he/she would like document tool 102 to automatically generate new sentence variants for one or more of the sentences of document 120. For example, in certain embodiments in which document tool 102 includes a machine learning algorithm configured to automatically generate sentence variants for existing sentences, user 104 may use this additional setting to specify whether or not document tool 102 should apply the machine learning algorithm to the sentences of document 120.

c. Content Appearance

Region 1402 may further display one or more settings associated with the appearance of document 120 as displayed by text editor 112 and/or editing tool 114. For example, in certain embodiments, region 1402 may display (1) a field and/or menu 1410 through which user 104 may specify the font size of the text to be displayed within text editor 112 and/or editing tool 114, (2) a field and/or menu 1412 through which user 104 may specify the line spacing to be used within document 120, (3) a menu 1414 through which user 104 may specify the font type to be used within text editor 112 and/or editing tool 114, and/or (4) any other suitable field and/or menu through which user 104 may adjust the appearance of the content of document 120 as displayed within text editor 112 and/or editing tool 114.

In response to user 104 modifying one or more of the settings displayed in settings region 1402, document tool 102 may apply the modified settings to the document 120 that user 102 is currently creating/editing (e.g., document 120a). In certain embodiments, in order apply the modified settings to all of the documents that user 104 may edit in the future (e.g., future document 120b), user 104 may interact with button 1416 to save the newly modified settings as the default settings to be used by document tool 102 going forward.

In addition to the above described settings, this disclosure contemplates that settings region 1402 may display any number of settings associated with document 120, text editor 112, outline tool 114a, sentence rewrite tool 114b, and/or sentence reorder tool 114c. For example, settings region 1406 may include settings associated with paragraph indents, to be displayed within text editor 112, settings associated with lists, tables, and/or graphs that may be included within document 120, settings associated with automatically saving document 120, and/or any other suitable settings. Furthermore, document tool 102 may display the settings available to user 104 in any suitable order on GUI 110, and/or in any suitable manner.

iv. Version Control

FIG. 15 presents an example of the use of version control by document tool 102 to track multiple versions 122 of a given document 120 (e.g., versions 122a through 122n of document 120a, as illustrated in FIG. 1). As illustrated in FIG. 15, in certain embodiments, document tool 102 is configured to display a region 1502 on GUI 110 through which user 104 may access previous versions 1506 through 1510 of document 120 and/or save new versions of document 120. In certain embodiments, user 104 may cause document tool 102 to display version control region 1502 by selecting version control button 230 on GUI 110. In certain embodiments, and as illustrated in FIG. 15, region 1502 is configured to overlap a portion of text editor 112 on GUI 110.

FIG. 15 presents an example in which three previous versions—version 1506, version 1508, and version 1510—exist for document 120. Each version 1506 through 1510 corresponds to a version of document 120 in existence at a specific point in time. For example, as illustrated in FIG. 15, version 1506 corresponds to a version of document 120 in existence on Mar. 1, 2020, at 1:30 PM, version 1508 corresponds to a version of document 120 in existence on Feb. 3, 2020, at 9:03 AM, and version 1510 corresponds to a version of document 120 in existence on Aug. 3, 2019, at 10:55 AM.

Versions 1506 through 1510 of document 120 may be generated by document tool 102 in any suitable manner. As an example, in certain embodiments, document tool 102 may automatically save the current version of document 120 at regular time intervals. As another example, in certain embodiments, document tool 102 may automatically save the current version of document 120 in response to receiving an indication that user 104 has stopped interacting with the tool. For example, in certain embodiments in which GUI 110 is a web application generated by document tool 102 and presented to user 104 in a web browser displayed on display 108 of device 106, document tool 102 may be configured to automatically save a new version of document 120 in response to determining that user 104 has closed the web browser, or has navigated away from the webpage used to display GUI 110. As another example, in certain embodiments, document tool 102 may automatically save the current version of document 120 in response to determining that the content of the document has changed by at least a given percentage as compared to the last saved version. As a further example, in certain embodiments, document tool 102 may be configured to save the current version of document 120 in response to receiving a request from user 104 to save a new version of the document. For example, user 104 may instruct document tool 102 to save a new version of document 120 by interacting with button 1504 (e.g., touching screen 108 at a location associated with button 1504, using a mouse/trackpad associated with device 106 to click on button 1504, and/or interacting with button 1504 in any other suitable manner). In certain embodiments, in response to user 104 interacting with button 1504, document tool 102 may display a field into which user 104 may enter a name for the new version of the document. In this manner, in certain embodiments, user 104 may be able to distinguish versions of document 120 that the user saved him/herself from versions of the document that document tool 102 automatically saved. In order to further enable user 104 to easily distinguish between those versions of document 120 that the user saved him/herself and those versions of document 120 that document tool 102 automatically saved, in some embodiments, document tool 102 is configured to display element 1512 within region 1502. User 104 may interact with element 1512 to switch between region 1502 displaying all versions 1506 through 1510 of document 120 and region 1502 displaying only those versions of document 120 that the user 104 caused to be saved and/or named.

As previously explained, each version 1506 through 1510 of document 120 corresponds to a version of document 120 as it existed at an earlier point in time. Saving these earlier versions of document 120 may be desirable to enable user 104 to revert to an earlier version of document 120 when desired. User 104 may instruct document tool 102 to revert document 120 back to an earlier version of the document in any suitable manner. As an example, in certain embodiments, user 104 may instruct document tool 102 to revert to an earlier version of document 120, by selecting one of the earlier versions (e.g., versions 1506 through 1510) displayed in version control region 1502. In particular, in some embodiments, selecting one of the earlier versions of document 120 that is listed in region 1502 may cause document tool 102 to replace the current version of document 120 with the selected version. Document tool 102 may then update the content displayed by text editor 112 and editing tool 114 to reflect the changed content of document 120 (from the current version back to the earlier version). As another example, in some embodiments, in response to user selecting one of the earlier versions of document 120 (e.g., one of versions 1506 through 1510) listed in version control region 1502, document tool 102 may update GUI 110 to display a preview of the earlier document version. In this manner, user 104 may view the content of the earlier version prior to reverting document 120 back to that earlier version. In certain such embodiments, user 104 may choose to replace the current version of document 120 with the earlier version of the document while viewing the preview of the earlier version. For example, document tool 102 may display a button through which user 104 may revert document 120 back to the earlier version, alongside the preview of the earlier version.

III. Document Data Structure

As described above, in the discussion of FIGS. 3A through 11, document tool 102 is configured to integrate editing tool 114 with text editor 112, such that user 104 may edit document 120 using both editing tool 114 and text editor 112. In particular, the content displayed by editing tool 114 is linked with the content displayed by text editor 112, such that changes made to document 120 using editing tool 114 are reflected in the content displayed by text editor 112, and vice versa. As an example, user 104 may use editing tool 114 to reorder the content of document 120, as displayed by both editing tool 114 and text editor 112, as described above, in the discussion of FIGS. 4A through 5C, and 9A through 10B. Similarly, user 104 may use editing tool 114 to select from amongst a set of sentence variants available for a given sentence of document 120, with the user's selection immediately reflected in text editor 112, as described above, in the discussion of FIGS. 7A through 7D. In certain embodiments, the linking between the content displayed by editing tool 114 and the content displayed by text editor 112 is accomplished by representing document 120 using a document data structure. As example of the form the document data structure may take is presented in FIG. 16.

A. Example Form

Figure 16:
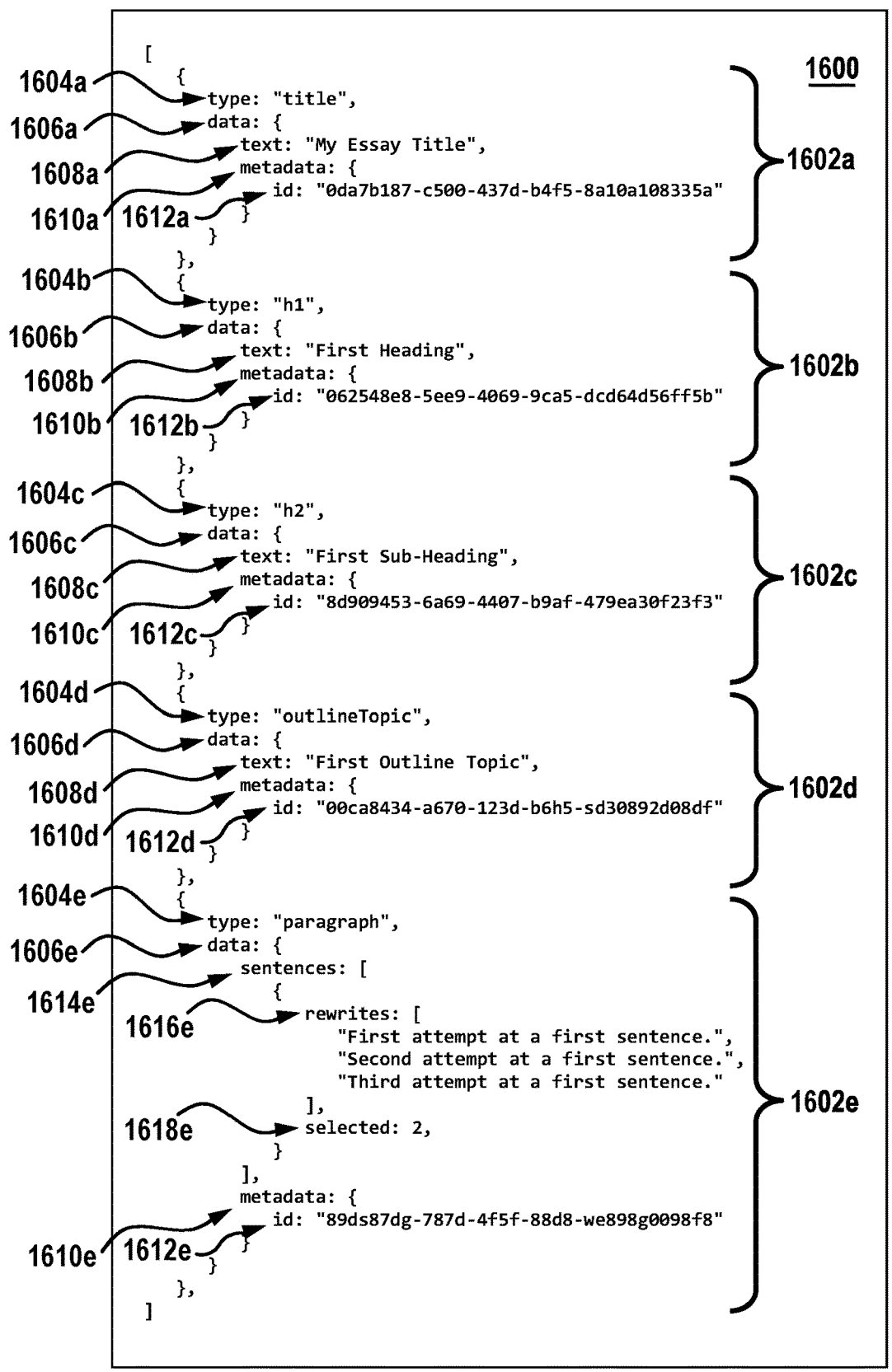
FIG. 16 illustrates an example document data structure generated by the document tool of the system of FIG. 1.

FIG. 16 illustrates an example document data structure 1600 generated by document tool 102 and used by the tool to represent a document 120. As illustrated in FIG. 16, data structure 1600 is formed from a set of data blocks 1602a through 1602e. In certain embodiments, data structure 1600 is an array in which each data block 1602a through 1602e corresponds to an element of the array. While FIG. 16 illustrates document data structure 1600 as an array composed of a set of five data blocks 1602a through 1602e, this disclosure contemplates that data structure 1600 may include any number of data blocks 1602a through 1602e, each of which is referred to generically in the discussion that follows as a data block 1602.

Each data block 1602 of data structure 1600 stores a portion of the content of document 120. This content may be stored by data block 1602 in any suitable manner. For example, in certain embodiments, and as illustrated in FIG. 16, each data block 1602a through 1602e includes a set of key-value pairs that are used to store document content and/or information associated with the stored document content. In particular, in certain embodiments, each data block 1602 may include a key-value pair that stores a "type" 1604 assigned to the data block, as well as a key-value pair that stores a set of "data" 1606 associated with document 120, where the form of the data 1606 stored by the block depends on the type assigned to the block. As an example, as illustrated in FIG. 16, first data block 1602a is assigned to a "title" data block type 1604a, and stores data 1606a that includes a string of text 1608a that corresponds to the title of document 120. As another example, second data block 1602b is assigned to an "h1" data block type 1604b and stores data 1606b that includes a string of text 1608b that corresponds to a heading within document 120. As another example, third data block 1602c is assigned to an "h2" data block type 1604c and stores data 1606c that includes a string of text 1608c that corresponds to a sub-heading within document 120. As another example, fourth data block 1602d is assigned to an "outlineTopic" data block type 1604d and stores data 1606d that includes a string of text 1608d that corresponds to the name of an outline topic used within document 120. As a further example, fifth data block 1602e is assigned to a "paragraph" data block type 1604e and stores data 1606e that includes one or more sentences 1614e that form a given paragraph of document 120. In certain embodiments, the one or more sentences 1614e are stored as an array of strings of text, with each string of text of the array corresponding to a sentence of the paragraph of document 120 that is stored by data block 1602d. In some embodiments, and as illustrated in FIG. 16, paragraph data block 1602e may store multiple sentence variants for any of the sentences 1614e that are stored by the data block. For a given sentence of document 120, such sentence variants may be stored as set of sentence rewrites 1616e. As a specific example, as illustrated in FIG. 16, set of sentence rewrites 1616e stored by paragraph data block 1602e includes the following three sentence variants for a first sentence of the paragraph stored by the data block: "First attempt at a first sentence."; "Second attempt at a first sentence."; and "Third attempt at a first sentence." For each set of sentence rewrites (variants) 1616e, paragraph data block 1602e also stores an identification 1618e of a selected sentence variant that is to be included in document 120. Paragraph data block 1602e may store such identification 1618e in any suitable manner. For example, as illustrated in FIG. 16, set of rewrites (variants) 1616e stores each of its sentence variants as an element of an array, and the identification 1618e of the selected sentence variant that is to be included in document 120 corresponds to an identification of the position within the array (e.g., position 2) at which the selected sentence variant (e.g., "Second attempt at a first sentence.") is stored. While not illustrated in FIG. 16, this disclosure also contemplates that in certain embodiments, paragraph data block 1602e may also store one or more references/citations for any of the sentences 1614e that are stored by the data block. For example, where document 120 is a scientific article, paragraph data block 1602e may store a citation to another scientific article that provides support for the idea expressed by a given sentence stored by the data block.

While FIG. 16 illustrates only a "title" data block type 1604a, an "h1" heading data block type 1604b, an "h2" sub-heading data block type 1604c, an "outlineTopic" data block type 1604d, and a "paragraph" data block type 1604e, this disclosure contemplates that data structure 1600 may include data blocks 1602 of any number of additional data block types 1604 including, for example, data block types 1604 corresponding to additional levels of sub-headings "h3" through "hN."

In certain embodiments, each data block 1602a through 1602e also stores metadata 1610a through 1610e. Metadata 1610 may include any information that is not part of the content of document 120 but is used by document tool 120 to create, display, edit, and/or save document 120. For example, in certain embodiments, and as illustrated in FIG. 16, metadata 1610 may include an identification number 1612 that is used by document tool 102 to identify a given data block 1602. Document tool 102 may assign any suitable identification number 1612 to a given data block 1602. For example, in certain embodiments, each identification number 1612 may take the form of a fourth-generation universally unique identifier (UUIDv4). In certain embodiments, identification numbers 1612 may be stored outside of metadata 1610. For example, in some embodiments, identification number 1612 may be stored at the base level of data block 1602.

Identification numbers 1612 enable document tool 102 to identify a given data block 1062 within data structure 1600 even after the content stored by the data block has changed and/or the position of the data block within data structure 1600 has changed. In certain embodiments, document tool 102 may use identification numbers 1612 when saving new versions of document 120. For example, in certain embodiments, document tool 102 is configured to save a new version 122b of document 120 by saving the changes made to the document as compared with a previous version 122a of the document (e.g., the original version of document 120, the most recently saved version of document 120, and/or any other suitable previous version of document 120). In such embodiments, identification numbers 1612a through 1612e may be used to identify those data blocks within the new version of data structure 1600 that have changed (both in terms of location within data structure 1600 and content stored), as compared with a previous version of the data structure. By saving a new version 122b of document 120 by saving the changes made to the document as compared with a previous version 122a of the document, rather than saving the entire content of the new document, certain embodiments conserve significant storage resources as compared with existing systems.

Data blocks 1602a through 1602e are interchangeable in their position within data structure 1600. For example, the positions of a pair of data blocks (e.g., data block 1602a and data block 1602b) may be exchanged within data structure 1600, a given data block 1602 may be moved to an earlier position within the data structure, and/or a given data block 1602 may be move to a later position within the data structure. New data blocks may be added to data structure 1600 at any position within the data structure, and existing data blocks 1602 may be deleted from the data structure.

Changes may be made to data structure 1600 using text editor 112 and/or editing tool 114. In certain embodiments, document tool 102 may edit document data structure 1600 directly, in response to user 104 using text editor 112 and/or editing tool 114 to edit document 120. As an example, in certain embodiments in which editing tool 114 takes the form of sentence rewrite tool 114b, in response to user 104 using sentence rewrite tool 114b to create one or more new sentence variants for a given sentence of document 120 (e.g., one of sentences 1614e stored in paragraph data block 1602e), document tool 102 may access the paragraph data block that stores the sentence (e.g., data block 1602e), and add the sentence variants to the set of rewrites (variants) associated with the given sentence (e.g., set of rewrites 1616e). As another example, in some embodiments in which editing tool 114 takes the form of sentence rewrite tool 114b, in response to user 104 using sentence rewrite tool 114b to select a new sentence variant of a set of sentence variants (e.g., set of rewrites (variants) 1616e) for inclusion in document 120, document tool 102 may access the paragraph data block that stores the set of sentence variants (e.g., data block 1602e), and update the identification of the selected sentence variant that is to be included in document 120 (e.g., identification 1618e).

In some embodiments, document tool 102 may be configured to convert document data structure 1600 into an intermediate form and to apply edits made by user 104 through text editor 112 and/or editing tool 114 to that intermediate form. Once user 104 has finished editing document 120 (either permanently or temporarily), document tool 102 may convert the intermediate form back to document data structure 1600. As an example, in certain embodiments in which editing tool 114 takes the form of outline tool 114a, document tool 102 may convert document data structure 1600 into an intermediate form referred to as an "outline tool representation," before applying any edits made by user 104 to document 120 using outline tool 114a in conjunction with text editor 112. The outline tool representation of a given document data structure 1600 includes a set of outline topic elements, each of which corresponds to a data block of the "outlineTopic" type (e.g., "outlineTopic" data block 1602d) of data structure 1600. In generating the outline tool representation of document data structure 1600, document tool 102 is configured to identify each "outlineTopic" data block 1602d within data structure 1600, and to generate an element within the outline tool representation that corresponds to that "outlineTopic" data block. Document tool 102 is then configured to assign each data block of a type other than the "outlineTopic" type to an outline topic element, as a sub-element of that outline topic element. In particular, document tool 102 is configured to assign each data block of a type other than the "outlineTopic" type to the outline topic element corresponding to the nearest preceding "outlineTopic" data block within data structure 1600. In certain embodiments in which the first data block of document data structure 1600 is not of the "outlineTopic" data block type, document tool 102 is configured to assign any of the data blocks 1602 appearing before the first data block of the "outlineTopic" type as sub-elements of a special element located at the beginning of the outline tool representation of data structure 1600.

When the above-described outline tool representation is used to represent document 120, each element of the representation corresponds to an element displayed by outline tool 114a (e.g., one of outline topic elements 302a through 302e), as described above in the discussion of FIGS. 3A through 5C. In particular, adding a new outline topic (e.g., outline topic 304e) to document 120, by using outline tool 114a to generate a new outline topic element (e.g., outline topic element 302e), as described in the discussion of FIGS. 3B through 3D, corresponds to adding a new element to the outline topic representation of document 120. Similarly, repositioning an outline topic and its associated document content within document 120, by using outline tool 114a to reorder the sequence of outline topic elements (e.g., sequence 302a through 302e), as described in the discussion of FIGS. 4A and 4B, corresponds to reordering the elements within the outline topic representation of document 120. Moving a given paragraph, heading, sub-heading, and/or title within document 120 (e.g., paragraph 502), by using outline tool 114a to move the associated content from a first outline topic element (e.g., element 302b) to a second outline topic element (e.g., element 302c), as described in the discussion of FIGS. 5A through 5C, corresponds to moving a corresponding sub-element within the outline topic representation of document 120.

As another example of an intermediate form into which document data structure 1600 may be converted, in certain embodiments in which editing tool 114 takes the form of sentence reorder tool 114c, document tool 102 is configured to convert document data structure 1600 into a "reorder tool representation." The reorder tool representation of document 120 represents the content stored by the data blocks 1602 of data structure 1600 as a sequence of elements, where the properties of each element are determined based on the data block type 1604 assigned to the corresponding data block. In particular, the content of each data block assigned to the "title," "h1," "h2," or "outlineTopic" type is assigned to an immutable and immovable element within the reorder tool representation. Document tool 102 correspondingly displays each such element as an immutable and immovable element with reorder tool 114c. For example, as illustrated in FIG. 9A, user 104 is unable to interact with the names of the outline topics (e.g., "Introduction," and "Topic 1") displayed within reorder tool 114c. On the other hand, each sentence of each data block assigned to the "paragraph" type is assigned to a moveable element within the reorder tool representation. In particular, each data block assigned to the "paragraph" type is associated with a list of elements, and each sentence stored by the paragraph data block corresponds to an element within the list. Each element is moveable to any of: (1) a new position within the list in which the element is stored (e.g., the same paragraph), (2) a new position within a different list from the list in which the element is stored (e.g., a list associated with a different paragraph), and/or (3) a new position within a new list (e.g., a newly created list corresponding to a newly created paragraph). Document tool 102 displays each sentence element as a moveable element within reorder tool 114c. For example, as illustrated in FIGS. 9A and 9B, each sentence 904a through 904i is displayed within reorder tool 114c as a separate, moveable element. As described above, in the discussion of FIGS. 9A through 10B, user 104 may then reorder the sentences within document 120 by reordering sentence elements 904a through 904i within reorder tool 114c.

B. Use of Document Data Structure with Outline Tool

Figure 17:
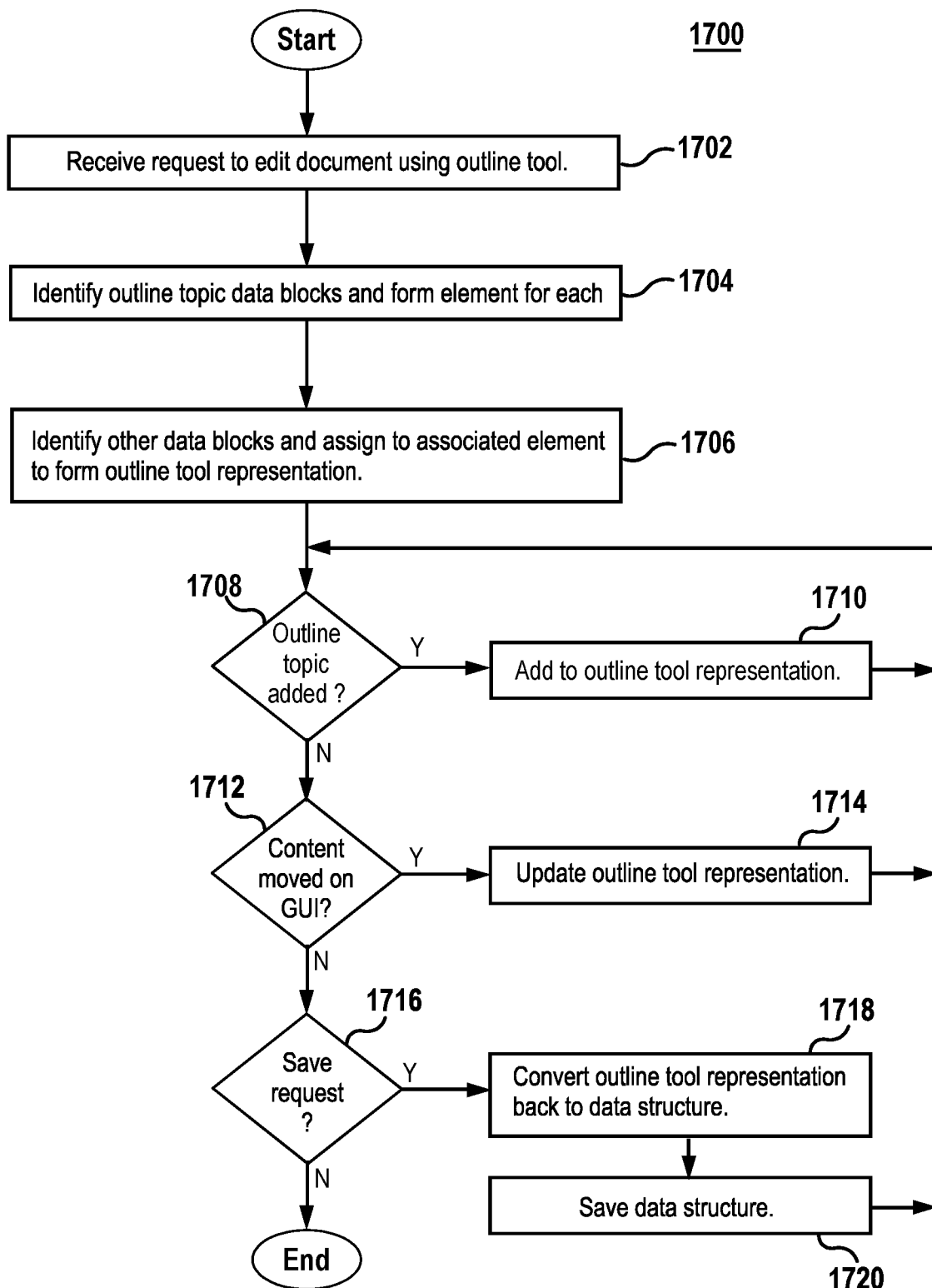
FIG. 17 presents a flowchart illustrating an example method by which the document tool of the system of FIG. 1 uses the document data structure of FIG. 16 to link the text editor and outline tool of FIG. 3A.

FIG. 17 presents a flowchart illustrating an example method 1700 (described in conjunction with elements of FIGS. 1, 3A through 5C, and 16) by which document tool 102 uses data structure 1600 to link text editor 112 with outline tool 114c, such that edits made to document 120 using outline tool 114c are reflected in document 120, as displayed by text editor 112.

At operation 1702 document tool 102 receives a request 134 to edit document 120 using outline tool 114c. Document tool 102 may receive request 134 in any suitable manner. For example, in certain embodiments, user 104 may transmit request 134 to document tool 102 by selecting outline tool button 206, displayed on GUI 110 (as illustrated, for example, in FIG. 3A). At operation 1704 document tool 102 generates an outline tool representation for document 120 from the document data structure 1600 corresponding to document 120. In particular, document tool 102 identifies each data block 1602 within document data structure 1600 that is of the "outlineTopic" data block type 1604d. For each identified data block 1602 of the "outlineTopic" data block type, document tool 102 generates an outline topic element (e.g., an outline topic element of the set of outline topic elements 302a through 302e illustrated in FIGS. 3A through 3D). In certain embodiments in which the first data block stored in data structure 1600 is not assigned to the "outlineTopic" data block type, document tool 102 generates a special outline topic element that does not correspond to any actual outline topic within document 120. At operation 1706 document tool 102 assigns each of the remaining data blocks 1602 (e.g., data blocks that are assigned to data block types other than the "outlineTopic" data block type) to the outline topic elements with which they are associated, as sub-elements of those outline topic elements. In particular, document tool 102 assigns each non-"outlineTopic" data block to the outline topic element corresponding to the nearest preceding "outlineTopic" data block within document data structure 1600. In certain embodiments in which one or more data blocks 1602 of types other than the "outlineTopic" data block type appear in data structure 1600 before any data blocks of the "outlineTopic" type, document tool 102 assigns those data blocks to the special outline topic element. Document tool 102 then displays the outline topic elements of the outline tool representation in outline tool 114c on GUI 110.

At operation 1708 document tool 102 determines whether any new outline topics have been added to document 120. For example, document tool 102 may determine whether user 104 has added a new outline topic element (e.g., outline topic element 302e) to document 120 using outline tool 114a, as illustrated in FIGS. 3C and 3D. If, at operation 1708 document tool 102 determines that a new outline topic has been added to document 120, at operation 1710 document tool 102 adds the new outline topic to the outline tool representation of document 120. In particular, document tool 102 adds a new element, which is associated with the new outline topic, to the outline tool representation of document 120. Document tool 102 also updates GUI 110 to reflect the introduction of the new outline topic. Method 1700 then returns to operation 1708.

If, at operation 1708 document tool 102 determines that a new outline topic has not been added to document 120, at operation 1712 document tool 102 determines whether any of the document content displayed by outline tool 114a has been moved within the outline tool. For example, document tool 102 may determine whether any of the outline topic elements (e.g., outline topic elements 302a through 302e, as illustrated in FIG. 4A) displayed by outline tool 114a have been reordered within outline tool 114a. As another example, document tool 102 may determine whether any of the document content associated with a given outline topic element (e.g., paragraph 502 associated with outline topic element 302b, as illustrated in FIG. 5A) has been moved to a new outline topic element (e.g., from outline topic element 302b to outline topic element 302c, as illustrated in FIG. 5B). If, at operation 1712 document tool 102 determines that document content displayed by outline tool 114a has been moved with the tool, at operation 1714 document tool 102 updates the outline tool representation of document 120 accordingly. Document tool 102 additionally updates GUI 110 to reflect the changes made to document 120. Method 1700 then returns to operation 1708.

If, at operation 1712 document tool 102 determines that document content displayed by outline tool 114a has not been moved within the tool, at operation 1716 document tool 102 determines whether user 104 has submitted a request to save the current version of document 120. If, at operation 1716 document tool 102 determines that user 104 has submitted a request to save the current version of document 120, at operation 1718 document tool 102 converts the outline tool representation of document 120 back into data structure 1600. In particular, document tool 102 flattens the nested structure of the outline tool representation of document 120, such that each element and each sub-element of the outline tool representation is converted back into a data block 1602 of data structure 1600. At operation 1720 document tool 102 saves data structure 1600 in database 118 as a new version 122 of document 120. Method 1700 then returns to operation 1708.

Modifications, additions, or omissions may be made to method 1700 depicted in FIG. 17. Method 1700 may include more, fewer, or other operations. For example, operations may be performed in parallel or in any suitable order. As an example, while method 1700 illustrates the decisions associated with operations 1708, 1712, and 1716 performed sequentially and in a specific order, these decisions may be performed in parallel, or in any suitable order. As another example, in certain embodiments, document tool 102 automatically saves document 120 after any changes have been made to the document. In such emboWhile discussed as document tool 102 (or components thereof, including, for example, outline tool 114c) performing certain operations, any suitable components of system 100, including, for example, device 106, may perform one or more operations of the method.

C. Use of Document Data Structure with Sentence Rewrite Tool

Figure 18:
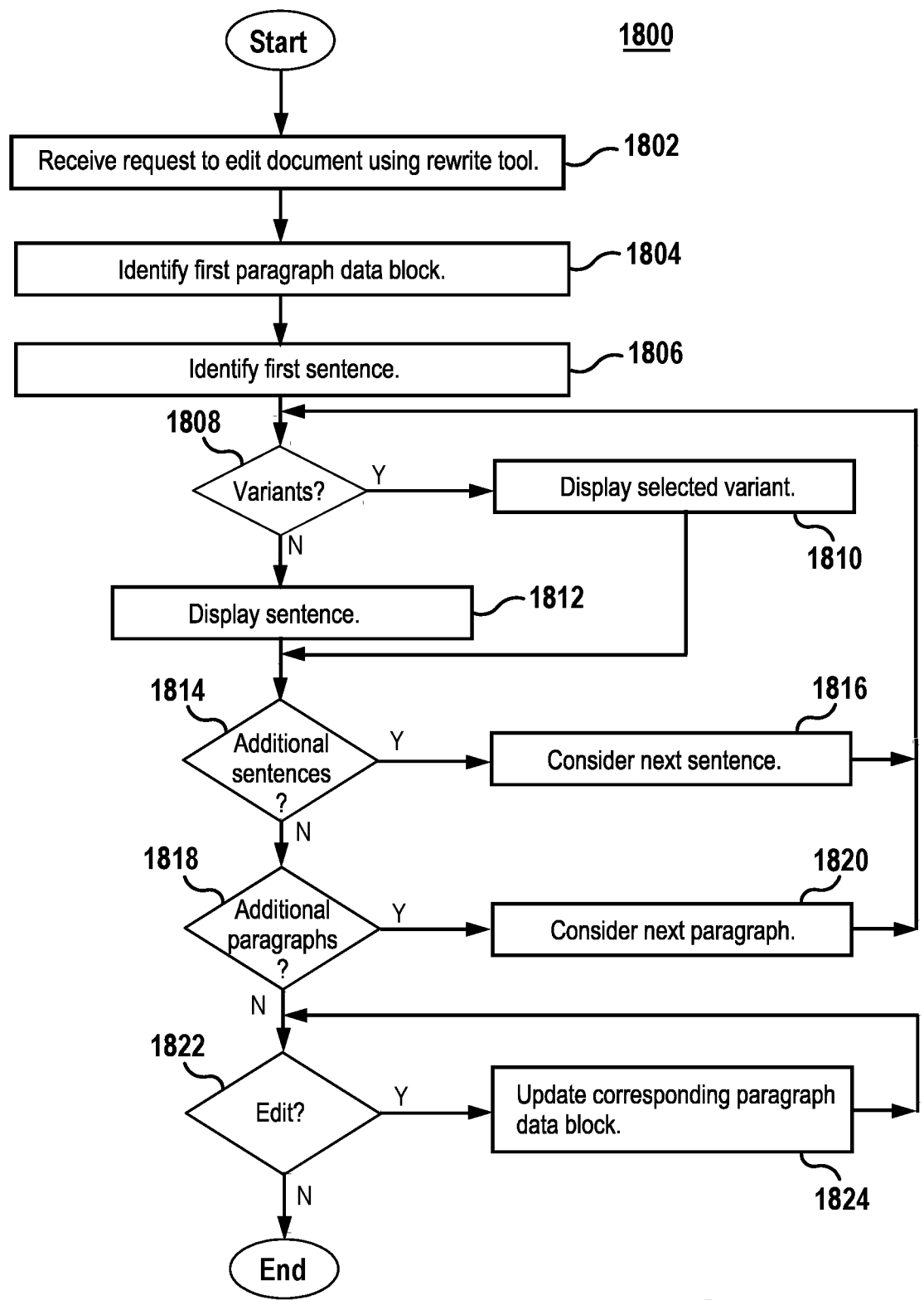
FIG. 18 presents a flowchart illustrating an example method by which the document tool of the system of FIG. 1 uses the document data structure of FIG. 16 to link the text editor and sentence rewrite tool of FIG. 7A.

FIG. 18 presents a flowchart illustrating an example method 1800 (described in conjunction with elements of FIGS. 1, 7A through 7D, and 16) by which document tool 102 uses data structure 1600 to link text editor 112 with sentence rewrite tool 114b, such that edits made to document 120 using sentence rewrite tool 114b may be reflected in the document, as displayed by text editor 112.

At operation 1802 document tool 102 receives a request 134 to edit document 120 using sentence rewrite tool 114b. Document tool 102 may receive request 134 in any suitable manner. For example, in certain embodiments, user 104 may transmit request 134 to document tool 102 by selecting sentence rewrite button 210, displayed on GUI 110 (as illustrated, for example, in FIG. 7A). At operation 1804 document tool 102 identifies a first paragraph data block (e.g., data block 1602e, illustrated in FIG. 16) within document data structure 1600. At operation 1806 document tool 102 identifies a first sentence of an array of sentences stored by the paragraph data block. At operation 1808 document tool 102 determines whether the identified sentence is stored within document data structure 1600 as a single sentence or as a set of sentence variants. If, at operation 1808 document tool 102 determines that the sentence is stored within document data structure 1600 as a set of sentence variants, at operation 1810 document tool 102 identifies the selected sentence variant of the set of sentence variants based on identification information stored along with the set of sentence variants (e.g., identification 1618e, stored along with set of sentence variants 1616e within paragraph data block 1602e). Document tool 102 then displays the selected sentence variant in both sentence rewrite tool 114b and in text editor 112, as part of document 120. If, at operation 1808 document tool 102 determines that the sentence is stored within document data structure 1600 as a single sentence, at operation 1812 document tool 102 displays that single sentence in both sentence rewrite tool 114b and in text editor 112, as part of document 120.

At operation 1814 document tool 102 determines whether any additional sentences are stored within the paragraph data block of data structure 1600 under consideration. If, at operation 1814 document tool 102 determines that the paragraph data block under consideration includes one or more additional sentences, at operation 1816 document tool 102 considers the next sentence stored within the paragraph data block. Method 1800 then returns to operation 1808. If, at operation 1814 document tool 102 determines that the paragraph data block under consideration does not include any additional sentences, at operation 1818 document tool 102 determines whether document data structure 1600 includes any additional paragraph data blocks. If, at operation 1818 document tool 102 determines that document data structure 1600 includes one or more additional paragraph data blocks, at operation 1820 document tool 102 considers the next paragraph data block included within document data structure 1600. Method 1800 then returns to operation 1808.

At operation 1822 document tool 102 determines whether an edit has been made to a sentence stored within a paragraph data block of document data structure 1600 using sentence rewrite tool 114b. In particular, document tool 102 determines whether a new sentence variant has been created for the sentence, and/or whether a new selection has been made of a sentence variant of a set of sentence variants associated with the sentence, for inclusion within document 120. If, at operation 1822 document tool 102 determines that an edit has been made to a sentence stored within a paragraph data block of data structure 1600 using sentence rewrite tool 114b, at operation 1824 document tool 102 updates both the paragraph data block of data structure 1600 that stores the sentence, as well as the content of the document 120 as displayed by GUI 110, to reflect the edit. As an example, if, at operation 1822 document tool 102 determines that sentence rewrite tool 114b was used to add a new sentence variant to a sentence stored within a paragraph data block of document data structure 1600 (e.g., a new sentence variant was added to one of sentences 1614e stored by paragraph block 1602e of data structure 1600 as illustrated in FIG. 16), at operation 1824 document tool 102 adds the new sentence variant to the corresponding set of sentence variants associated with the sentence (e.g., set of sentence variants 1616e), and displays the new sentence variant in sentence rewrite tool 114b. As another example, if, at operation 1822 document tool 102 determines that sentence rewrite tool 114b was used to select a new sentence variant of a set of sentence variants associated with a particular sentence of document 120, at operation 1824 document tool 102 (1) updates the identification of the selected sentence variant stored within data block, (2) updates sentence rewrite tool 114b to reflect the updated identification, and (3) updates text editor 112 by replacing the previous sentence variant that was displayed within document 120 with the newly selected sentence variant. Method 1800 then returns to operation 1822.

Modifications, additions, or omissions may be made to method 1800 depicted in FIG. 18. Method 1800 may include more, fewer, or other operations. For example, operations may be performed in parallel or in any suitable order. While discussed as document tool 102 (or components thereof, including, for example, sentence rewrite tool 114b) performing certain operations, any suitable components of system 100, including, for example, device 106, may perform one or more operations of the method.

D. Use of Document Data Structure with Sentence Reorder Tool

Figure 19:
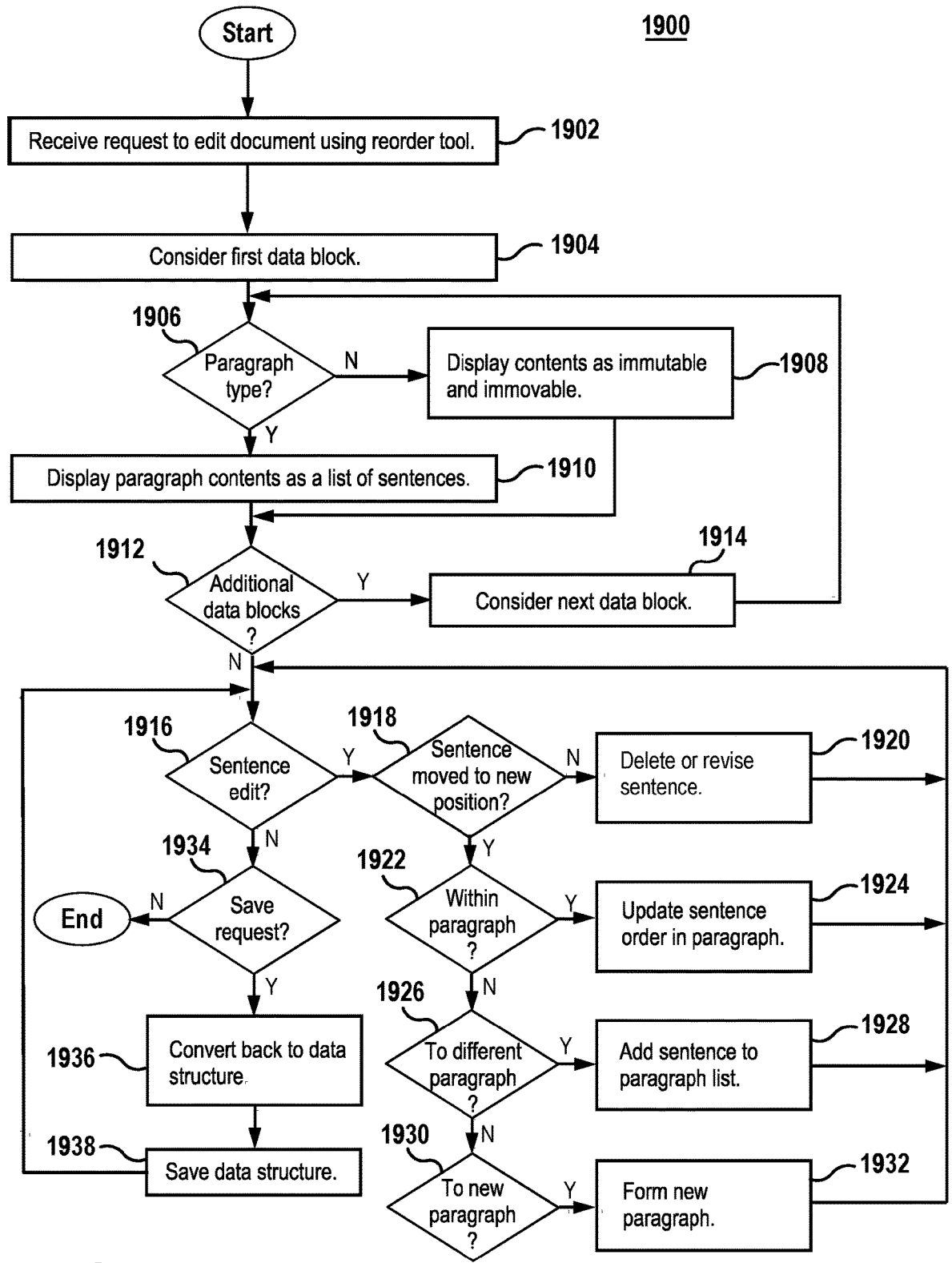
FIG. 19 presents a flowchart illustrating an example method by which the document tool of the system of FIG. 1 uses the document data structure of FIG. 16 to link the text editor and sentence reorder tool of FIG. 9A.

FIG. 19 presents a flowchart illustrating an example method 1900 (described in conjunction with elements of FIGS. 1, 9A through 10B, and 16) by which document tool 102 uses data structure 1600 to link text editor 112 with sentence reorder tool 114c, such that edits made to document 120 using sentence reorder tool 114c are reflected in the document, as displayed by text editor 112.

At operation 1902 document tool 102 receives a request 134 to edit document 120 using sentence reorder tool 114c. Document tool 102 may receive request 134 in any suitable manner. For example, in certain embodiments, user 104 may transmit request 134 to document tool 102 by selecting sentence reorder button 212, displayed on GUI 110 (as illustrated, for example, in FIG. 9A). At operation 1904 document tool 102 considers a first data block 1602 of document data structure 1600. At operation 1906 document tool 102 determines whether the type 1604 assigned to the data block is the "paragraph" type. If, at operation 1906 document tool 102 determines that the type 1604 assigned to the data block 1602 is not the "paragraph" type (e.g., the type 1604 is one of the "title," "h1," "h2," or "outlineTopic" types), at operation 1908 document tool 102 displays the content 1608 stored by the data block 1602 as an immutable and immovable element within sentence reorder tool 114c. On the other hand, if, at operation 1906 document tool 102 determines that the type 1604 assigned to the data block 1602 is the "paragraph" type, at operation 1910 document tool 102 displays the sentences 1614e stored by the data block as a list of moveable elements within sentence reorder tool 114c. In certain embodiments in which a set of sentence variants (rewrites) 1616e is stored for one or more of the sentences 1614e stored by the data block, for each set of sentence variants 1616e, document tool 102 displays the selected sentence variant of the set, as identified through identification 1618e, within the list of moveable elements displayed within sentence reorder tool 114c. At operation 1912 document tool 102 determines whether document data structure 1600 includes any additional data blocks 1602. If, at operation 1910 document tool 102 determines that document data structure 1600 includes one or more additional data blocks 1602, at operation 1914 document tool 102 considers a next data block 1602 within document data structure 1600. Method 1900 then returns to operation 1906.

At operation 1916 document tool 102 determines whether an edit has been made to a sentence of document 120. In this context, making an edit to a sentence of document 120 may correspond to changing the content (e.g., the text) of the sentence, deleting the sentence, and/or changing the position of the sentence within document 120. If, at operation 1916 document tool 102 determines that an edit has been made to a sentence of document 120, at operation 1918 document tool 102 determines whether the edit made to the sentence corresponds to a movement of the sentence to a new position within document 120. If, at operation 1918 document tool 102 determines that the edit made to the sentence does not correspond to a movement of the sentence to a new position within document 120, the edit corresponds to a revision of the content of the sentence, or a deletion of the sentence. Accordingly, at operation 1920 document tool 102 either updates the content of the sentence according to the edit, or deletes the sentence from document 120. As an example, in response to determining that the edit to the sentence corresponds to a deletion of the sentence, document tool 102 removes the sentence from its associated list of sentences and updates the list, as displayed within sentence reorder tool 114c, to reflect this deletion. Document tool 102 also updates document 120, as displayed within text editor 112, to reflect the sentence deletion. As another example, in response to determining that the edit to the sentence corresponds to a revision of the content of the sentence, document tool 102 updates the content of the sentence within the list, as displayed by sentence reorder tool 114, to reflect this revision. Document tool 102 also updates the content of the sentence, as displayed within text editor 112, to reflect the revision. Method 1900 then returns to operation 1916.

If, at operation 1918 document tool 102 determines that the edit to the sentence corresponds to a movement of the sentence to a new position within document 120, at operation 1922 document tool 102 determines whether the sentence was moved to a new position within the same list (corresponding to a movement within the same paragraph of document 120). For example, document tool 102 may determine whether a sentence (e.g., sentence 904d) displayed by sentence reorder tool 114c within a particular list of sentences (e.g., list 906b) was moved from a first position within the list to a second position within the list. If, at operation 1922 document tool 102 determines that the sentence was moved to a new position within the same list (corresponding to a movement within the same paragraph of document 120), at operation 1924 document tool 102 updates the position of the sentence within the list to reflect the movement (e.g., moves sentence 904d from the first position within list 906b to the second position within list 906b). Document tool 102 also updates document 120, as displayed within text editor 112 to correspondingly reflect the movement (e.g., moves sentence 904d from a corresponding first position within paragraph 902b to a corresponding second position within paragraph 902b). Method 1900 then returns to operation 1916.

If, at operation 1922 document tool 102 determines that the sentence was not moved to a new position within the same list, at operation 1926 document tool 102 determines whether the sentence was moved to a new position within a different list (corresponding to a movement to a different paragraph of document 120). For example, document tool 102 may determine whether a sentence (e.g., sentence 904b) displayed by sentence reorder tool 114c within a particular list of sentences (e.g., list 906c) was moved from the list to different list (e.g., from list 906c to list 906b). If, at operation 1926 document tool 102 determines that the sentence was moved to a new position within a different list (corresponding to a movement to a different paragraph of document 120), at operation 1928 document tool 102 updates the location of the sentence to reflect its movement into the different list (e.g., updates the location of sentence 904f to be within list 906b). Document tool 102 also updates document 120, as displayed within text editor 112 to correspondingly reflect the movement (e.g., moves sentence 904f from paragraph 902c to a position within paragraph 902b). Method 1900 then returns to operation 1916.

If, at operation 1926 document tool 102 determines that the sentence was not moved to a new position within a different list, at operation 1930 document tool 102 determines whether the sentence was moved to a new position not within any existing lists (corresponding to a movement to a newly created paragraph of document 120). For example, document tool 102 may determine whether a sentence (e.g., sentence 904g) displayed by sentence reorder tool 114c within a particular list of sentences (e.g., list 906c) was moved from the list to a position within sentence reorder tool 114c that does not correspond with any of the lists included within the tool. If, at operation 1930 document tool 102 determines that the sentence was moved to a position within sentence reorder tool 114c that does not correspond with any of the lists included within the sentence reorder tool, at operation 1932 document tool 102 generates a new list at that position (e.g., new list 906g) and moves the sentence into the new list (e.g., moves sentence 904g into new list 906g). Document tool 102 also updates document 120, as displayed within text editor 112 to correspondingly reflect the movement, by creating a new paragraph within document 120 (e.g., new paragraph 902g), and moving the sentence into the new paragraph. Method 1900 then returns to operation 1916.

If, at operation 1916 document tool 102 determines that no edits have been made to the sentences of document 120, at operation 1934 document tool 102 determines whether it has received a request to save the current version of document 120 in database 118. If, at operation 1934 document tool 102 determines that it has received a request to save the current version of document 120 in database 118, at operation 1936 document tool 102 converts the set of elements displayed within sentence reorder tool 114c back into document data structure 1600. In particular, document tool 102 converts each immutable, immoveable element displayed within sentence reorder tool 114c back into a data block 1602 of its corresponding type (e.g., one of types "title," "h1," "h2," "outlineTopic," etc.). Document tool 102 also converts each list of sentence elements (e.g., each list 906a through 906g displayed within sentence reorder tool 114c) into a data block 1602 of the "paragraph" type. At operation 1938 document tool 102 saves document data structure 1600 in database 118. For example, document tool 102 may save document data structure 1600 in database 118 as a new version 122 of document 120. Method 1900 then returns to operation 1916.

Modifications, additions, or omissions may be made to method 1900 depicted in FIG. 19. Method 1900 may include more, fewer, or other operations. For example, operations may be performed in parallel or in any suitable order. As an example, while method 1900 illustrates the decisions associated with operations 1918, 1922, 1926, and 1930 performed sequentially and in a specific order, these decisions may be performed in parallel, or in any suitable order. As another example, while method 1900 illustrates the decisions associated with operations 1916 and 1934 performed sequentially and in a specific order, these decisions may be performed in parallel, or in any suitable order. While discussed as document tool 102 (or components thereof, including, for example, sentence reorder tool 114*c*) performing certain operations, any suitable components of system 100, including, for example, device 106, may perform one or more operations of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. An apparatus comprising:
   a memory configured to store a data structure associated with a document, the document comprising a plurality of strings of text, the data structure comprising an array of data blocks, each data block of the array of data blocks storing one or more strings of text of the plurality of strings of text; and
   a hardware processor communicatively coupled to the memory, the hardware processor configured to:
      display, in a first region of a graphical user interface, a sequence of elements, each element of the sequence of elements associated with one or more consecutive data blocks of the array of data blocks;
      display, in a second region of the graphical user interface, a sequence of parts, each part of the sequence of parts corresponding to a data block of the sequence of data blocks and displaying the one or more strings of text stored by the corresponding data block, wherein a position of the part within the sequence of parts matches a position of the corresponding data block within the array of data blocks;
      receive information identifying a modification associated with a first element of the sequence of elements displayed in the first region of the graphical user interface, the first element associated with at least a first data block of the array of data blocks, wherein a first part of the sequence of parts corresponds to the first data block, and the modification associated with the first element is associated with an equivalent modification associated with the first part of the sequence of parts; and
      in response to receiving the information identifying the modification associated with the first element of the sequence of elements:
         update the sequence of elements displayed in the first region of the graphical user interface according to the modification associated with the first element;
         update the sequence of parts displayed in the second region of the graphical user interface according to the equivalent modification associated with the first part;
         convert the updated sequence of elements into an updated array of data blocks; and
         store the updated array of data blocks in the memory as an updated version of the data structure.

2. The apparatus of claim 1, wherein each data block of the array of data blocks is assigned to a type chosen from a set comprising at least one of:
   a title block type, wherein the one or more strings of text stored by the data block comprises a title of the document;
   a heading block type, wherein the one or more strings of text stored by the data block comprises a heading within the document and stored by the data block;
   an outline topic block type, wherein the one or more strings of text stored by the data block comprises an outline topic within the document and stored by the data block; and
   a paragraph block type, wherein the one or more strings of text stored by the data block comprises one or more sentences of a paragraph within the document and stored by the data block.

3. The apparatus of claim 2, wherein:
   the first data block is assigned to the outline topic block type;
   the array of data blocks further comprises:
      a second data block that is assigned to the outline topic block type; and
      a first sequence of one or more data blocks that are not assigned to the outline topic block type, the first sequence of the one or more data blocks positioned between the first data block and the second data block in the array of data blocks;
   the sequence of elements comprises:
      the first element, wherein the one or more consecutive data blocks associated with the first element comprises:
         the first data block; and
         the first sequence of the one or more data blocks that are not assigned to the outline topic block type; and
      a second element positioned after the first element in the sequence of elements, wherein the one or more consecutive data blocks associated with the second element comprises the second data block;
   the sequence of parts comprises:
      the first part corresponding to the first data block that is assigned to the outline topic block type;
      a second part corresponding to the second data block that is assigned to the outline topic block type; and
      a subsequence of one or more parts, each part of the subsequence of one or more parts corresponding to a data block of the first sequence of one or more data blocks that are not assigned to the outline topic block type, the subsequence of one or more parts positioned between the first part and the second part in the sequence of parts;
   the modification associated with the first element of the sequence of elements comprises a movement of the first element from a position on the first region of the graphical user interface that is above the second element to a position on the first region of the graphical user interface that is below the second element;
   the updated sequence of elements displayed in the first region of the graphical user interface comprises the second element, and the first element positioned below the second element;
   the updated sequence of parts displayed in the second region of the graphical user interface comprises:
      the first part;
      the second part positioned above the first part; and
      the subsequence of one or more parts positioned below the first part; and
   converting the updated sequence of elements into an updated version of the data structure comprises reordering data blocks within the array of data blocks of the data structure, based on an ordering of elements within the updated sequence of elements.

4. The apparatus of claim 2, wherein, for each data block that is assigned to the paragraph block type:
   each sentence of the one or more sentences of the paragraph stored by the data block belongs to a set of sentence variants of one or more sets of sentence variants stored by the data block; and
   for each set of sentence variants of the one or more sets of sentence variants stored by the data block, the data block further stores information identifying the sentence of the one or more sentences of the paragraph belonging to the set of sentence variants as a selected sentence variant of the set of sentence variants.

5. The apparatus of claim 4, wherein the first data block of the array of data blocks is assigned to the paragraph block type, wherein:
   the one or more sentences of the paragraph stored by the first data block comprises a first sentence, the first sentence belonging to a first set of sentence variants stored by the data block, the first set of sentence variants comprising the first sentence and a first sentence variant; and
   the first data block further stores information identifying the first sentence as the selected sentence variant of the first set of sentence variants;
   the one or more data blocks associated with the first element of the sequence of elements comprises the first data block, wherein the first element is configured to display:
      the first set of sentence variants stored by the data block; and
      the information identifying the first sentence as the selected sentence variant of the first set of sentence variants;
   the first part of the sequence of parts corresponds to the first data block, the first part displaying the paragraph stored by the first data block;
   the information identifying the modification associated with the first element of the sequence of elements comprises information associated with a replacement of the information identifying the first sentence as the selected sentence variant of the first set of sentence variants with information identifying the first sentence variant as the selected sentence variant of the first set of sentence variants;
   updating the sequence of elements displayed in the first region of the graphical user interface according to the modification associated with the first element comprises replacing the information identifying the first sentence as the selected sentence variant of the first set of sentence variants with the information identifying the first sentence variant as the selected sentence variant of the first set of sentence variants;
   updating the sequence of parts displayed in the second region of the graphical user interface according to the equivalent modification associated with the first part comprises updating the first part to display the first sentence variant instead of the first sentence; and
   converting the updated sequence of elements into an updated version of the data structure comprises replacing the information identifying the first sentence as the selected sentence variant of the first set of sentence variants that was stored by the first data block with the information identifying the first sentence variant as the selected sentence variant of the first set of sentence variants.

6. The apparatus of claim 4, wherein
the first data block of the array of data blocks is assigned to the paragraph block type, wherein:
   the one or more sentences of the paragraph stored by the first data block comprises a first sentence, the first sentence belonging to a first set of sentence variants stored by the data block, the first set of sentence variants comprising the first sentence; and
   the first data block further stores information identifying the first sentence as the selected sentence variant of the first set of sentence variants;
the one or more data blocks associated with the first element of the sequence of elements comprises the first data block, wherein the first element is configured to display:
   the first set of sentence variants stored by the data block; and
   the information identifying the first sentence as the selected sentence variant of the first set of sentence variants;
the first part of the sequence of parts corresponds to the first data block, the first part displaying the paragraph stored by the first data block;
the information identifying the modification associated with the first element of the sequence of elements comprises information associated with:
   a creation of a new sentence variant of the first set of sentence variants; and
   a replacement of the information identifying the first sentence as the selected sentence variant of the first set of sentence variants with information identifying the new sentence variant as the selected sentence variant of the first set of sentence variants;
updating the sequence of elements displayed in the first region of the graphical user interface according to the modification associated with the first element comprises:
   causing the first element to display the new sentence variant; and
   replacing the information identifying the first sentence as the selected sentence variant of the first set of sentence variants with the information identifying the new sentence variant as the selected sentence variant of the first set of sentence variants;
updating the sequence of parts displayed in the second region of the graphical user interface according to the equivalent modification associated with the first part comprises updating the first part to display the new sentence variant instead of the first sentence; and
converting the updated sequence of elements into an updated version of the data structure comprises:
   adding the new sentence variant to the first set of sentence variants stored by the first data block; and
   replacing the information identifying the first sentence as the selected sentence variant of the first set of sentence variants that was stored by the first data block with the information identifying the new sentence variant as the selected sentence variant of the first set of sentence variants.

7. The apparatus of claim 2, wherein:
the first data block is assigned to the paragraph block type, wherein the one or more sentences of the paragraph stored by the first data block comprises a first sentence and a second sentence, the second sentence following the first sentence within the paragraph stored by the data block;

the sequence of elements comprises:
  the first element, wherein:
    the one or more consecutive data blocks associated with the first element comprises the first data block; and
    the first element displays the first sentence of the one or more sentences of the paragraph stored by the first data block; and
  a second element positioned after the first element in the sequence of elements, wherein:
    the one or more consecutive data blocks associated with the second element comprises the first data block; and
    the second element displays the second sentence of the one or more sentences of the paragraph stored by the first data block;

the sequence of parts comprises the first part, wherein the first part corresponds to the first data block, and displays the paragraph stored by the first data block;

the modification associated with the first element of the sequence of elements comprises a movement of the first element from a position on the first region of the graphical user interface that is above the second element to a position on the first region of the graphical user interface that is below the second element;

updating the sequence of elements displayed in the first region of the graphical user interface comprises moving the first element from the position on the first region of the graphical user interface that is above the second element to the position on the first region of the graphical user interface that is below the second element;

updating the sequence of parts displayed in the second region of the graphical user interface comprises updating the first part of the sequence of parts such that the updated first part displays an updated version of the paragraph stored by the first data block, wherein the second sentence precedes the first sentence within the updated version of the paragraph stored by the first data block; and converting the updated sequence of elements into an updated version of the data structure comprises replacing the paragraph stored by the first data block of the data structure with the updated version of the paragraph.

8. The apparatus of claim 2, wherein:
the first data block is assigned to the paragraph block type, wherein the one or more sentences of the paragraph stored by the first data block comprises a first sentence;
the array of data blocks further comprises a second data block assigned to the paragraph block type;
the sequence of elements comprises:
  the first element, wherein:
    the one or more consecutive data blocks associated with the first element comprises the first data block; and
    the first element displays the first sentence of the one or more sentences of the paragraph stored by the first data block; and
  a second element, wherein the one or more consecutive data blocks associated with the second element comprises the second data block;
the sequence of parts comprises:
  the first part, wherein the first part corresponds to the first data block and displays the paragraph stored by the first data block; and
  a second part, wherein the second part corresponds to the second data block and displays the paragraph stored by the second data block;

the modification associated with the first element of the sequence of elements comprises a movement of the first sentence displayed by the first element from the first element to the second element;

updating the sequence of elements displayed in the first region of the graphical user interface comprises moving the first sentence display by the first element from the first element to the second element;

updating the sequence of parts displayed in the second region of the graphical user interface comprises moving the first sentence from the paragraph displayed by the first part to the paragraph displayed by the second part; and converting the updated sequence of elements into an updated version of the data structure comprises:
  removing the first sentence from the paragraph stored by the first data block of the data structure; and
  adding the first sentence to the paragraph stored by the second data block of the data structure.

9. The apparatus of claim 1, wherein the hardware processor is further configured to:
receive information associated with an addition of a new string of text to the plurality of strings of text of the document, wherein:
  the new string of text is associated with a new data block; and
  the information associated with the addition of the new string of text comprises information associated with at least one of:
    a creation of a new element of the sequence of elements displayed in the first region of the graphical user interface and an entry of the new string of text into the new element; and
    a creation of a new part of the sequence of parts displayed in the second region of the graphical user interface and an entry of the new string of text into the new part; and
in response to receiving the information associated with the addition of the new string of text to the document, update the data structure by adding the new data block to the array of data blocks, the new data block storing the new string of text.

10. The apparatus of claim 1, wherein:
each data block of the array of data blocks of the data structure further stores an identification number, wherein the first data block stores a first identification number;
the updated version of the data structure comprises an updated version of the first data block, wherein:
  the updated version of the first data block stores:
    one or more strings of text different from the one or more strings of text stored by the first data block; and
    the first identification number; and
  a position of the first data block within the array of data blocks is different from a position of the updated version of the first data block within the updated array of data blocks; and
storing the updated version of the data structure in the memory comprises:
  using the first identification number to determine that the updated version of the first data block corresponds to the first data block; and determining that the updated version of the first data block comprises one or more changes as compared to the first data block.

11. A method comprising:
generating a data structure associated with a document, the document comprising a plurality of strings of text, the data structure comprising an array of data blocks, each data block of the array of data blocks storing one or more strings of text of the plurality of strings of text;
displaying, in a first region of a graphical user interface, a sequence of elements, each element of the sequence of elements associated with one or more consecutive data blocks of the array of data blocks;
displaying, in a second region of the graphical user interface, a sequence of parts, each part of the sequence of parts corresponding to a data block of the sequence of data blocks and displaying the one or more strings of text stored by the corresponding data block, wherein a position of the part within the sequence of parts matches a position of the corresponding data block within the array of data blocks;
receiving information identifying a modification associated with a first element of the sequence of elements displayed in the first region of the graphical user interface, the first element associated with at least a first data block of the array of data blocks, wherein a first part of the sequence of parts corresponds to the first data block, and the modification associated with the first element is associated with an equivalent modification associated with the first part of the sequence of parts; and
in response to receiving the information identifying the modification associated with the first element of the sequence of elements:
updating the sequence of elements displayed in the first region of the graphical user interface according to the modification associated with the first element;
updating the sequence of parts displayed in the second region of the graphical user interface according to the equivalent modification associated with the first part;
converting the updated sequence of elements into an updated array of data blocks; and
storing the updated array of data blocks in a memory as an updated version of the data structure.

12. The method of claim 11, wherein each data block of the array of data blocks is assigned to a type chosen from a set comprising at least one of:
a title block type, wherein the one or more strings of text stored by the data block comprises a title of the document;
a heading block type, wherein the one or more strings of text stored by the data block comprises a heading within the document and stored by the data block;
an outline topic block type, wherein the one or more strings of text stored by the data block comprises an outline topic within the document and stored by the data block; and
a paragraph block type, wherein the one or more strings of text stored by the data block comprises one or more sentences of a paragraph within the document and stored by the data block.

13. The method of claim 12, wherein:
the first data block is assigned to the outline topic block type;
the array of data blocks further comprises:
a second data block that is assigned to the outline topic block type; and
a first sequence of one or more data blocks each of which are not assigned to the outline topic block type, the first sequence of the one or more data blocks positioned between the first data block and the second data block in the array of data blocks;
the sequence of elements comprises:
the first element, wherein the one or more consecutive data blocks associated with the first element comprises:
the first data block; and
the first sequence of the one or more data blocks that are not assigned to the outline topic block type; and
a second element positioned after the first element in the sequence of elements, wherein the one or more consecutive data blocks associated with the second element comprises the second data block;
the sequence of parts comprises:
the first part corresponding to the first data block that is assigned to the outline topic block type;
a second part corresponding to the second data block that is assigned to the outline topic block type; and
a subsequence of one or more parts, each part of the subsequence of one or more parts corresponding to a data block of the first sequence of one or more data blocks that are not assigned to the outline topic block type, the subsequence of one or more parts positioned between the first part and the second part in the sequence of parts;
the modification associated with the first element of the sequence of elements comprises a movement of the first element from a position on the first region of the graphical user interface that is above the second element to a position on the first region of the graphical user interface that is below the second element;
the updated sequence of elements displayed in the first region of the graphical user interface comprises the second element, and the first element positioned below the second element;
the updated sequence of parts displayed in the second region of the graphical user interface comprises:
the first part;
the second part positioned above the first part; and
the subsequence of one or more parts positioned below the first part; and
converting the updated sequence of elements into an updated version of the data structure comprises reordering data blocks within the array of data blocks of the data structure, based on an ordering of elements within the updated sequence of elements.

14. The method of claim 12, wherein, for each data block that is assigned to the paragraph block type:
each sentence of the one or more sentences of the paragraph stored by the data block belongs to a set of sentence variants of one or more sets of sentence variants stored by the data block; and
for each set of sentence variants of the one or more sets of sentence variants stored by the data block, the data block further stores information identifying the sentence of the one or more sentences of the paragraph belonging to the set of sentence variants as a selected sentence variant of the set of sentence variants.

15. The method of claim 14, wherein:
the first data block of the array of data blocks is assigned to the paragraph block type, wherein:
the one or more sentences of the paragraph stored by the first data block comprises a first sentence, the first sentence belonging to a first set of sentence variants stored by the data block, the first set of sentence variants comprising the first sentence and a first sentence variant; and the first data block further stores information identifying the first sentence as the selected sentence variant of the first set of sentence variants;

the one or more data blocks associated with the first element of the sequence of elements comprises the first data block, wherein the first element is configured to display:

the first set of sentence variants stored by the data block; and the information identifying the first sentence as the selected sentence variant of the first set of sentence variants;

the first part of the sequence of parts corresponds to the first data block, the first part displaying the paragraph stored by the first data block;

the information identifying the modification associated with the first element of the sequence of elements comprises information associated with a replacement of the information identifying the first sentence as the selected sentence variant of the first set of sentence variants with information identifying the first sentence variant as the selected sentence variant of the first set of sentence variants;

updating the sequence of elements displayed in the first region of the graphical user interface according to the modification associated with the first element comprises replacing the information identifying the first sentence as the selected sentence variant of the first set of sentence variants with the information identifying the first sentence variant as the selected sentence variant of the first set of sentence variants;

updating the sequence of parts displayed in the second region of the graphical user interface according to the equivalent modification associated with the first part comprises updating the first part to display the first sentence variant instead of the first sentence; and converting the updated sequence of elements into an updated version of the data structure comprises replacing the information identifying the first sentence as the selected sentence variant of the first set of sentence variants that was stored by the first data block with the information identifying the first sentence variant as the selected sentence variant of the first set of sentence variants.

16. The method of claim 14, wherein the first data block of the array of data blocks is assigned to the paragraph block type, wherein:

the one or more sentences of the paragraph stored by the first data block comprises a first sentence, the first sentence belonging to a first set of sentence variants stored by the data block, the first set of sentence variants comprising the first sentence; and the first data block further stores information identifying the first sentence as the selected sentence variant of the first set of sentence variants;

the one or more data blocks associated with the first element of the sequence of elements comprises the first data block, wherein the first element is configured to display:

the first set of sentence variants stored by the data block; and the information identifying the first sentence as the selected sentence variant of the first set of sentence variants;

the first part of the sequence of parts corresponds to the first data block, the first part displaying the paragraph stored by the first data block;

the information identifying the modification associated with the first element of the sequence of elements comprises information associated with:

a creation of a new sentence variant of the first set of sentence variants; and a replacement of the information identifying the first sentence as the selected sentence variant of the first set of sentence variants with information identifying the new sentence variant as the selected sentence variant of the first set of sentence variants;

updating the sequence of elements displayed in the first region of the graphical user interface according to the modification associated with the first element comprises:

causing the first element to display the new sentence variant; and replacing the information identifying the first sentence as the selected sentence variant of the first set of sentence variants with the information identifying the new sentence variant as the selected sentence variant of the first set of sentence variants;

updating the sequence of parts displayed in the second region of the graphical user interface according to the equivalent modification associated with the first part comprises updating the first part to display the new sentence variant instead of the first sentence; and converting the updated sequence of elements into an updated version of the data structure comprises:

adding the new sentence variant to the first set of sentence variants stored by the first data block; and replacing the information identifying the first sentence as the selected sentence variant of the first set of sentence variants that was stored by the first data block with the information identifying the new sentence variant as the selected sentence variant of the first set of sentence variants.

17. The method of claim 12, wherein:

the first data block is assigned to the paragraph block type, wherein the one or more sentences of the paragraph stored by the first data block comprises a first sentence and a second sentence, the second sentence following the first sentence within the paragraph stored by the data block;

the sequence of elements comprises:

the first element, wherein:

the one or more consecutive data blocks associated with the first element comprises the first data block; and the first element displays the first sentence of the one or more sentences of the paragraph stored by the first data block; and a second element positioned after the first element in the sequence of elements, wherein:

the one or more consecutive data blocks associated with the second element comprises the first data block; and the second element displays the second sentence of the one or more sentences of the paragraph stored by the first data block;

the sequence of parts comprises the first part, wherein the first part corresponds to the first data block, and displays the paragraph stored by the first data block;

the modification associated with the first element of the sequence of elements comprises a movement of the first element from a position on the first region of the graphical user interface that is above the second element to a position on the first region of the graphical user interface that is below the second element;

updating the sequence of elements displayed in the first region of the graphical user interface comprises moving the first element from the position on the first region of the graphical user interface that is above the second element to the position on the first region of the graphical user interface that is below the second element;

updating the sequence of parts displayed in the second region of the graphical user interface comprises updating the first part of the sequence of parts such that the updated first part displays an updated version of the paragraph stored by the first data block, wherein the second sentence precedes the first sentence within the updated version of the paragraph stored by the first data block; and converting the updated sequence of elements into an updated version of the data structure comprises replacing the paragraph stored by the first data block of the data structure with the updated version of the paragraph.

18. The method of claim 12, wherein:
the first data block is assigned to the paragraph block type, wherein the one or more sentences of the paragraph stored by the first data block comprises a first sentence;
the array of data blocks further comprises a second data block assigned to the paragraph block type;
the sequence of elements comprises:
  the first element, wherein:
    the one or more consecutive data blocks associated with the first element comprises the first data block; and
    the first element displays the first sentence of the one or more sentences of the paragraph stored by the first data block; and
  a second element, wherein the one or more consecutive data blocks associated with the second element comprises the second data block;
the sequence of parts comprises:
  the first part, wherein the first part corresponds to the first data block and displays the paragraph stored by the first data block; and
  a second part, wherein the second part corresponds to the second data block and displays the paragraph stored by the second data block;
the modification associated with the first element of the sequence of elements comprises a movement of the first sentence displayed by the first element from the first element to the second element;
updating the sequence of elements displayed in the first region of the graphical user interface comprises moving the first sentence display by the first element from the first element to the second element;
updating the sequence of parts displayed in the second region of the graphical user interface comprises moving the first sentence from the paragraph displayed by the first part to the paragraph displayed by the second part; and
converting the updated sequence of elements into an updated version of the data structure comprises:
  removing the first sentence from the paragraph stored by the first data block of the data structure; and
  adding the first sentence to the paragraph stored by the second data block of the data structure.

19. The method of claim 11, further comprising:
receiving information associated with an addition of a new string of text to the plurality of strings of text of the document, wherein:
  the new string of text is associated with a new data block; and
  the information associated with the addition of the new string of text comprises information associated with at least one of:
    a creation of a new element of the sequence of elements displayed in the first region of the graphical user interface, followed by an entry of the new string of text into the new element; and
    a creation of a new part of the sequence of parts displayed in the second region of the graphical user interface, followed by an entry of the new string of text into the new part; and
in response to receiving the information associated with the addition of the new string of text to the document, updating the data structure by adding the new data block to the array of data blocks, the new data block storing the new string of text.

20. The method of claim 11, wherein:
each data block of the array of data blocks of the data structure further stores an identification number, wherein the first data block stores a first identification number;
the updated version of the data structure comprises an updated version of the first data block, wherein:
  the updated version of the first data block stores:
    one or more strings of text different from the one or more strings of text stored by the first data block; and
    the first identification number; and
  a position of the first data block within the array of data blocks is different from a position of the updated version of the first data block within the updated array of data blocks; and
storing the updated version of the data structure in the memory comprises:
  using the first identification number to determine that the updated version of the first data block corresponds to the first data block; and
  determining that the updated version of the first data block comprises one or more changes as compared to the first data block.

21. A non-transitory computer-readable medium comprising instructions that, when executed by a hardware processor, cause the processor to:
generate a data structure associated with a document, the document comprising a plurality of strings of text, the data structure comprising an array of data blocks, each data block of the array of data blocks storing one or more strings of text of the plurality of strings of text;
display, in a first region of a graphical user interface, a sequence of elements, each element of the sequence of elements associated with one or more consecutive data blocks of the array of data blocks;
display, in a second region of the graphical user interface, a sequence of parts, each part of the sequence of parts corresponding to a data block of the sequence of data blocks and displaying the one or more strings of text stored by the corresponding data block, wherein a position of the part within the sequence of parts matches a position of the corresponding data block within the array of data blocks;

receive information identifying a modification associated with a first element of the sequence of elements displayed in the first region of the graphical user interface, the first element associated with at least a first data block of the array of data blocks, wherein a first part of the sequence of parts corresponds to the first data block, and the modification associated with the first element is associated with an equivalent modification associated with the first part of the sequence of parts; and in response to receiving the information identifying the modification associated with the first element of the sequence of elements:

update the sequence of elements displayed in the first region of the graphical user interface according to the modification associated with the first element;

update the sequence of parts displayed in the second region of the graphical user interface according to the equivalent modification associated with the first part;

convert the updated sequence of elements into an updated array of data blocks; and store the updated array of data blocks in a memory as an updated version of the data structure.

\* \* \* \* \*